United States Patent [19]

Mori et al.

[11] Patent Number: 5,046,823

[45] Date of Patent: Sep. 10, 1991

[54] FERROELECTRIC LIQUID CRYSTAL ELECTRO-OPTIC APPARATUS AND MANUFACTURING METHOD THEREOF

[75] Inventors: Kahoru Mori, Anjo; Yuichiro Yamada, Nagoya; Norio Yamamoto, Kariya; Masao Tokunaga, Gamagori; Ichiro Kawamura, Yamato; Yoshiichi Suzuki, Zama; Takashi Hagiwara; Yoshihiko Aihara, both of Yokohama; Noriko Yamakawa, Atsugi; Shigenori Sakuma, Yokohama, all of Japan

[73] Assignees: Nippondenso Co., Ltd., Kariya; Showa Shell Sekiyu K.K., Tokyo, both of Japan

[21] Appl. No.: 328,363

[22] Filed: Mar. 24, 1989

[30] Foreign Application Priority Data

| Mar. 24, 1988 | [JP] | Japan | 63-70212 |
| May 2, 1988 | [JP] | Japan | 63-109724 |
| May 19, 1988 | [JP] | Japan | 63-122679 |
| Dec. 7, 1988 | [JP] | Japan | 63-309615 |
| Dec. 27, 1988 | [JP] | Japan | 63-331308 |
| Dec. 28, 1988 | [JP] | Japan | 63-331593 |

[51] Int. Cl.$^5$ ............................................. G02F 1/13
[52] U.S. Cl. .................................................... 359/56
[58] Field of Search .................. 350/332, 333, 350 S, 350/334; 340/784, 805

[56] References Cited

U.S. PATENT DOCUMENTS

| 4,367,924 | 1/1983 | Clark et al. | 350/334 |
| 4,563,059 | 1/1986 | Clark et al. | 350/330 |
| 4,770,502 | 9/1988 | Kitazima et al. | 350/350 S |
| 4,813,767 | 3/1989 | Clark et al. | 350/350 S X |
| 4,901,066 | 2/1990 | Kobayashi et al. | 350/350 S X |

FOREIGN PATENT DOCUMENTS

| 0238287 | 9/1987 | European Pat. Off. | 350/350 S |
| 0256879 | 2/1988 | European Pat. Off. | 350/350 S |
| 62-160420 | 7/1987 | Japan . | |
| 87/02495 | 4/1987 | PCT Int'l Appl. | 350/333 |

OTHER PUBLICATIONS

Yamada et al., "Phase Transitions and Switching Behavior in a Fluorine-Containing Ferroelectric Liquid Crystal", Japanese Journal of Applied Physics, vol. 28, No. 9, Sep. 1989, pp. L1606-L1608.

Furukawa et al., "Chiral Smetic C Liquid Crystals Having an Electronegative Substituent Ortho to the Chiral Tail A Study of A Factor Determining the Magnitude of Spontaneous Polarization", Ferroelectrics, '88, vol. 85, 451-459.

(List continued on next page.)

Primary Examiner—Stanley D. Miller
Assistant Examiner—Huy K. Mai
Attorney, Agent, or Firm—Cushman, Darby & Cushman

[57] ABSTRACT

There is disclosed herein a ferroelectric liquid crystal electro-optical apparatus of the maxtrix type comprising a liquid crystal cell having first and second electrode substrates which include n striped line electrodes and m striped column electrodes, respectively, facing at right angles each other. A ferroelectric liquid crystal is put in therebetween so as to form n by m indication picture elements. Also included in the apparatus a scanning drive device adapted to supply a scanning signal and a data signal to the n striped line electrodes and the m striped column electrodes, respectively. The ferroelectric liquid crystal shows three stable states in accordance with an application voltage and has a light transmittance with a hysteresis sufficient to a dynamic drive in accordance with increase or decrease in the application voltage in a predetermined voltage range. The scanning drive device produces a first combination signal as a signal running to variation from a voltage below a refernece voltage in a predetermined one polarity voltage range to a voltage above the reference voltage and produces a second combination signal as a signal which does not exceed the reference voltage in the range, and supplies a direct-current combination signal between the electrodes after the supply of the first and second combination signal thereto.

7 Claims, 29 Drawing Sheets

OTHER PUBLICATIONS

Suzuki et al., "New Fluorine-Containing Ferroelectric Liquid Crystal Compounds Showing Tristable Switching", Liquid Crytals, 1989, vol. 6, No. 2, 167–174.

">" Shaped Layer Structure and Electro-Optic Properties in Surface Stabilized Ferroelectric Liquid Crystal Cells: by Hiji et al.; 1st International Symposium on Ferroelectric Liquid Crystals; Sep. 21–23, 1987; Brodneaux-arcachon; Poster P-47.

"Relation Between Spontaneous Polarization and Rotational Viscosity in Enantiomeric Mixtures of Ferroelectric Liquid Crystals"; by Chandani et al.; Japanese Journal of Applied Physics, vol. 27, No. 3, Mar. 1988; pp. L276–L279.

Tristable Switching in Surface Stabilized Ferroelectric Liquid Crystals with a Large Spontaneous Polarization: by Chandani et al.; Japanese Journal of Applied Physics, vol. 27, No. 5, May 1988; pp. L729–L732.

FIG. 18
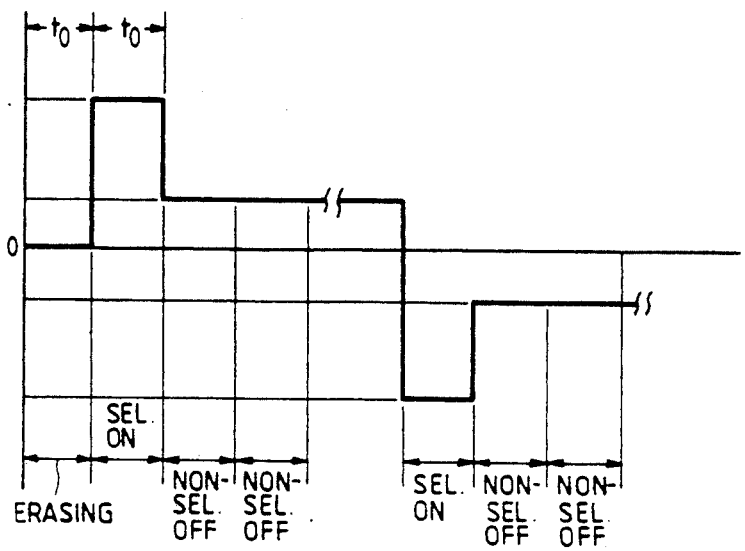
(a)
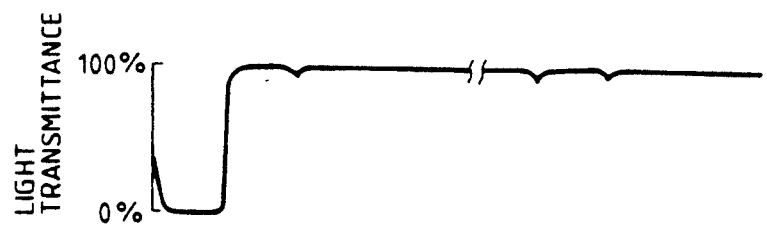
(b)
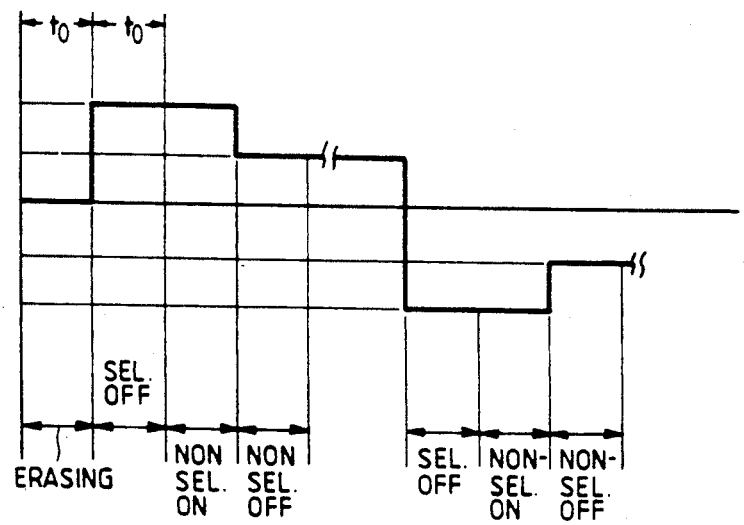
(c)
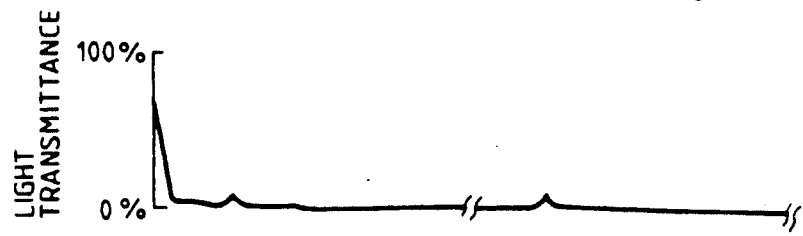
(d)

IR CHART

IR CHART

IR CHART

FIG. 26
(a)
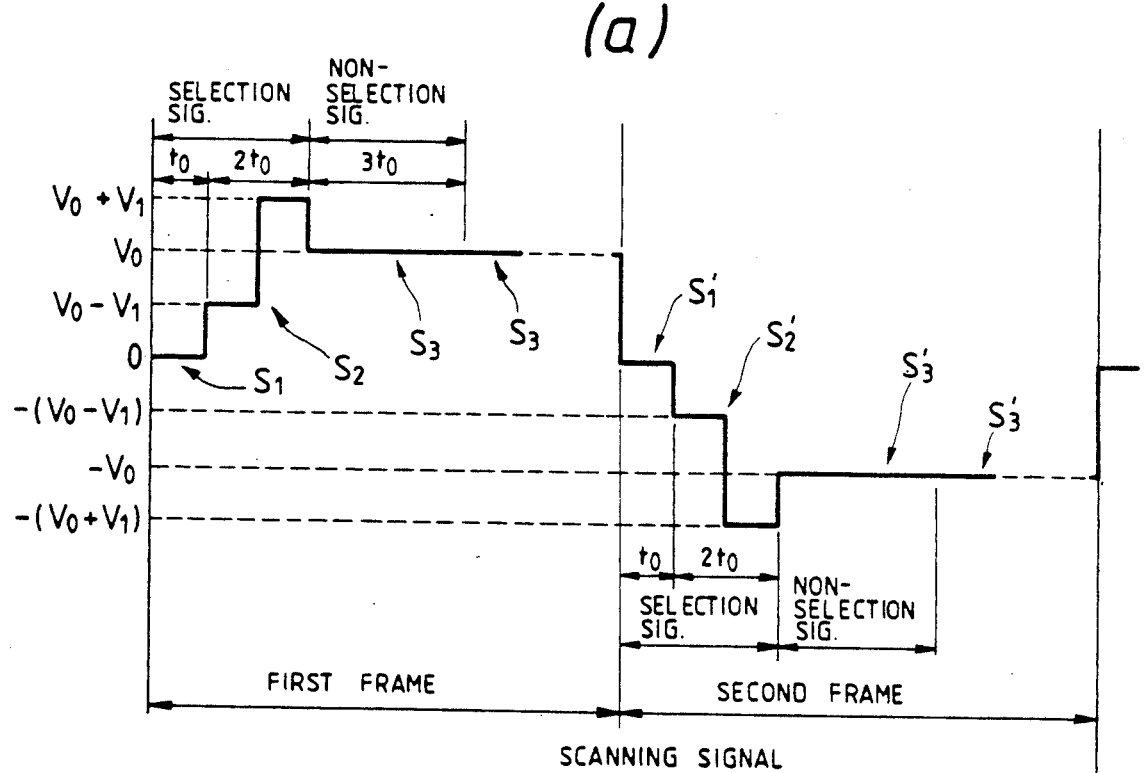
SCANNING SIGNAL
(b)
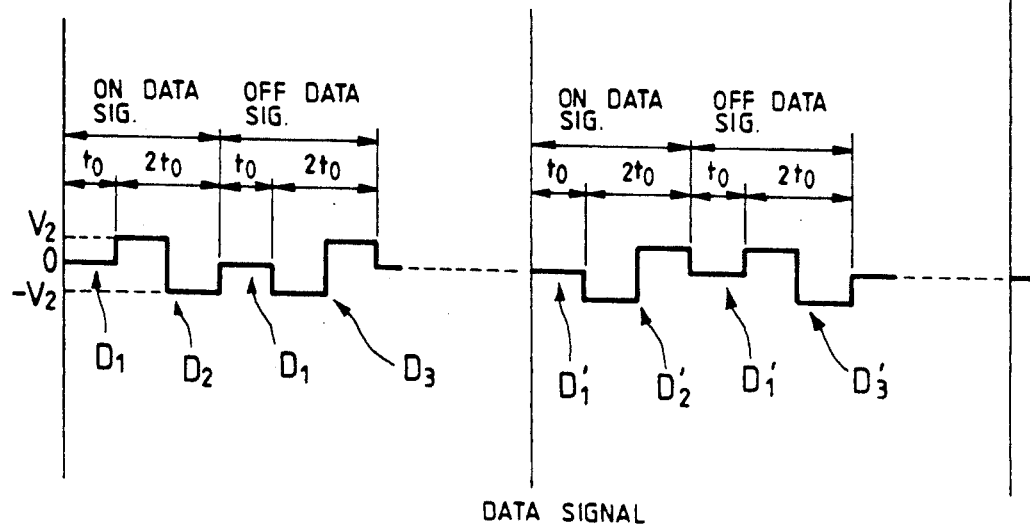
DATA SIGNAL

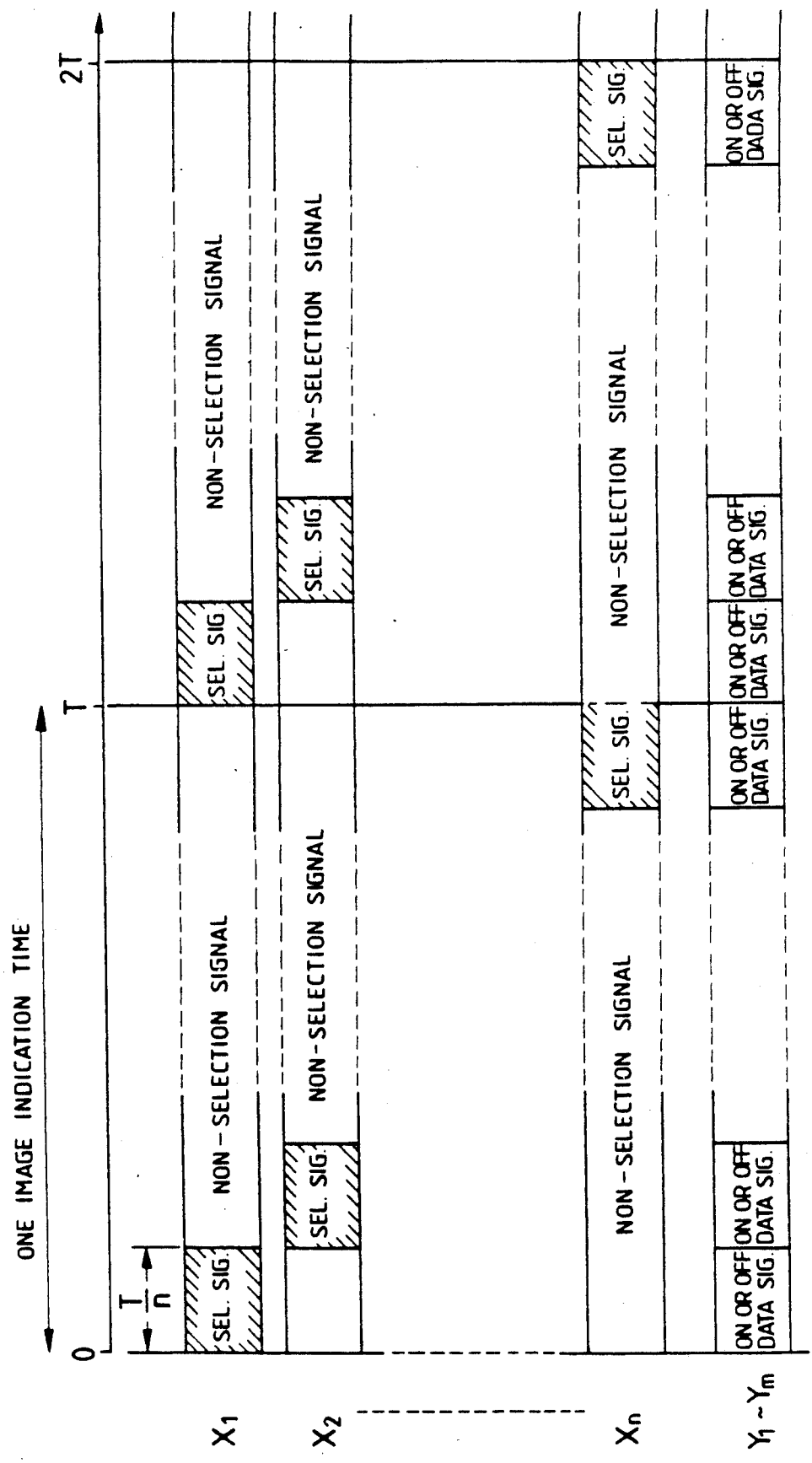

FIG. 29
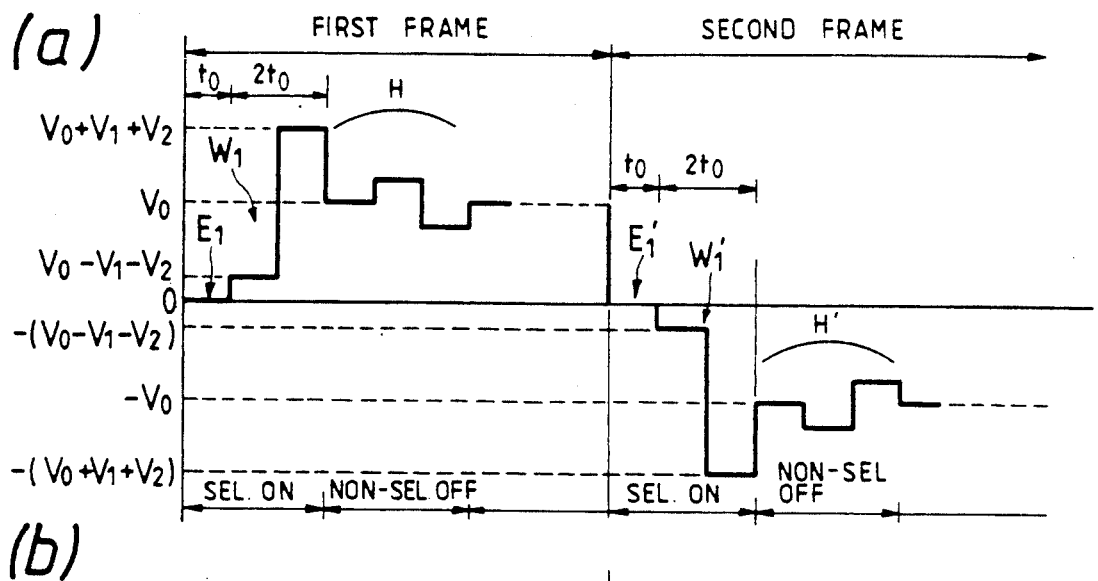
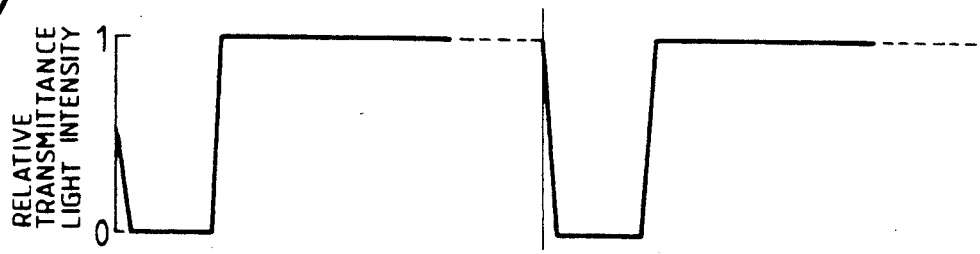
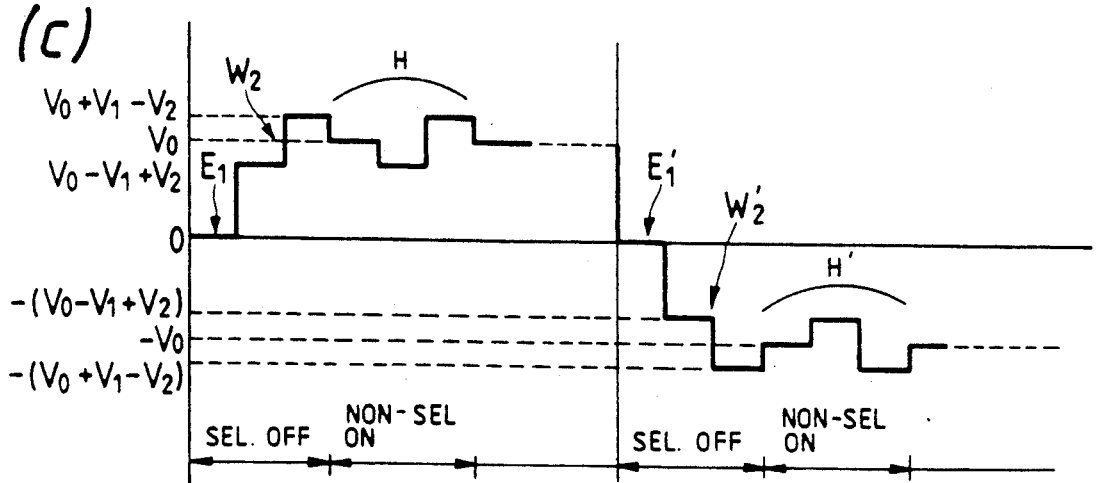
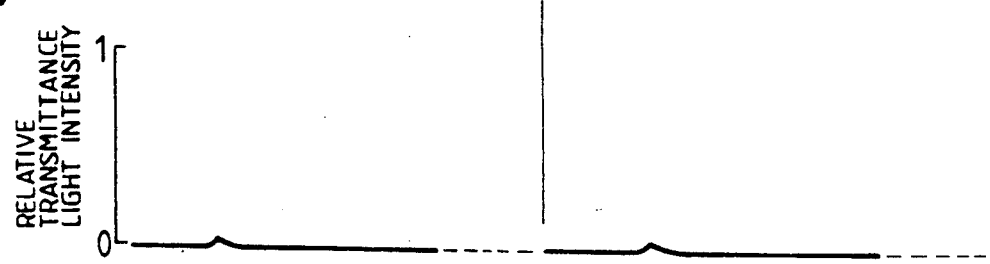

FERROELECTRIC LIQUID CRYSTAL ELECTRO-OPTIC APPARATUS AND MANUFACTURING METHOD THEREOF

BACKGROUND OF THE INVENTION

The present invention relates generally to liquid crystal electro-optic apparatus, and more particularly to such an apparatus for controlling the stable state of molecular orientation in accordance with the application state of an electric field to a ferroelectric liquid crystal. The present invention may be employed, for example, in optical shutters and wall-mounted televisions.

As electro-optic apparatus using a liquid crystal are known so-called DSM type, TN type, G-H type and STN type electro-optic apparatus using the electric field alignment effect of a nematic liquid crystal phase which apparatus are being put into practice. In such apparatus, the average direction of the long axes of the liquid crystal molecules assumes a preferable orientation in applied electric fields due to the permittivity aerotropic characteristic of the liquid crystal. Here, since the coupling between the applied electric field and the permittivity aerotropic characteristic is considerably weak, the electro-optical response time is extremely long, for example, several milliseconds to several tens milliseconds. In addition, variation of the transmission factor with respect to the applied voltage does not have sufficient non-linearity. Thus, limitations are given for applications owing to the aforementioned disadvantages. Accordingly, various types of liquid crystals have been developed with a view to eliminating the aforementioned problems. One known approach is a ferroelectric liquid crystal which has been developed by Meyer and other persons and announced in Le Journal de Physique, 36 Vol. 1975, L-69. As a result of research made by some research groups, the liquid crystal has been known to have three electro-optical effects. Of these effects, two relate to response from several microseconds to several tens microseconds which is in turn useful for producing high-speed liquid crystal electro-optic apparatus as illustrated in Japanese patent provisional Publication No. 56-107216 and Japanese Patent Provisional Publication No. 60-195521, for example, where the torsion structure of the ferroelectric liquid crystal is released due to forces of wall surfaces so that the relation between orientation states of liquid crystal molecules, becoming parallel to the wall surfaces, is varied in accordance with the polarity of an applied voltage and a transient molecular scattering state occurring at the time of inversion of the polarity of an electric field applied to the ferroelectric liquid crystal is utilized. On the other hand, the remaining electro-optical effect relates to a third stable state which is present in first and second stable states of liquid crystal molecules and at the time of a field-free state occurring in accordance with the direction of an applied electric field as briefly disclosed in a paper (titled "<"-SHAPED LAYER STRUCTURE AND ELECTRO-OPTIC PROPERTIES IN SURFACE STABILIZED FERROELECTRIC LIQUID CRYSTAL CELLS") in proceedings of the first ferroelectric liquid crystal international symposium. Although advantages of the aforementioned third electro-optical effect may be useful for improvement of the liquid crystal electro-optic apparatus, no technique effectively applying the third electro-optical effect has appeared heretofore.

SUMMARY OF THE INVENTION

It is therefore an object of the present invention to provide a high-speed switching type electro-optic apparatus effectively applying a ferroelectric liquid crystal having three stable states controllable in accordance with the strength and direction of an applied electric field and further to provide a manufacturing method thereof.

With this and other objects which will become apparent as the description proceeds, a matrix type liquid crystal display apparatus according to the present invention comprising: a liquid crystal cell having first and second electrode substrates disposed to be parallel to each other, said first and second electrode substrates including n striped line electrodes and m striped column electrodes, respectively, which face to meet at right angles each other, a ferroelectric liquid crystal being put in between said first and second electrode substrates so as to form n by m indication picture elements; and scanning drive means adapted to supply a scanning signal to the n striped line electrodes and a data signal to the m striped column electrodes for scanning, at every (1/n) of one image plane indication time period, the respective line electrodes to supply a first combination signal so as to cause the one indication picture element to enter in an ON state and further to supply a second combination signal so as to cause the remaining indication picture elements to enter in an OFF state; wherein said ferroelectric liquid crystal shows three stable states in accordance with an application voltage and has a light transmittance with a hysteresis sufficient to a dynamic drive in accordance with increase or decrease in the application voltage in a predetermined voltage range, and said scanning drive means produces said first combination signal as a signal running to an alternating-current-like variation from a voltage below a reference voltage in a predetermined one polarity voltage range to a voltage above said reference voltage and produces said second combination signal as a signal which does not exceed said reference voltage in said predetermined one polarity voltage range, and supplies a direct-current combination signal between the n striped line electrodes and the m striped column electrodes after the supply of said first or second combination signal thereto.

In accordance with the present invention, there is further provided a matrix type liquid crystal display apparatus comprising: a liquid crystal cell having first and second electrode substrates disposed to be parallel to each other, said first and second electrode substrates including n striped line electrodes and m striped column electrodes, respectively, which face to meet at right angles each other, a ferroelectric liquid crystal being put in between said first and second electrode substrates so as to form n by m indication picture elements; and drive control means arranged to perform a line sequential scanning system which successively supplies a scanning signal to the n striped line electrodes and simultaneously supplies a light or dark data signal in parallel to the m striped column electrodes; wherein said ferroelectric liquid crystal varies a first stable state to a second stable state or said second stable state to said first stable state in accordance with increase or decrease in an application voltage in a predetermined one polarity voltage range and shows a transmission light quantity-to-voltage characteristic with a hysteresis which increases or decreases the transmission light quantity of said ferroelectric liquid crystal in accordance with the increase or decrease in the application voltage, and further varies from said first stable state to a third stable state or said third stable state to said first stable state in accordance with increase or decrease of the application voltage in a reversed polarity voltage range and shows a transmission light quantity-to-voltage characteristic with a hysteresis which increases or decreases the transmission light quantity in accordance therewith, and said drive control means, for a first period in the line sequential scanning, produces a combination signal of said scanning signal and said light data signal so as to have a waveform including 0 level and a level more than that of a saturation voltage for the variation from said first stable state to said second stable state and produces a combination signal of said scanning signal and said dark data signal so as to have a waveform including 0 level and a level less than that of a saturation voltage for the variation from said first stable state to said second stable state and supplies, after the supply of said combination signals, a signal with a waveform including a level lower than that of a threshold voltage for the variation from said first stable state to said second stable state and higher than that of a threshold voltage from said second stable state to said first stable state, and further for a second period, produces a combination signal of said scanning signal and said light data signal so as to have a waveform including 0 level and a level more than that of a saturation voltage for the variation from said first stable state to said third stable state and produces a combination signal of said scanning signal and said dark data signal so as to have a waveform including 0 level and a level less than that of a saturation voltage for the variation from said first stable state to said third stable state and supplies, after the supply of said combination signals, a signal with a waveform including a level lower than that of a threshold voltage for the variation from said first stable state to said third stable state and higher than that of a threshold voltage from said third stable state to said first stable state.

In accordance with the present invention, there is still further provided a liquid crystal orientation control method for a liquid crystal electro-optic apparatus which includes first and second electrode substrates which are in spaced relation to each other and between which is put a ferroelectric liquid crystal showing a first stable molecular orientation state on field-free, a second stable molecular orientation state different from said first stable molecular orientation state with respect to one field direction on application of an electric field, and a third stable molecular orientation state different from said first and second stable molecular orientation states with respect to the other field direction, said method comprising the steps of rapidly said ferroelectric liquid crystal from an isotropic liquid phase up to a ferroelectric smectic phase and then heating said ferroelectric liquid crystal up to a smectic A phase and further applying an alternating-current voltage between said first and second electrode substrates during the heating or after the heating.

BRIEF DESCRIPTION OF THE DRAWINGS

The object and features of the present invention will become more readily apparent from the following detailed description of the preferred embodiments taken in conjunction with the accompanying drawings in which:

FIG. 18 is an illustration for describing signals applied to the liquid crystal cell;

FIGS. 25 and 26 shows signal waveforms for describing the operation of the FIG. 20 apparatus;

FIG. 27 shows timings of signals to be applied to the liquid crystal cell;

FIG. 29 is a signal waveform diagram for describing the operation of the FIG. 20 apparatus;

DETAILED DESCRIPTION OF THE INVENTION

Figure 1:
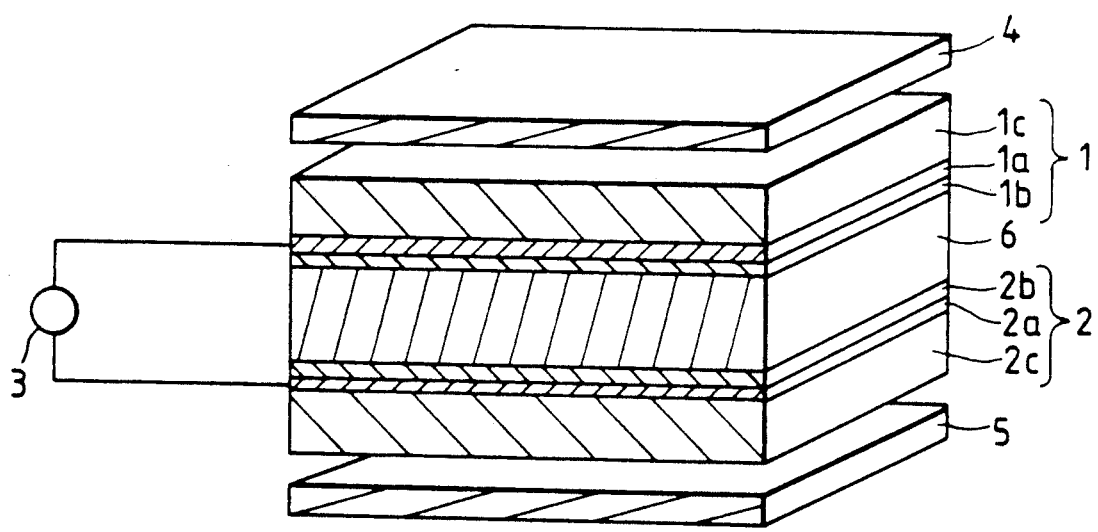
FIG. 1 is a perspective view showing an arrangement of a liquid crystal electro-optic apparatus according to an embodiment of the present invention.

Referring now to FIG. 1, there is illustrated a structure of a liquid crystal electro-optic apparatus according to an embodiment of the present invention. In FIG. 1, between two electrode substrates 1, 2 arranged to be parallel to each other and spaced by 2 micrometers (for example) from each other is sealably put a ferroelectric liquid crystal material 6 having a spontaneous polarization of at least 50 nC/cm$^2$. As the ferroelectric liquid crystal material 6 can be used a liquid crystal (TFHPOBC) having the following structural formula.

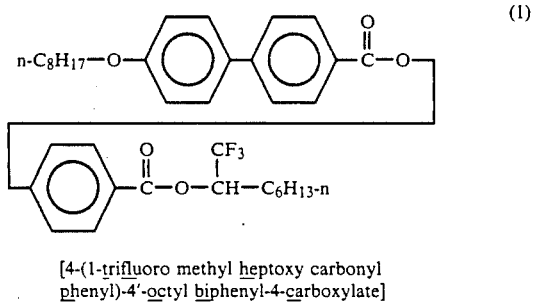

[4-(1-trifluoro methyl heptoxy carbonyl phenyl)-4'-octyl biphenyl-4-carboxylate]

When the phase transition of this compound is measured by means of the differential thermal analysis (DSC) and observation of the texture under a polarizing microscope, the result is as illustrated at No. 7 of Table 6, where Cry represents a crystal phase, S*$_{(3)}$ denotes a chiral smectic C phase (three states), S*c designates a chiral smectic C phase (two states), S$_A$ depicts a smectic A phase and Iso is an isotropic liquid phase.

Figure 19A:
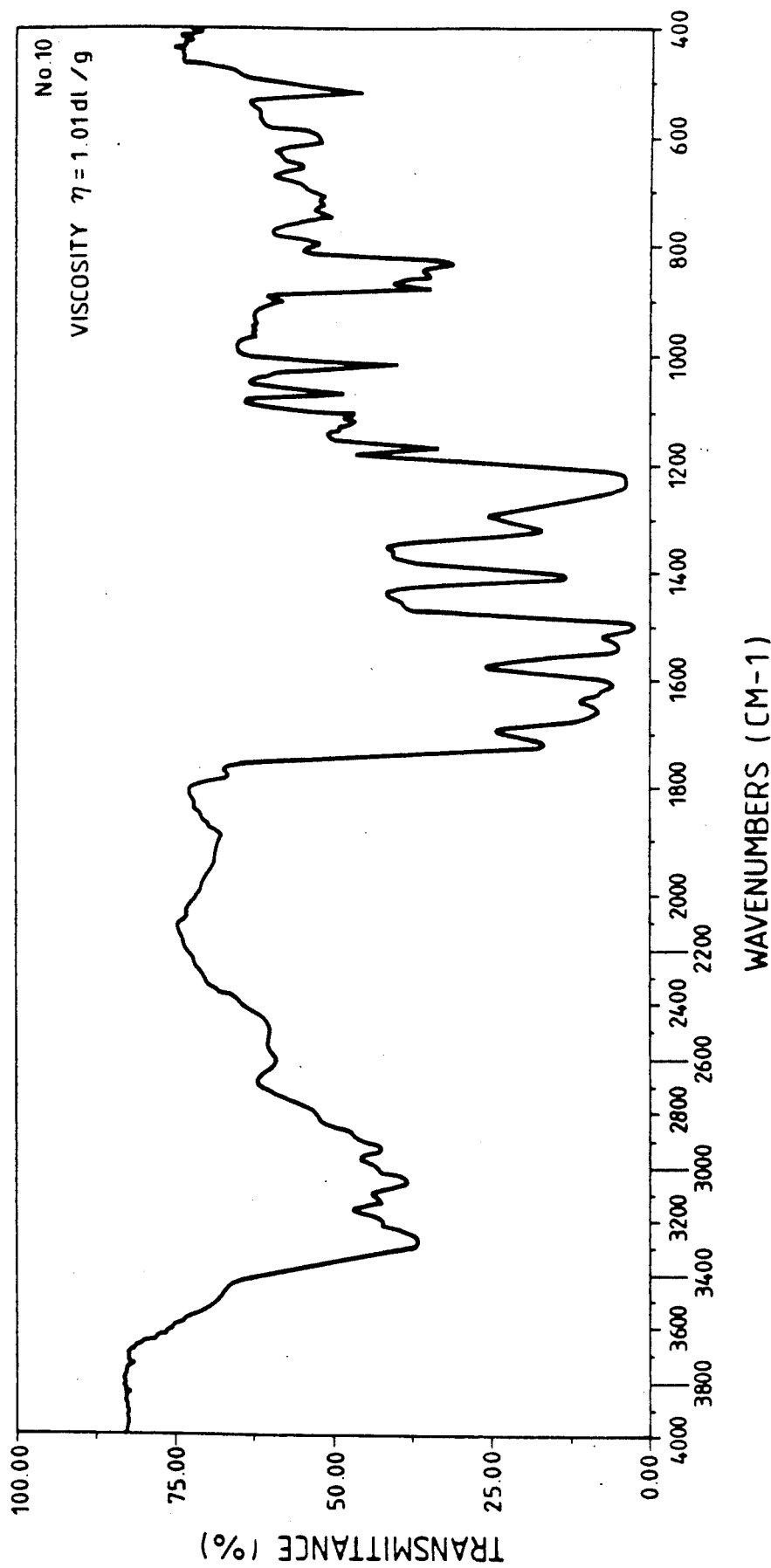
FIGS. 19A to 19C are graphic diagrams showing relation between the transmittance factor and the wavenumber.
Figure 19B:
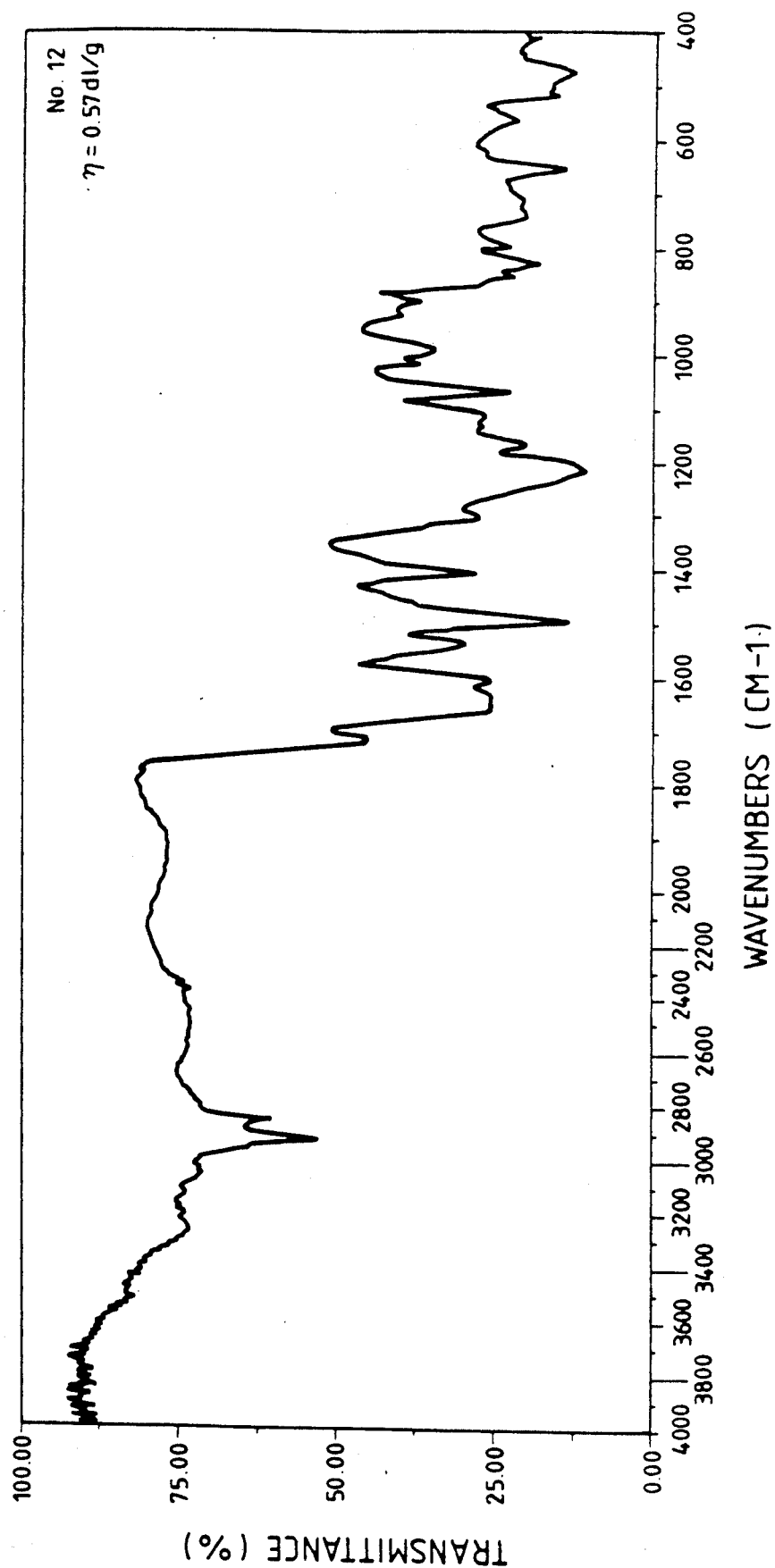
Figure 19C:
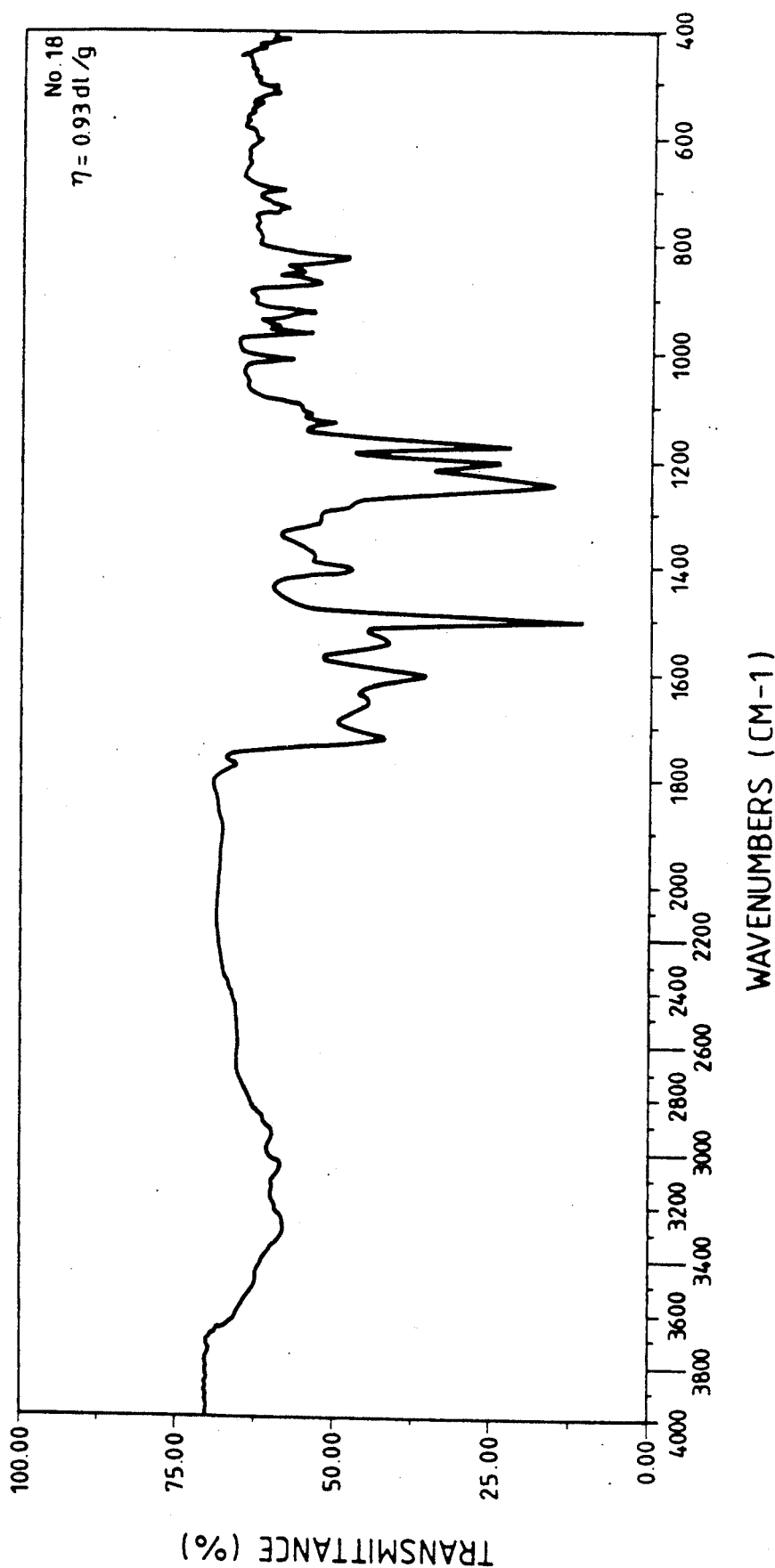

The electrode substrate 1, as shown in FIG. 1, comprises an electrode 1a constructed by a transparent conductive film made of an indium oxide, a stannous oxide or the like which electrode 1a is disposed along the inner surface of a transparent base 1c made of a transparent glass or a transparent resin. Another electrode substrate 2 has the same structure as the electrode substrate 1. On the inner surfaces of the transparent electrodes 1a and 2a, being conductive films, are disposed orientation films 1b and 2b, being polymer films, for which an orientation process is made to cause the liquid crystal molecules to be parallel to the substrates. For example, as the orientation films for achieving a normal orientation (three states) can be used some (marked with "Good") of polyimide resins or polyamide resins shown in Tables 1 to 4. In terms of the orientation films indicated at Nos. 10, 12 in Table 3 and at No. 18 in FIG. 5, IR charts (including viscosity) are illustrated in FIGS. 19A to 19B. In addition, it is also appropriate to apply, for the orientation of the liquid crystal, generally known for rubbing process to the electrode substrates, oblique depositing of a silicon oxide or the like to the surfaces, process by a surface active agent and others.

Figure 2A:
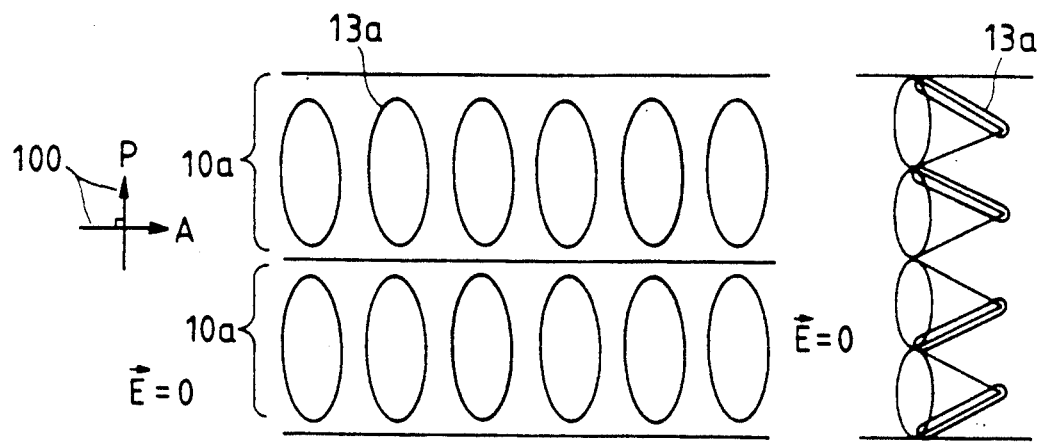
FIG. 2A to 2C illustrations for describing the orientation states of liquid crystal molecules in the FIG. 1 apparatus.

The electrode substrates 1 and 2 are combined to be parallel to each other so that the liquid crystal is arranged in one direction. Thereafter, the ferroelectric liquid crystal material expressed by the above-mentioned formula (1) is heated so as to become an isotropic phase which is in turn injected in between the electrode substrates 1 and 2 before the entire liquid crystal cell is slowly cooled in units of 0.1 to 1.0° C. per minute up to the chiral smectic C phase. The ferroelectric liquid crystal molecules 13a which result in becoming the chiral smectic C phase so that the cooling molecules are oriented as shown in FIG. 2A because of a large spontaneous polarization of the liquid crystal molecule itself and the order of the liquid crystal. Here, the polarizing axes of polarizing plates 4 and 5 being provided at the outsides of the electrode substrates 1 and 2 are arranged to be perpendicular thereto. Furthermore, a polarizer (P) of the polarizing plate makes an angle of 0° (180°) with respect to the direction of the long axis of the liquid crystal molecule under the field-free condition. To the transparent electrodes 1a and 2a are connected an external power source 3 including a drive circuit which applies to the liquid crystal a voltage waveform which will be described hereinafter.

Figure 2B:
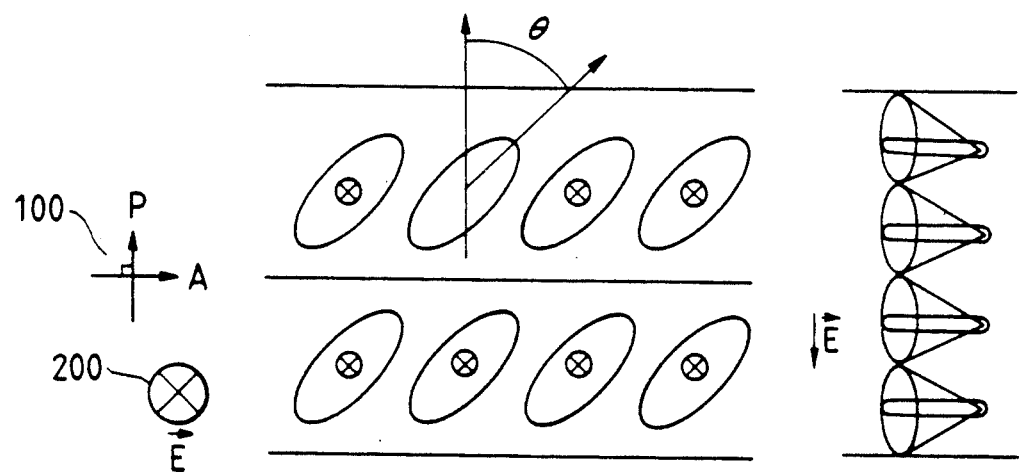
Figure 2C:
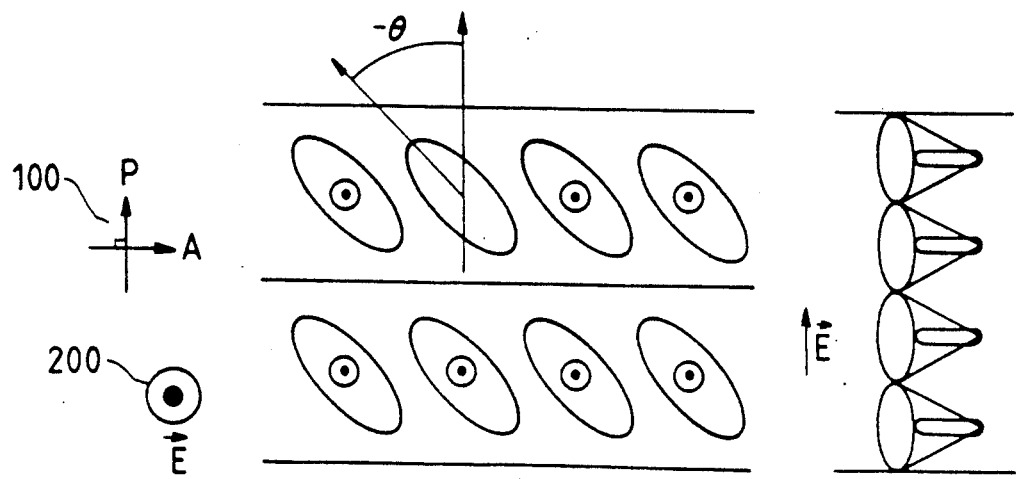

Operation of the apparatus with the above-mentioned arrangement will be described with reference to FIGS. 2A, 2B and 2C where the respective left side illustrations are viewed from the front of the apparatus and the respective right side illustrations are of the side of the apparatus. On the field-free, the liquid crystal molecules 13a are arranged along the normal line of the smectic layer 10a to assume an orientation state illustrated in FIG. 2A. In this instance, the spontaneous polarization of the liquid crystal molecule is directed in the left direction (or right direction) at the upper half of this apparatus (cell) and in the right direction (or left direction) at the lower half of this apparatus. That is, if a description is made in terms of a cone on which the ferroelectric liquid crystal molecule moves (right illustration of FIG. 2A), the molecule is positioned above (or below) the cone in the range of the upper half of the cell and below (or above) the cone in the range of the lower half of the cell, and the multiplication value of the spontaneous polarizations become zero summarizing along the directions of thickness of the cell. Secondly, in response to application of an electric field enough to move (or rotate) the liquid crystal from the front surface to the rear surface of the paper sheet, the direction 10b of the spontaneous polarization of the liquid crystal molecule is coincident with the direction 200 of the electric field. Thus, the liquid crystal molecules are reoriented as shown in FIG. 2B. At this time, the liquid crystal molecule makes a tilt angle $\theta$ with respect to the normal line of the layer. For instance, the tilt angle of the ferroelectric liquid crystal material expressed by the above-mentioned formula (1) is from 10° to 31° in the range of temperature from 70° to 100°. On the other hand, in response to the application of an electric field sufficient to rotation of the liquid crystal molecule from the rear side to the front side of the paper sheet, the direction 10b of the spontaneous polarization is coincident with the direction 200 of the electric field, thereby resulting in the liquid crystal molecule being reoriented as shown in FIG. 2C. In this case, the liquid crystal molecule makes a tilt angle of $-\theta$ with respect to the layer normal line. Accordingly, the optical axis of the liquid crystal can be changed to take three states in accordance with the polarity of the magnitude of the applied electric field.

Such three states of the liquid crystal can be employed for an electro-optic apparatus with it being interposed between a pair of polarizing plates 4 and 5. For example, as shown in FIG. 2A, the polarizer (P) of the polarizing plate is provided so as to make an angle of 0° with respect to the directions of the long axis of the liquid crystal molecule, and in this state, after passing through the polarizer (P), the linear polarization penetrates the liquid crystal, while it is cut off by an analyzer (A), thereby entering in a dark state. Furthermore, in the case of FIG. 2B in which an electric field is applied from the front side to the rear side of the paper sheet, light passing through the polarizer (P) generally results in an elliptically polarized light due to the double refraction effect of the liquid crystal. The component of this light penetrates the analyzer (A), thereby entering in a light state. In addition, in the case of FIG. 2C in which the electric field is applied from the rear side to the front side of the paper sheet, the light passing through the polarizer generally becomes an elliptically polarized light due to the birefringence effect of the liquid crystal. Similarly, the component of this light penetrates the analyzer (A), thereby resulting in a light state.

Figure 3:
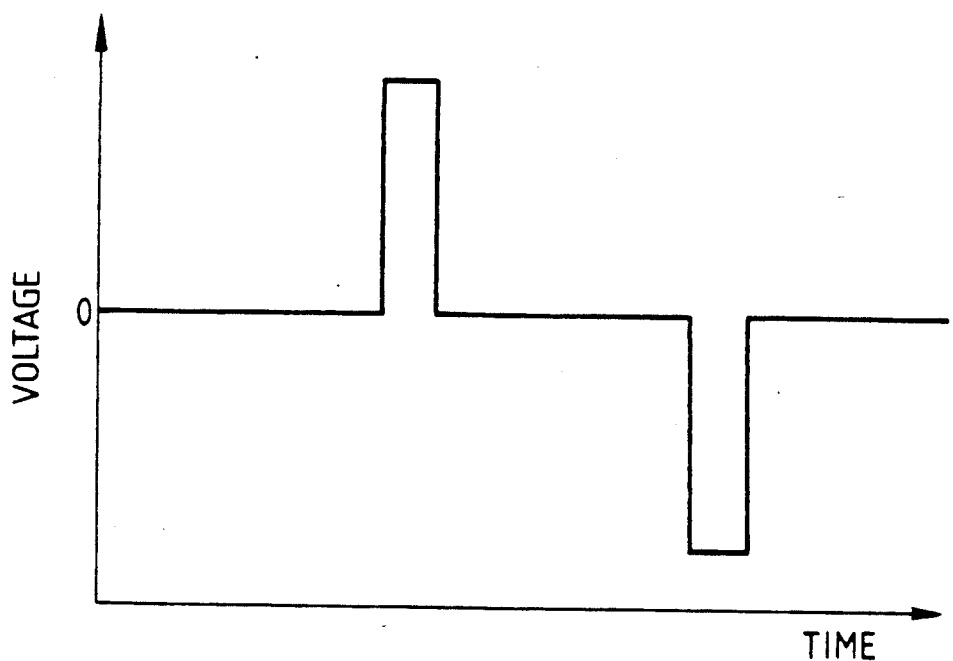
FIG. 3 is a voltage waveform diagram showing the relation between the voltage and the transmittance factor in the FIG. 2 liquid crystal.
Figure 4:
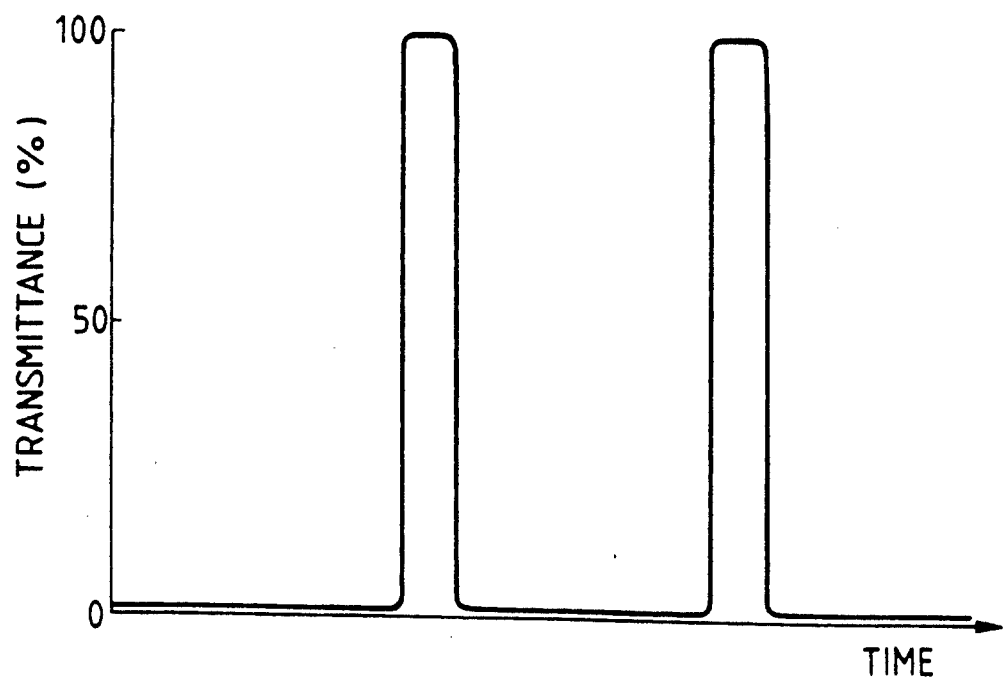
FIG. 4 shows a variation of the transmittance factor when the FIG. 3 voltage is applied to the FIG. 2 liquid crystal.
Figure 5:
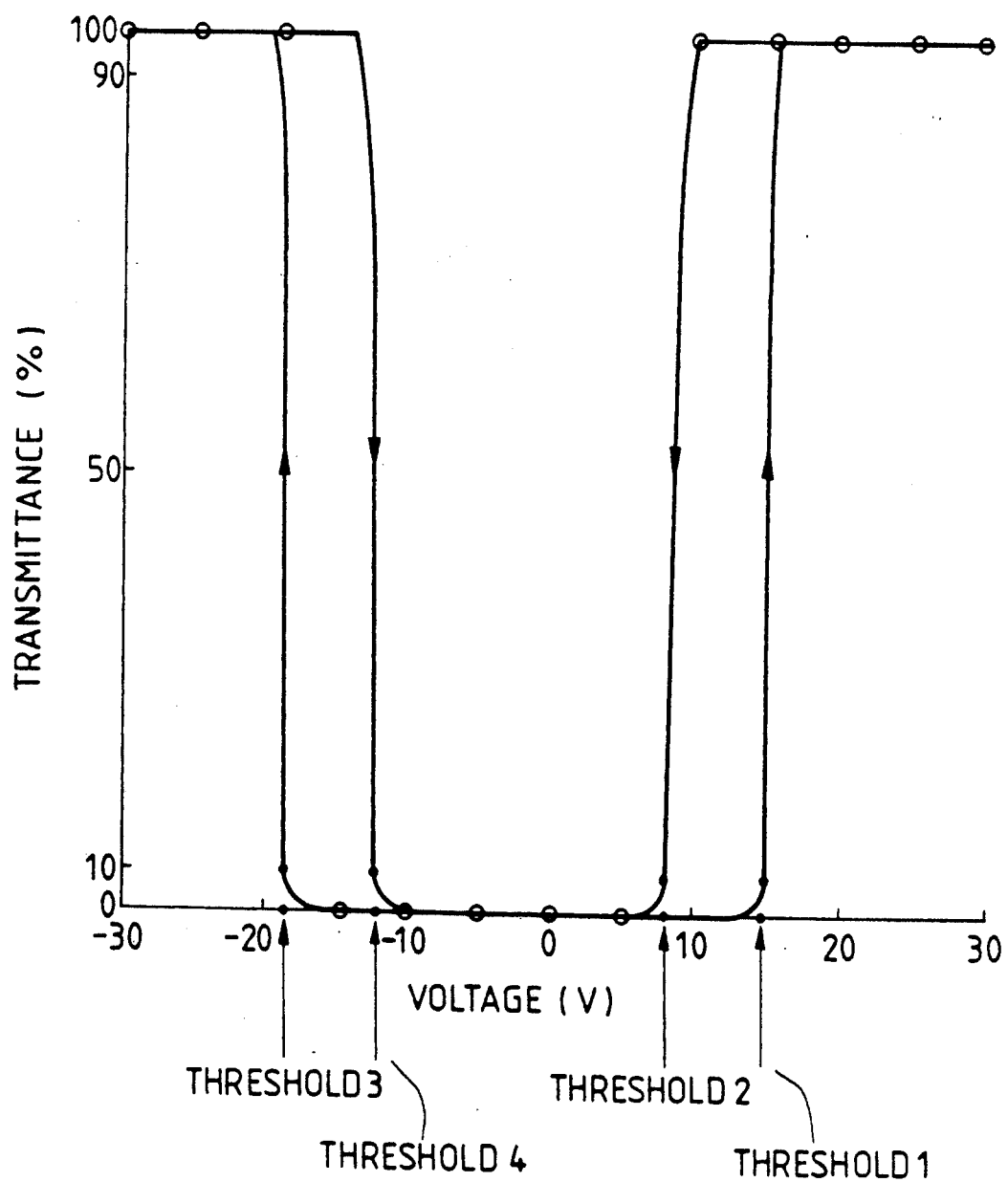
FIG. 5 is an illustration showing the relation between the voltage and the transmittance factor in the FIG. 2 liquid crystal.

A description will be given hereinbelow in terms of a voltage-to-transmittance curve in this apparatus. The polarization axis of the polarizer (P) is disposed to make an angle of 0° with respect to the direction of the long axis of the molecule at the time of the field-free and a threshold is determined as a voltage developed when the brightness is relatively changed 10%. FIG. 3 shows a voltage waveform used for measurement where the width of the applied pulse is i msec and the application of the pulse is made at a regular interval. FIG. 4 shows an optical response at this time. While the state is dark on field-free, the state becomes light (bright) during the application of an electric field. FIG. 5 is an illustration made by plotting light transmittance factors on the basis of voltage during application of the electric field. With the voltage being increased from 0(V), when the voltage exceeds the threshold 1, the state is rapidly varied from dark to light and then becomes settles. Furthermore, with the voltage being decreased, the state is varied from light to dark at a threshold 2 after passing through the threshold 1 at the time of the voltage increasing. In addition, in accordance with further decrease in voltage, the state is varied from dark to light at a threshold 3 and then becomes settled. Thereafter, when the voltage is increased, the state is varied from light to dark at a threshold 4 after passing through the threshold 3 at the time of decrease in voltage. Thus, it is clear that there are present distinct thresholds and hysteresis. As illustrated in FIG. 5, when applying an electric field between liens and columns, the ferroelectric liquid crystal has two liquid-crystal-molecule stable states in accordance with the directions (plus and minus directions) of the electric field, and under the condition of no application of an electric field, it has a third stable state. Moreover, the ferroelectric liquid crystal shows a hysteresis characteristic at the time of variation of the aforementioned stable states.

Figure 6:
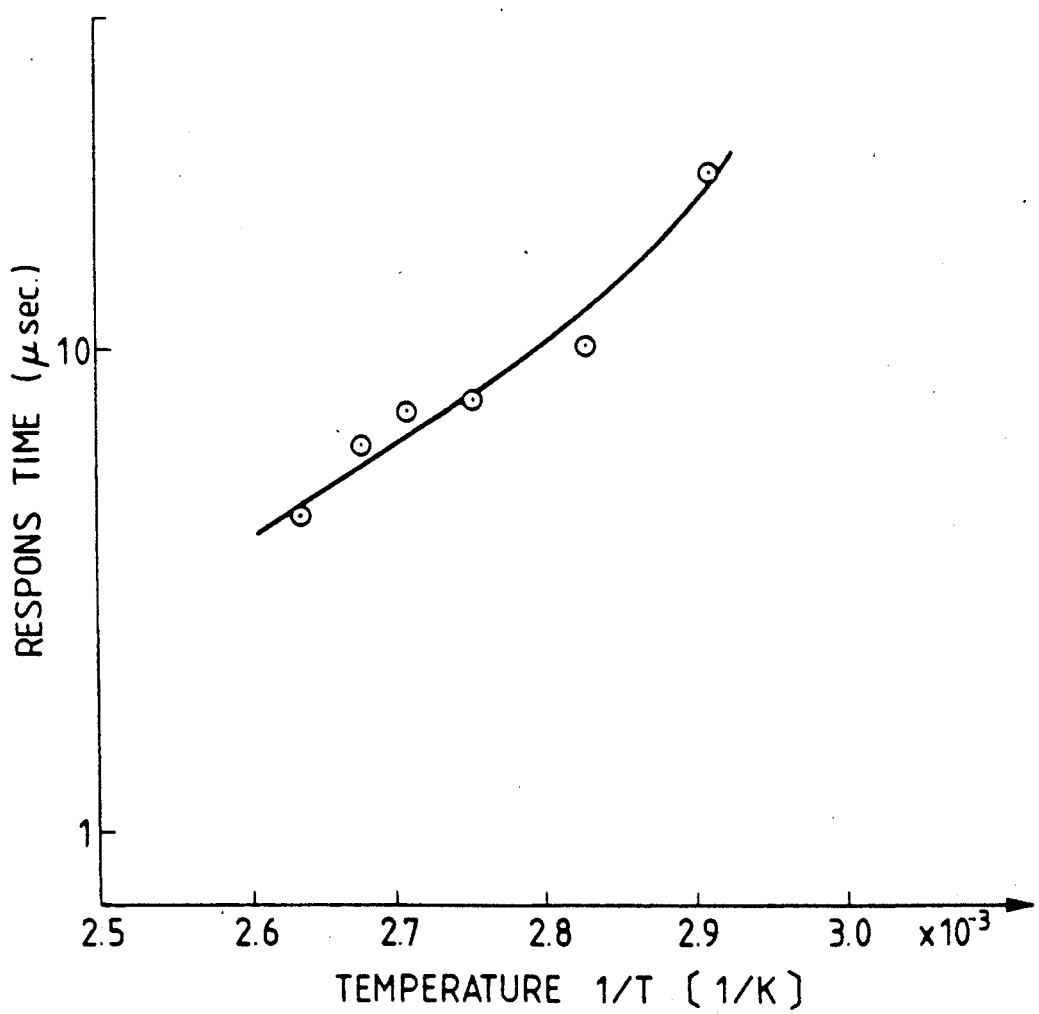
FIG. 6 is a characteristic diagram showing the relation between the response time and the temperature in the FIG. 2 liquid crystal.

A measurement has been carried out in terms of temperature dependence of response speed of this apparatus using the ferroelectric liquid crystal material expressed by the above-mentioned formula (1). The response time is defined as a time taken until the light transmittance factor is varied up to 90% after application of a voltage. The voltage waveform to be measured is a square wave and the voltage is 30 (V). FIG. 6 shows the temperature dependence of the speed of the response which is high response time in a range of microseconds.

Furthermore, with respect to the orientation of the liquid crystal molecule, the twist state observed in a conventional ferroelectric liquid crystal on field-free is not viewed and only one stable orientating state is observed. Even if it is once cooled so as to enter in a crystal state to obtain a chiral smectic C phase, it is possible to reproduce the orientation of the previous chiral smectic C phase.

Although in the above-described embodiment the polarizer (P) of the polarizing plate is arranged to make an angle of 0° (180°) with respect to the direction of the long axis of the molecule, it is also appropriate that the angle is 22.5°, 45°, 90° and others. For example, in the case of an angle of 22.5°, the dark state is taken in one direction of the electric field and the light state is taken in another direction of the electric field, and field-free causes the gray scaled state.

Figure 7:
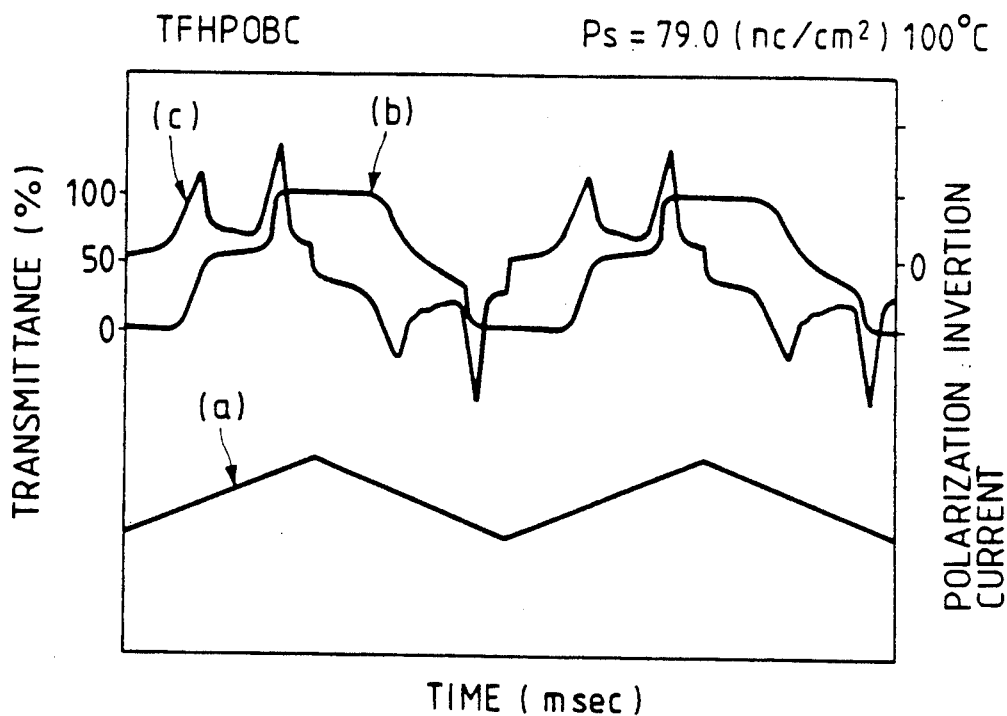
FIGS. 7 and 8 show the transmittance factor and the polarization current with respect to a triangular wave voltage at different temperatures.
Figure 8:
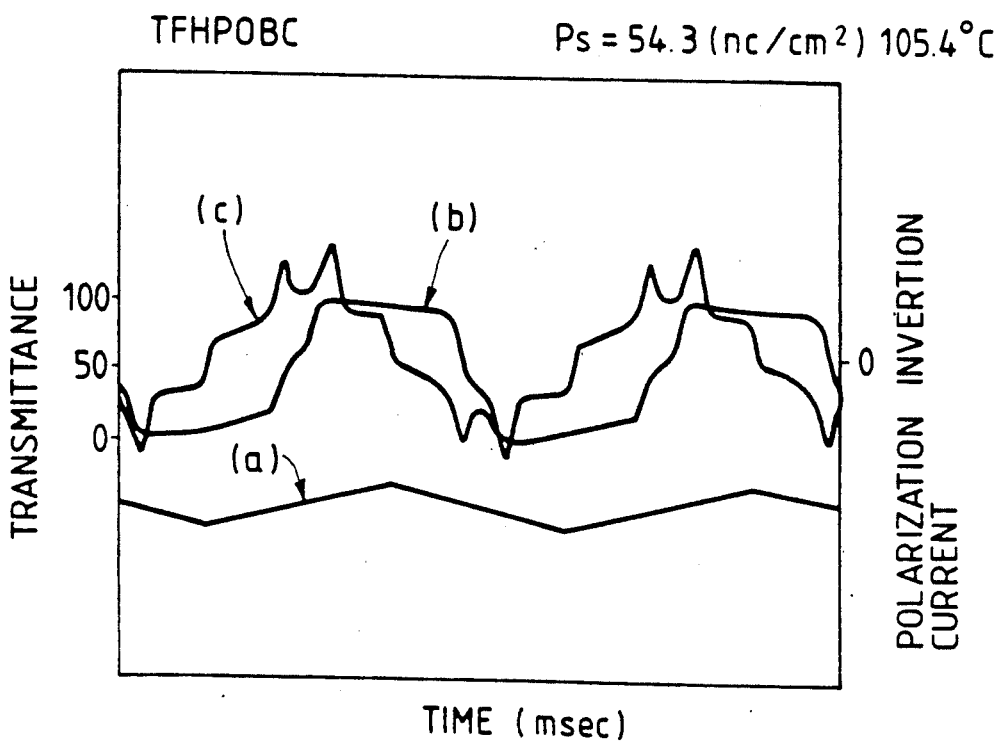

With this arrangement (22.5°), the molecular orientation of three states has been confirmed by means of the transmittance factor for a triangular wave voltage and a polarization current. The voltage waveform used in the measurement is a triangular wave voltage of ±30 (V) and 10 (Hz). FIGS. 7 and 8 show the transmittance factor and polarization inversion current at two temperatures on application of this waveform. In FIGS. 7 and 8, (a) depicts an applied voltage waveform, (b) denotes a transmittance factor and (c) represents a polarization current waveform. With respect to (b), the dark state is clearly taken in the minus region, the gray scaled light state is clearly taken in the zero volt region and the light state is distinctly taken in the pulse region. On the other hand, with respect to (c), the respective peaks of the polarization current waveforms appear in correspondence with the aforementioned state variations.

A description will be made hereinbelow in terms of a matrix type indication apparatus using a liquid crystal having a hysteresis. The matrix type liquid crystal display apparatus as shown in FIG. 9 is equipped with a matrix type liquid crystal cell 10 which, as shown in FIG. 10, comprises a pair of electrode substrates 11 and 12 provided to be in parallel to each other with a gap of 1 to 10 micrometers (for example), and between these electrode substrates 11 and 12 is sealed a trifluorooctoxy carbonyl phenyl -4'- octyl biphenyl -4- carboxylate (which will be referred to as TFOPOBC) 13, and at the outsides of the electrode substrates 11 and 12 are disposed polarizing plates 14 and 15 whose polarizing axes are normal to the electrode substrates 14 and 15.

Furthermore, the respective crossing portions between respective line electrodes X1 to Xn and respective column electrodes Y1 to Ym, together with the respective ferroelectrode liquid crystal portions presented at these respective crossing portions, make up picture elements (1,1), ..., (1, m), (2, 1), ..., (n, m). The polarizing axes of the polarizing plates 14 and 15 are determined in connection with the molecule orientation axis of the ferroelectric liquid crystal. That is, when an appropriate voltage of - polarity is applied between the line electrodes and the column electrodes, with possible molecule orientation state of the ferroelectric liquid crystal, the indication picture elements assume states which can pass light (i.e., ON indication state). On the other hand, when an appropriate voltage below a threshold is applied between the line electrodes and the column electrodes, with possible molecular orientation state of the ferroelectric liquid crystal, the indication picture elements assume states that do not penetrate light (i.e., OFF indication state). Here, at the rear side of the polarizing plate 14 is provided a light source, not shown, which projects light to the same polarizing plate 14.

Figure 9:
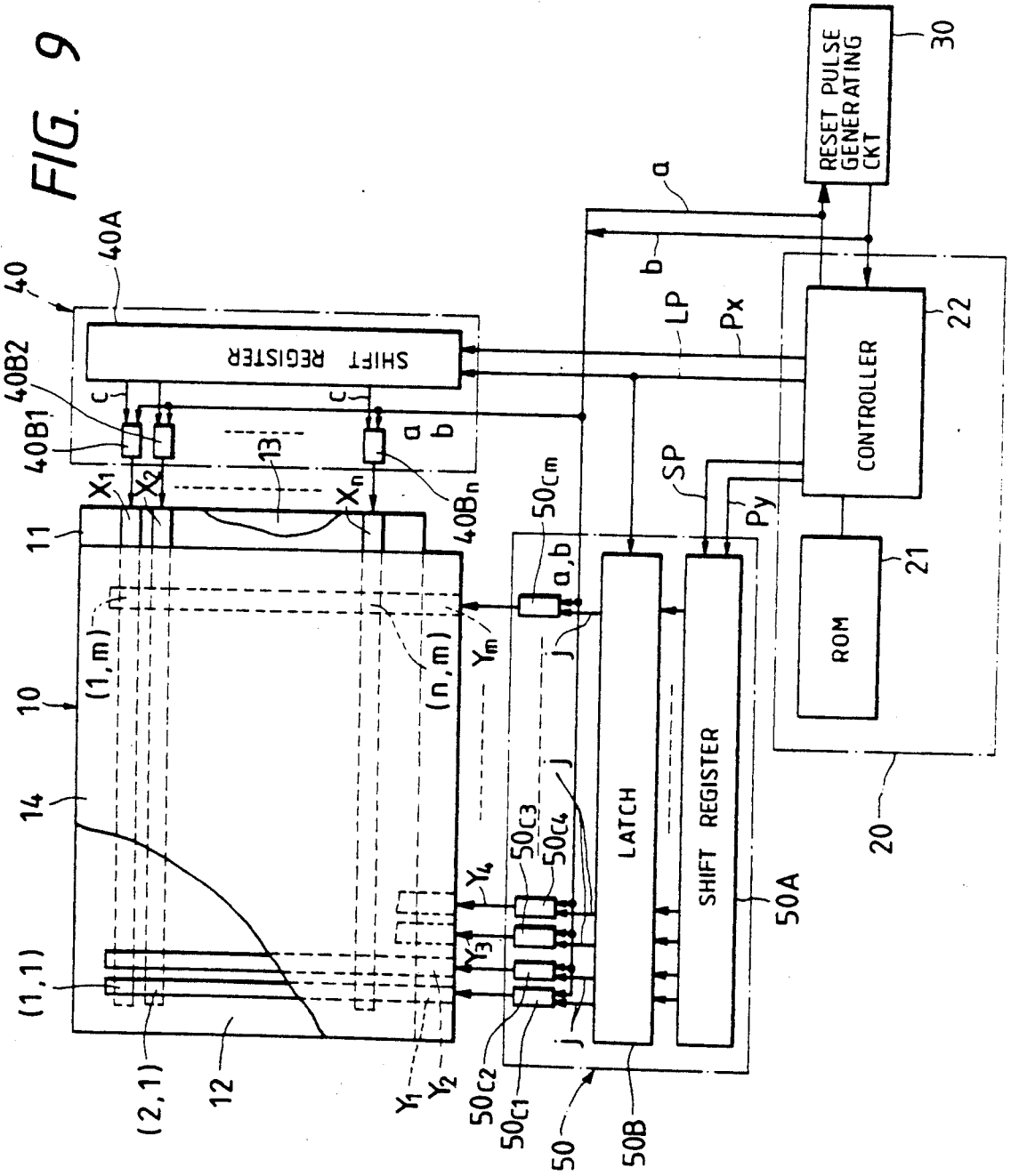
FIG. 9 shows an arrangement of the liquid crystal electro-optic apparatus according to the present invention.
Figure 10:
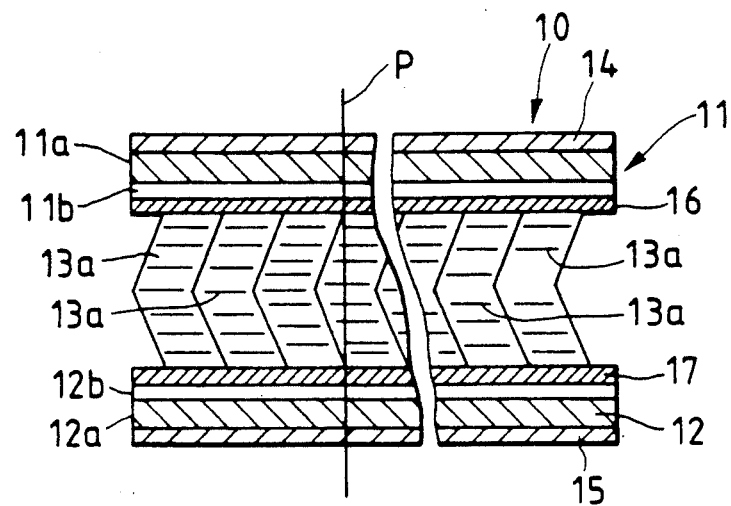
FIG. 10 is an enlarged cross-sectional view showing a liquid crystal cell of the FIG. 9 apparatus.

In addition, the liquid crystal display apparatus, as shown in FIG. 9, is provided with a line sequential scanning circuit 20, a reset pulse generating circuit 30 connected to the line sequential scanning circuit 20, the line drive circuit 40 and column drive circuit 50 being respectively coupled to the line sequential scanning circuit 20 and the reset pulse generating circuit 30. The line sequential scanning circuit 20 comprises a read-only memory (ROM) 21 and a controller 22 connected to the ROM 21. The ROM 21 is adapted to prestore indication data representing predetermined indication contents to be indicated on a liquid crystal cell 10. This indication data is composed of line electrode indication data to be inputted to any one of the respective line electrodes of the liquid crystal cell 10 and column electrode indication data to be inputted to any one of the respective column electrodes of the liquid crystal cell 10. The controller 22 successively generates a synchronous pulse LP, a frame pulse a (see FIG. 14) and a shift clock pulse SP, and successively generates a data pulse Px corresponding to the line electrode indication data of the ROM 21 and further a data pulse Py corresponding to the column electrode indication data of the ROM 21.

The reset pulse generating circuit 30 comprises a monostable multivibrator IC (for example, 74HC123) and so on for generating, with a low level, a reset pulse b having a desirable pulse width in synchronism with the rising of the frame pulse a generated from the controller 22. Furthermore, this reset pulse b is outputted as a wait signal to the controller 22 and inserted into a normal line sequential scanning timing. The controller 22 stops all of the functions while the reset pulse is in the low level state and starts to generate signals in response to the reset pulse b entering in the high level state.

An arrangement of the liquid crystal cell will hereinbelow be described in detail. The electrode substrate 11, as shown in FIG. 10, is constructed such that transparent conductive films 11b made of indium oxide or tin oxide are protrusively formed along the inner surface of a transparent glass plate 11a so as to be spaced up and down and be parallel to each other in the left and right directions to form n line electrodes X1, X2, ..., Xn. Similarly, the electrode substrate 12, as shown in FIG. 10, is constructed such that transparent conductive films 12b made of indium oxide or tin oxide are arranged along the inner surface of a transparent glass plate 12a so as to be spaced from each other in the left and right directions to form m column electrodes Y1, Y2, ..., Y which are protrusively formed to be normal to the n line electrodes X1, X2, ..., Xn. In addition, on the inner surfaces of the conductive films 11b and 12b are provided polymer films 16 and 17 made of polyimide, poly amide or the like. Surfaces of the polymer films 16 and 17 is rubbing-processed so that the ferroelectric liquid crystal molecules 13a are arranged to be parallel to the upper substrate and lower substrate and to be perpendicular to the normal line P. It is also appropriate to, in place of the polymer films 16 and 17, use thin films such as oblique deposition films of silicon oxide or the one like a single crystal.

For sealing the ferroelectric liquid crystal 13 into the liquid crystal cell 10, in the first instance, the rubbing direction of the high-molecular films 16 and 17 is arranged so as to pass through the center between the respective inner surfaces of both the conductive films 11b and 12b, and both the electrode substrates 11 and 12 are combined to be parallel to a center line parallel to both the conductive films 11b and 12b (i.e., perpendicular to the normal line P). Thereafter, the ferroelectric liquid crystal is heated to become an isotropic liquid phase, which is in turn injected in between both the electrode substrates 11 and 12 by means of the capillary phenomenon and the entire liquid crystal cell 10 is gradually cooled by 0.1 to 1.0° C. per minute so that the ferroelectric liquid crystal 13 is cooled to become the smectic C phase.

Figure 11:
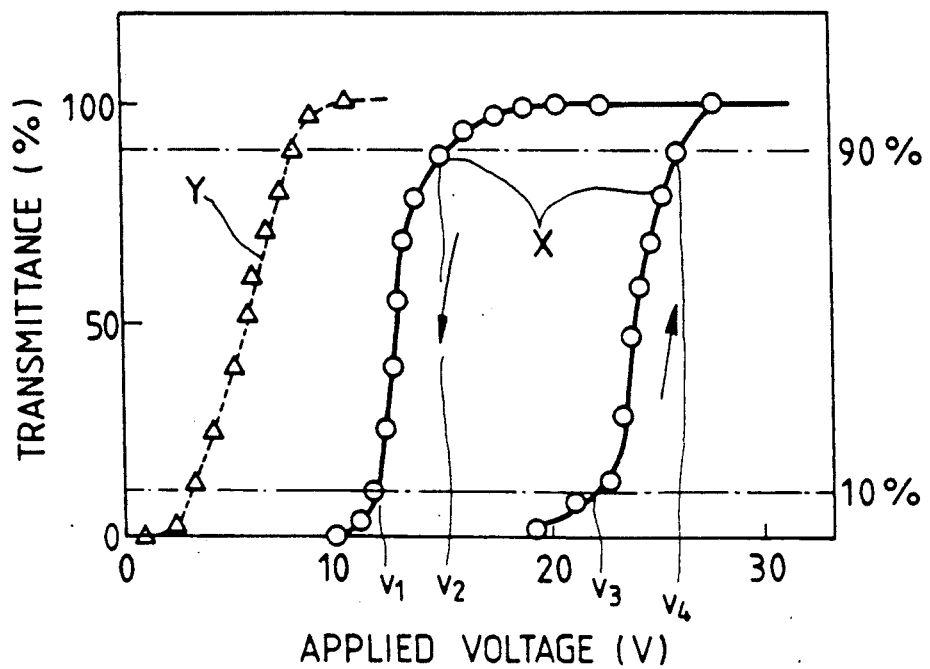
FIG. 11 is an illustration for describing the relation between the transmittance factor and the applied voltage in a ferroelectric liquid crystal.

As a result of such cooling, the ferroelectric liquid crystal 13, being a smectic layer configuration, is oriented along the rubbing direction of the polymer films 16 and 17, and as shown in FIG. 11, the smectic layer is bent so as to be "<"-shaped. At this time, the ferroelectric liquid crystal molecule 13a, as shown in FIG. 2A, is oriented so that the spontaneous polarization is directed to the left direction (right direction) at the upper half of the liquid crystal cell 10 and it is directed to the right direction (left direction) at the lower half thereof. That is, if the movement of the liquid crystal molecule 13a is expressed on a smectic cone, the liquid crystal molecule 13a is positioned upwardly at the upper half of the liquid crystal cell 10 and positioned downwardly at the lower half thereof and divided at the bending portion of the "<"-configuration. This first state becomes a quenching stable state when observation is made under a crossed-Nicol.

In the liquid crystal cell 10 arranged thus, when an electric field is applied between the electrode substrates 11 and 12 from the lower side of the paper sheet to the upper side thereof, in the oriented liquid crystal molecule 13a, the torque of the product of the electric field E and the spontaneous polarization Ps competes with the elastic torque as shown in FIG. 2A. When the electric field E exceeds a given threshold, the orientation state of the liquid crystal molecule 13a results in the spontaneous polarization being entirely directed upwardly as shown in FIG. 2B (second state). That is, if viewed with the smectic cone, it is varied so as to be positioned at the right side of the cone.

Now, when the crossed polarization axes of the polarizing plate are arranged as shown in FIG. 2A, the light transmittance intensity I is given in accordance with the following equation.

$$I = I_o \sin^2 4\theta \cdot \sin^2(\pi \Delta n d / \lambda) \qquad (2)$$

Here, Io represents a constant substantially determined in accordance with the transmittance factor of the polarizing plate, $\theta$ designates a tilt angle which depends upon temperature and which is 11 to 31 degrees in the case of TFOPOBC, $\Delta n$ denotes the difference between the refraction factors of the liquid crystal for ordinary light and extraordinary light, d depicts a cell gap, and $\lambda$ is a wavelength. It is seen from the above-mentioned equation (2) that the light transmittance factor in the second state enters in the light state.

Furthermore, in the state shown in FIG. 2A, when an electric field is applied from the front of the paper sheet to the depth thereof and exceeds a given threshold, the orientation state of the liquid crystal molecule 13a results in the spontaneous polarization being entirely directed downwardly as shown in FIG. 2C (third state). That is, if shown by the smectic cone, the molecule is varied so as to be positioned at the left side of the cone. According to the equation (2), the light transmittance factor in this third state becomes the light state.

As a result of an experiment of confirming the relation between the application voltage and the light transmittance factor on the ferroelectric liquid crystal 13 orientation-processed as described above, a hysteresis curve X can be obtained as shown in FIG. 11. That is, in variation from the first state, which is stable at the time of field-free, to the second state, which is stable, by means of application of a positive polarity voltage, the voltage by which its light transmittance factor is varied to 10% is v3 and the voltage by which it is varied to 90% is v4. Furthermore, in variation from the stable second state due to the application of the positive polarity voltage to the first state by decrease in the applied voltage, the voltage by which the light transmittance factor is 90% is v2 and the voltage by which it is 10% is v1. Thus, a hysteresis loop is formed with these voltages v1, v2, v3 and v4. Similarly, in variation from the stable first state to the third state by application of a reversed polarity voltage, it is possible to substantially obtain the same results.

On the other hand, as a result of an experiment for confirming the relation between the application voltage and the light transmittance factor on a conventional bistable (switching type) ferroelectric liquid crystal, a curve Y can be obtained as shown in FIG. 11. As easily understood by comparison between the curves X and Y, the ferroelectric liquid crystal 13 shows a hysteresis characteristic unlike the conventional ferroelectric liquid crystal.

Figure 12:
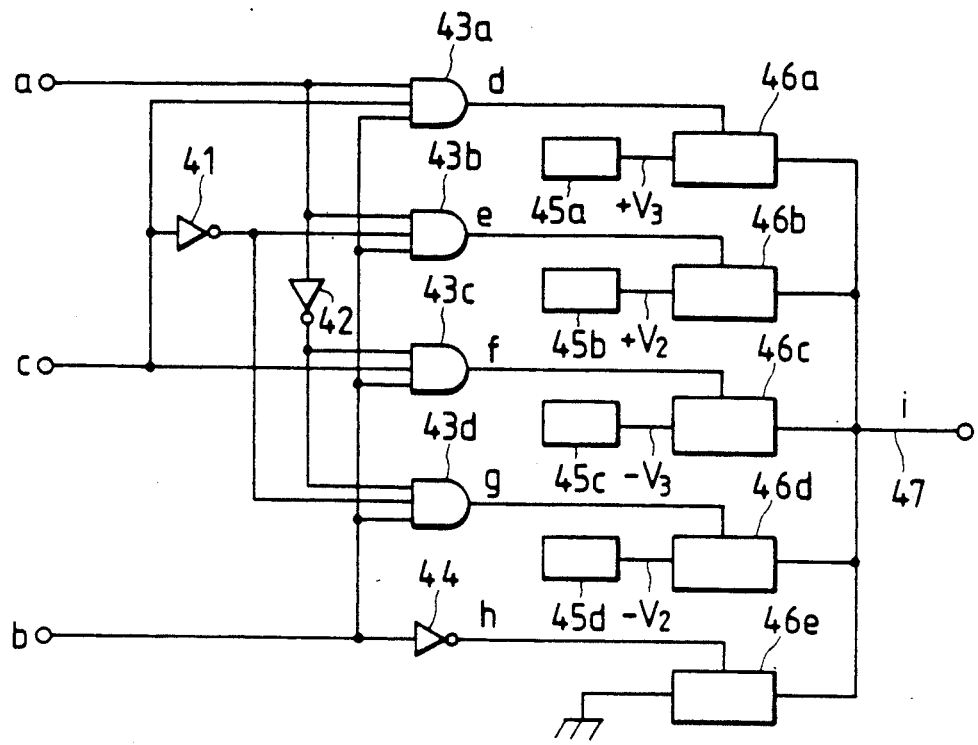
FIG. 12 shows a detailed arrangement of a logic circuit of a line drive circuit in the FIG. 9 apparatus.
Figure 13:
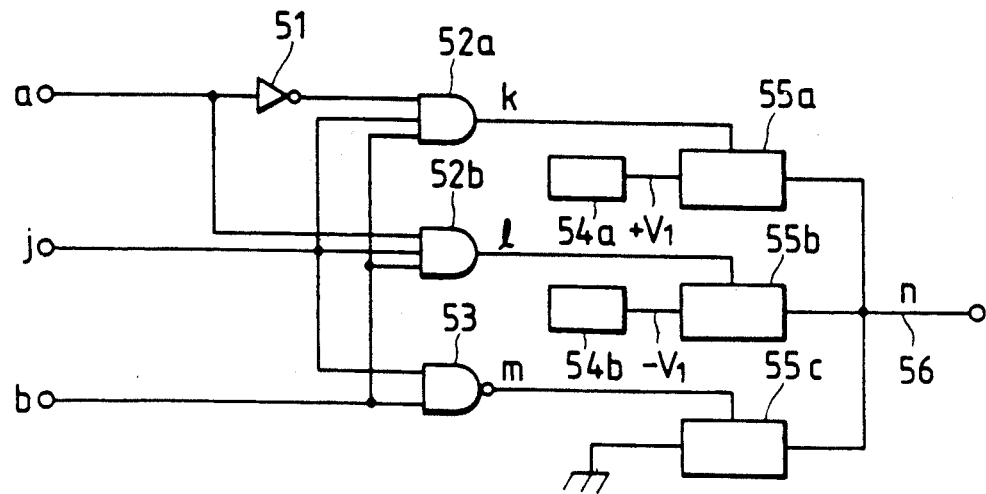
FIG. 13 shows a detailed arrangement of a logic circuit of a column drive circuit in the FIG. 9 apparatus.
Figure 14:
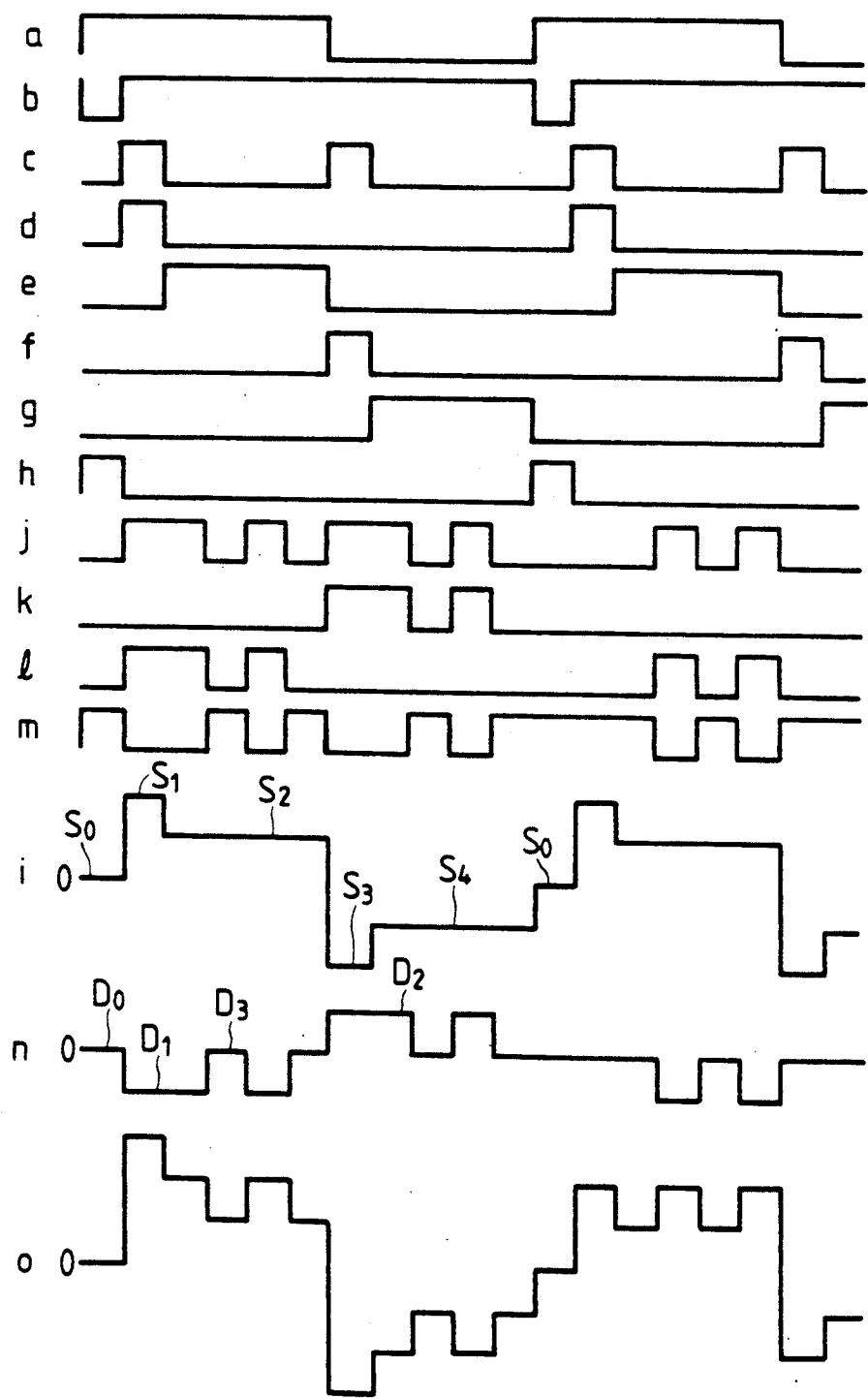
FIGS. 14 and 15 are output waveform diagrams for describing the operations of the FIGS. 12 and 13 circuits.
Figure 15:
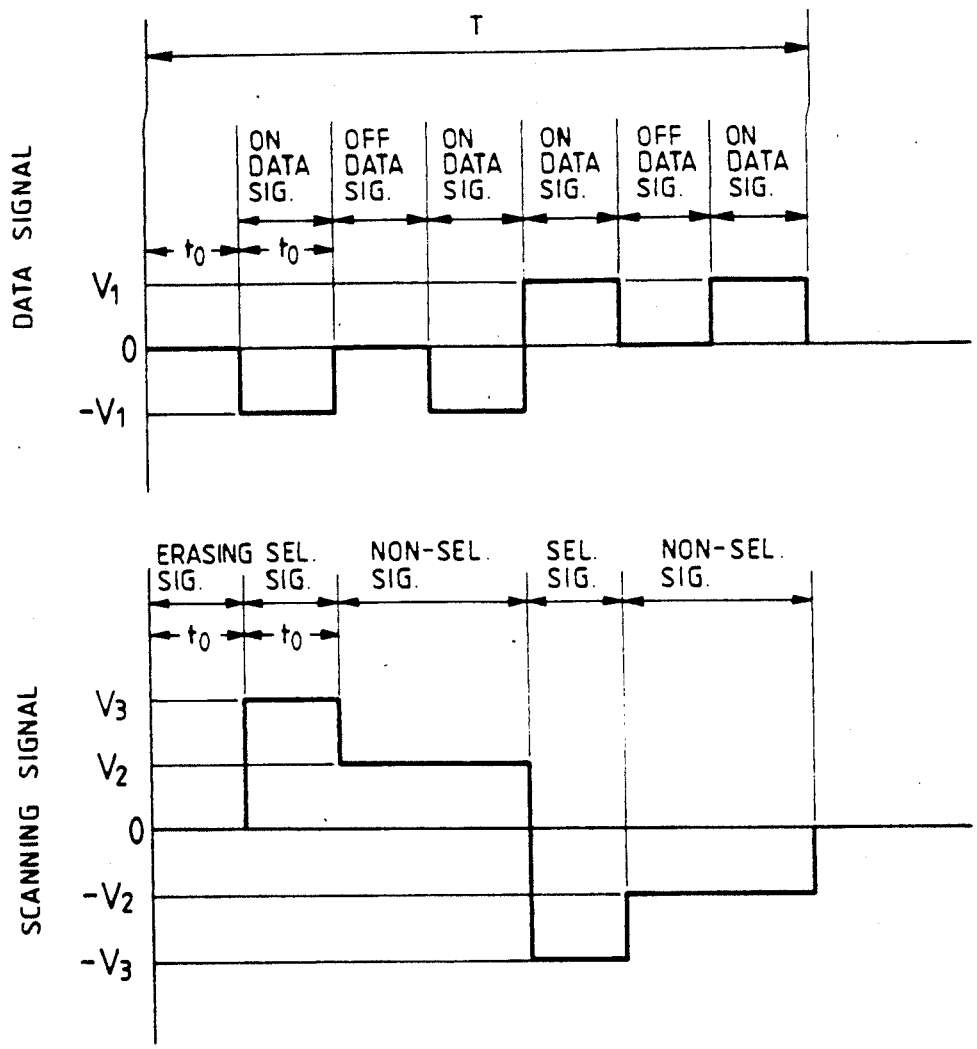

A description will be made in terms of the examples of logic circuits making up the line drive circuit and the column drive circuit shown in FIG. 9. FIG. 12 is a detailed diagram showing a logic circuit for the line drive circuit, FIG. 13 is a detailed diagram showing a logic circuit for the column drive circuit, and FIGS. 14 and 15 are output waveform illustrations for describing the operation of the logic circuit.

The line drive circuit 40, as shown in FIG. 9, comprises a shift register 40A coupled to the controller 22 and logic circuits 40B1, 40B2, ..., 40Bn coupled to the controller 22, the reset pulse generating circuit 30 and the shift register 40A. The shift register 40A successively receives, as shift pulses, the synchronous pulse LP from the controller 22 and successively shifts the data pulse Px from the controller 22 in synchronism with the respective shift pulses to produce a data pulse c which is in turn supplied to anyone of the respective logic circuits 40B1 to 40Bn.

The logic circuit 40B1, as shown in FIG. 12, is equipped with inverters 41, 42, 44, AND gates 43a, 43b, 43c, 43d, voltage stabilizers 45a, 45b, 45c, 45d, and transmission gates (voltage-level shifters)46a, 46b, 46c, 46d, 46e. The inverter 41 is coupled to the shift register 40A, the inverter 42 is connected to the controller 22 and the inverter 44 is connected to the reset pulse generating circuit 30. Furthermore, the AND gates 43a, 43b, 43c and 43d are coupled to either the shift register 40A or the inverter 41, either the controller 22 or the inverter 42, and the reset pulse generating circuit 30 As shown in FIG. 14, the AND gate 43a generates, with a high level, a gate pulse d in response to all of a data pulse c from the shift register 40A, a reset pulse b from the reset pulse generating circuit 30 and a frame pulse a from the controller 22 being in the high-level states. The AND gate 43b generates, with a high level, a gate pulse e in response to an inversion gate pulse c from the inverter 41, the reset pulse b, and the frame pulse a being respectively in the high-level states. The AND gate 43c generates, with a high level, a gate pulse f only under the conditions that the data pulse c, the reset pulse b and an inverter gate pulse a from the inverter 42 are respectively in the high-level states. The AND gates 43d generates, with, a high level, a gate pulse g only under the conditions that all of the inversion gate pulse c from the inverted 41, the inversion gate pulse a from the inverter 42 and the reset pulse b are in the high-level states. The inverter 44 inverts the reset pulse b to generate an inversion pulse h.

The transmission gate 46a is responsive to the gate pulse d from the AND gate 43a to shift the gate pulse d up to the level of (+V3) on the basis of a positive constant-voltage (+V3) from the voltage stabilizer 45a to output it as a scanning signal S1 through a common output terminal 47 of the respective transmission gates 46b, 46c and 46e to the line electrode X1 of the liquid crystal cell 10. In response to the gate pulse e from the AND gate 43b, the transmission gate 46b shifts the gate pulse e up to the level (+V2) of a positive constant-voltage to output it as a scanning signal S2 through the output terminal 47 to the line electrode X1. In response to the gate pulse f from the AND gate 43c, the transmission gate 46c shifts the gate pulse f up to the level (−V3) of a negative constant voltage to supply it as a scanning signal S3 through the output terminal 47 to the line electrode X1. When receiving the gate pulse g from the AND gate 43d, the transmission gate 46d shifts the gate pulse g up to the level (−V2) of a negative constant voltage to supply it as a scanning signal S4 through the output terminal 47 to the line electrode X1. Furthermore, the transmission gate 46e is responsive to the gate pulse h from the inverter 44 to shift it up to the zero level to supply it as a scanning signal So through the output terminal to the line electrode X1.

In this case, the scanning signal So acts as a reset signal for erasing the indication, the scanning signals S1 and S3 function as a selection signal for selecting the line electrode X1, and the scanning signals S2 and S4 serve as a non-selection signal for non-selection of the same electrode.

The remaining logic circuits 40B2 to 40Bn have the same structure as the logic circuit 40B1, each producing the respective scanning signals So, S1, S2, S3 and S4 in response to the data pulse c from the shift register 40A, the frame pulse a from the controller 22 and the reset pulse b from the reset pulse generating circuit 30. Thus, the scanning signals So and S1, S3 and S2, S4 from the logic circuit 40B2 are respectively supplied as the reset signal, selection signal and non-selection signal to the line electrode X2 of the liquid crystal cell 10, and the scanning signals So and S1, S3 and S2, S4 from the logic circuit 40B3 are respectively supplied as the reset signal, selection signal and non-selection signal to the line electrode X3 of the liquid crystal cell 10, and similarly the scanning signals So and S1, S3 and S2, S4 from the logic circuit 40Bn are respectively supplied as the reset signal, selection signal and non-selection signal to the line electrode Xn of the liquid crystal cell 10.

The column drive circuit 50, as shown in FIG. 9, has a shift register 50A and a latch 50B coupled to the controller 22, and further has logic circuits 50C1, 50C2, . . . , 50Cm coupled to the controller 22, the reset pulse generating circuit 30 and the latch 50B. The shift register 50A successively inputs a serial data pulse Py from the controller 22 in response to a shift clock pulse SP from the controller 22 so as to convert it into m parallel data pulses which are in turn supplied to the latch 50B. The latch 50B latches the m data pulses from the shift register 50A in response to a synchronous pulse LP from the controller 22 and supplies them as data pulse j shown in FIG. 14 to the logic circuits 50C1, 50C2, . . . , 50Cm, respectively.

The logic circuit 50C1, as shown in FIG. 13, is equipped with an inverter 51, AND gates 52a, 52b, a NAND gate 53, voltage stabilizers 54a, 54b, and transmission gates 55a, 55b, 55c. The inverter 51 is connected to the controller 22, the AND gate 52a is coupled to the inverter 51, the reset pulse generating circuit 30 and the latch 50B, the AND gate 52b is connected to the controller 22, the reset pulse generating circuit 30 and the latch 50B, the NAND gate 53 is coupled to the reset pulse generating circuit 30 and the latch 50B.

The AND gate 52a, as shown in FIG. 14, generates, with a high level, a gate pulse k in response to the inversion gate pulse of the frame pulse k from the inverter 51, the reset pulse b from the reset pulse generating circuit 30 and the data pulse j from the latch 50B being respectively in the high-level states. Furthermore, the AND gate 52b generates, with a high level, a gate pulse l in response to all of the frame pulse a from the controller 22, the reset pulse b from the reset pulse generating circuit 30 and the data pulse j from the latch 50B being in the high-level states. In addition, the NAND gate 53 produces, with a high level, a gate pulse m under the conditions that at least one of the reset pulse b from the reset pulse generating circuit 30 and the data pulse j from the latch 50B is in the low level state.

The transmission gate 55a, in response to the gate pulse k from the AND gate 52a, shifts the gate pulse k up to the level (+V1) of a positive constant voltage from the voltage stabilizer 54a so as to output it as a data signal D2 through a common output terminal 56 of the respective transmission gates 55b and 55c to the column electrode Y1 of the liquid crystal cell 10. Further, when receiving the gate pulse l from the AND gate 52b, the transmission gate 55b shifts the gate pulse l up to the level (−V1) of a negative constant voltage from the voltage stabilizer 54b so as to output it as a data signal D1 through the output terminal 56 to the column electrode Y1. In addition, in response to the gate pulse m from the NAND gate 53, the transmission gate 55c shifts the gate pulse m up to the zero level to supply it as a data signal D3 through the output terminal 56 to the column electrode Y1.

In this instance, the data signals D1 and D2 function as an ON data signal and the data signal D3 acts as an OFF data signal.

The remaining logic circuits 50C2 to 50Cm have the same structure as the logic circuit 50C1, each similarly producing the respective data signals D1, D2 and D3 in response to the latch data pulse j from the latch 50B, the frame pulse a from the controller 22, and the reset pulse b from the reset pulse generating circuit 30. Therefore, the data signals D1, D2 and the data signal D3 from the logic circuit 50C2 are respectively supplied as the ON data signal and the OFF data signal to the column electrode Y2 of the liquid crystal cell 10, and the data signals D1, D2 and the data signal D3 from the logic circuit 50C3 are respectively supplied as the ON data signal and the OFF data signal to the column electrode Y3 of the liquid crystal cell 10, and similarly, the data signals D1, D2 and the data signal D3 from the logic circuit 50Cm are respectively supplied as the ON data signal and the OFF data signal to the column electrode Ym of the liquid crystal cell 10.

Here, a description will hereinbelow be given in terms of methods of determining the constant voltage (+V3) of the voltage stabilizer 45a, the constant voltage (+V2) of the voltage stabilizer 45b, the constant voltage (−V3) of the voltage stabilizer 45c, the constant voltage (−V2) of the voltage stabilizer 45d, the constant voltage of the voltage stabilizer 54a, and the constant voltage of the voltage stabilizer 54b. When an indication picture element (m, n) being in the OFF indication state is changed to the ON indication state by application of a voltage, if the time that the light transmittance factor of the indication picture element (m, n) reaches 90% after the application of the voltage is taken to be the response time of the ferroelectric liquid crystal 13 and if, as shown in FIG. 15, the aforementioned response time corresponding to the signal width of the data signal D0 or the scanning signal So is taken to be a set response time to and similarly the aforementioned response time corresponding to the signal width of the data signal D1 or the scanning signal S1 is taken as to, and further, in connection to the curve X indicated in FIG. 11, if the bias voltages are: $+V2 \approx 18$ (V), $+V1 \approx 5$ (V), $+V3 \approx 22$ (V), it is possible to effect the bias drive. Furthermore, the minus side bias voltages are $-V2 \approx -18$ (V), $-V1 \approx -5$ (V) and $V3 \approx -22$ (V). Here, the set response time to is the above-mentioned response time on the application of the voltage of $V2 = 18$ (V).

In this embodiment thus arranged, when the line sequential scanning circuit 20 generates the frame pulse a, synchronous pulse LP, shift clock pulse SP, data pulse Px and data pulse Py and the reset pulse generating circuit 30 generates the reset pulse b in response to the frame pulse a, as shown in FIG. 9, the line drive circuit 40 supplies the reset signal (So), selection signal (i.e., scanning signal S1, S3) or non-selection signal (i.e., scanning signal S2, S4) to any one of the respective line electrodes Xl to Xn of the liquid crystal cell 10 in response to the synchronous pulse LP and data pulse Px from the line sequential scanning circuit 20 and the reset pulse b from the reset pulse generating circuit 30 with shifting being effected at every T/n from the line electrode X1 to the line electrode Xn. (Here, T represents an indication time of one image plane). On the other hand, the column drive circuit 50 repeatedly supplies the ON data signal (data signal D1, D2) or the OFF data signal (data signal D3) to the respective column electrodes Y1 to Ym of the liquid crystal cell 10, respectively, in response to the synchronous pulse LP, shift clock pulse SP, data pulse Py and frame pulse a from the line sequential scanning circuit 20 and the reset pulse b from the reset pulse generating circuit 30.

Figure 17:
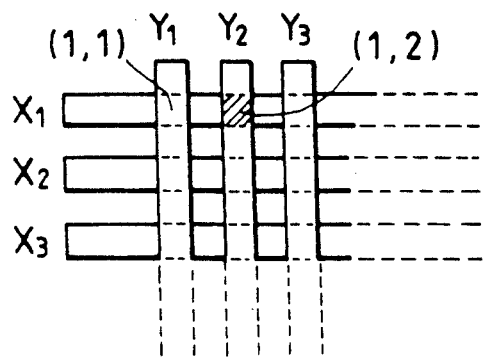
FIG. 17 is an enlarged illustration of line electrodes and column electrodes.
Figure 16:
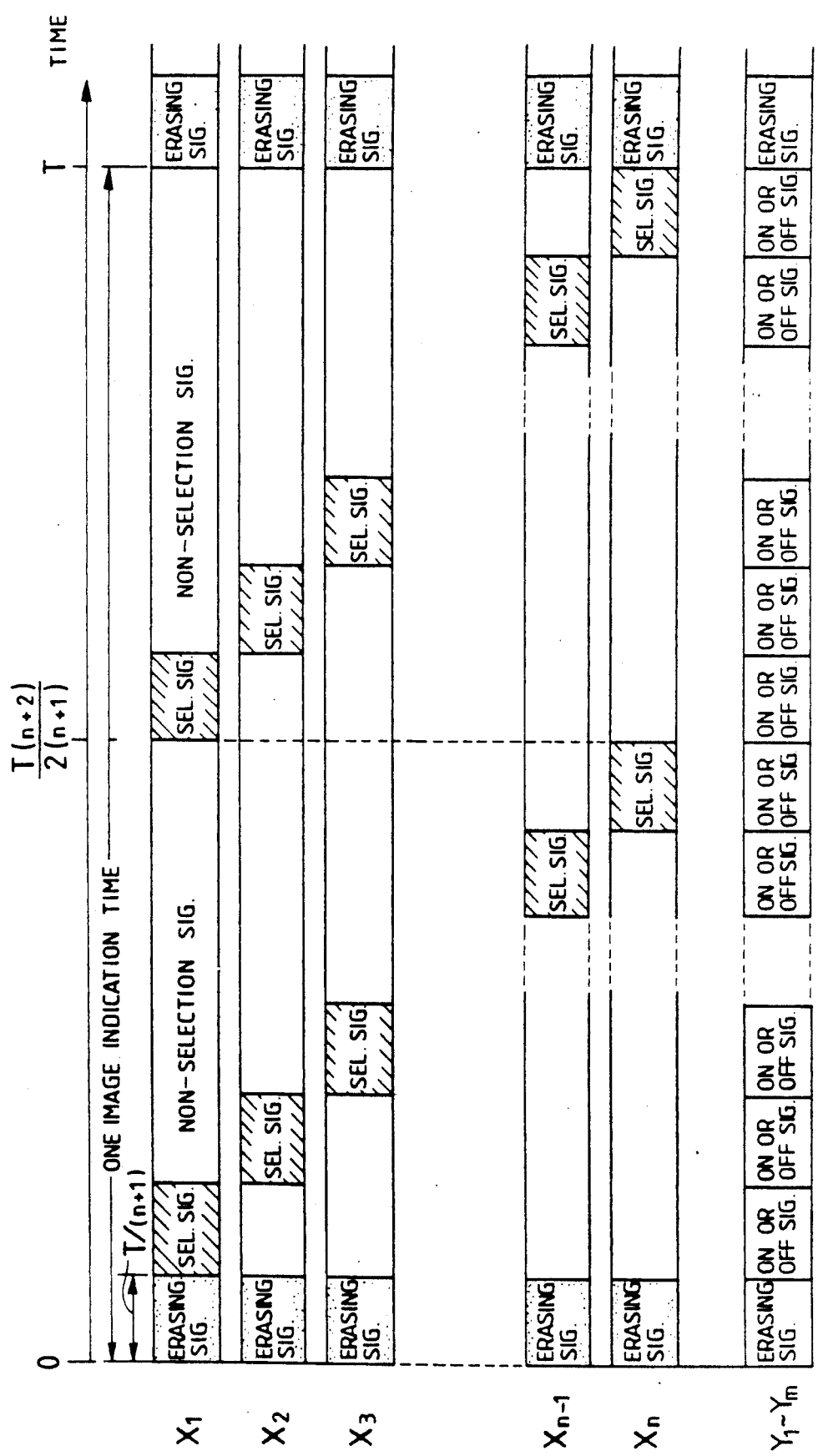
FIG. 16 is an illustration for describing signals to be supplied to the FIG. 9 apparatus.

FIG. 17 is a partially enlarged diagram showing the line electrodes and the column electrodes. In FIG. 17, if the indication picture element (1, 1) is OFF and the indication picture element (1, 2) is ON, with respect to the application signals for the liquid crystal cell 10, the former becomes as indicated by (c) of FIG. 18 and the latter becomes as illustrated by (a) of FIG. 18. At this time, the light transmittance factors are as illustrated by (b) and (d) of FIG. 18. Here, although the polymer films 16 and 17 are respectively formed on both the conductive films 11b and 12b, it is also appropriate that, instead, the polymer film 16 or 17 is formed on either the conductive films 11b or 12b. Furthermore, although the erasing signal for resetting the picture element to the OFF (dark) state, as shown in FIG. 16, is simultaneously applied at the time 0 to X1 to Xn and Y1 to Ym, it is also appropriate that the erasing signal is applied to pluralities of X electrodes and Y electrodes and a plurality of erasing signal applying periods is set during the one image plane indication time T. Here, since the data signal D1, reversed polarity data signal D2, scanning signals S1, S2 the reversed polarity scanning signals S3, S4 are applied after the time (T+to)/2 so that the application voltages to the liquid crystal cell 10 are entirely cancelled during the one image plane indication time T to become zero, it is possible to prevent deterioration of the ferroelectric liquid crystal due to the direct-current component.

Figure 20:
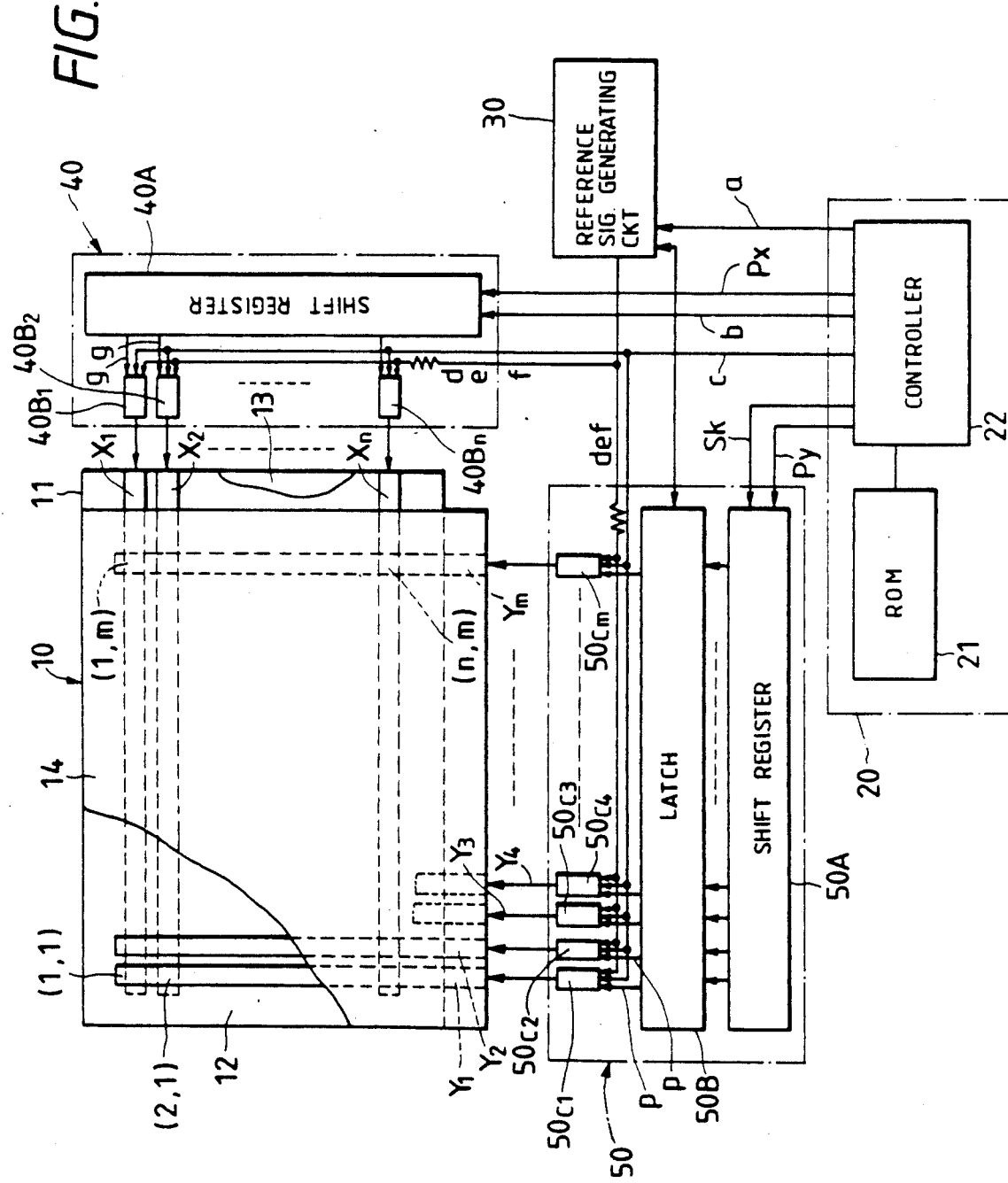
FIG. 20 shows an arrangement of another liquid crystal electro-optic apparatus according to an embodiment of the present invention.

Subsequently, a detailed description will hereinbelow be made in terms of another embodiment of a matrix type display apparatus. FIG. 20 shows the entire arrangement of the matrix type ferroelectric liquid crystal display apparatus. Such an indication apparatus is provided with a matrix type liquid crystal cell 10 which, as well as the above-mentioned embodiment, comprises a pair of electrode substrates 11 and 12 as shown in FIG. 10. The pair of electrode substrates 11, 12 are arranged to be parallel to each other through a gap of 1 to 10 micrometers, for example, and a trifluorooctoxy carbonyl phenyl -4'- heptyl biphenyl -4- carboxylate (which will be referred to hereinafter as TFHPOBC) 13 is sealed between these electrode substrates 11 and 12, and further polarizing plates 14 and 15 whose polarizing axes are normal to each other are respectively provided on the outsides of the electrode substrates 11 and 12. The other arrangements such as conductive films 11b, 12b and molecular orientation for an electric field are similar to those of the above-described embodiment.

Figure 21:
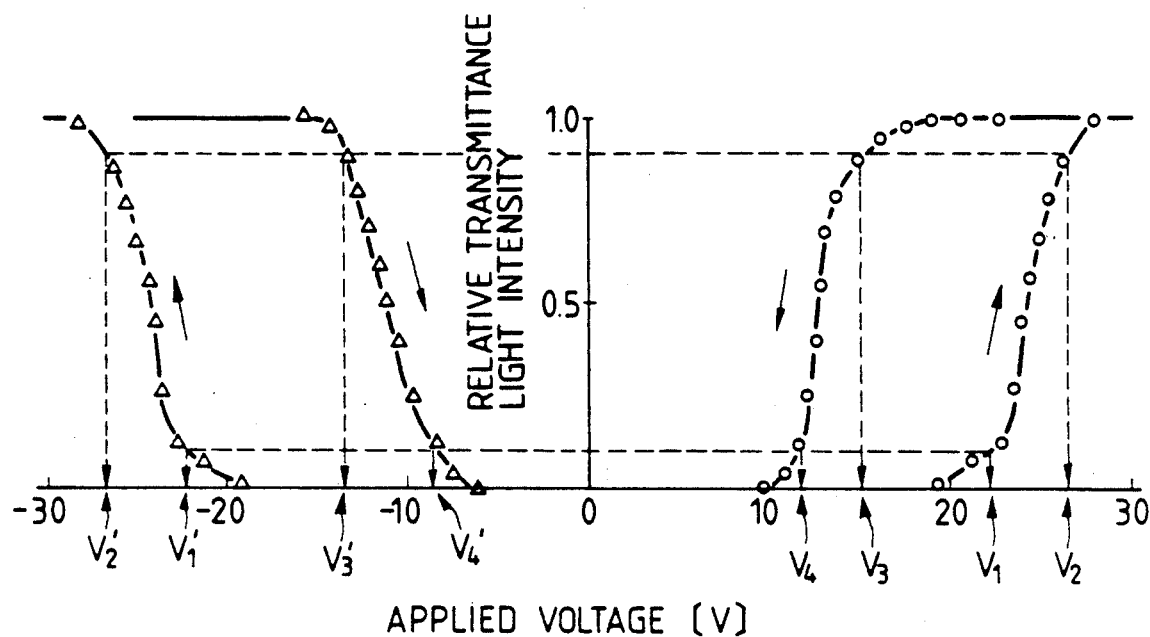
FIG. 21 is an illustration for describing the relation between the application voltage and the light transmittance in a ferroelectric liquid crystal.

Similarly, the relation between the transmission light intensity and the application voltage to the liquid crystal cell 10 has been measured in an experiment. The result is shown in FIG. 21. With a positive application voltage being increased in the state of FIG. 2A on the field-free, the torque due to the product of the electric field E and the spontaneous polarization Ps competes with the elastic torque, and therefore, the liquid crystal molecules arranged so as to assume the state of FIG. 2A with a threshold v1 start to turn along a smectic cone 13d and enter in the state of FIG. 2B when exceeding the saturation voltage v2. In accordance with this, the transmittance light intensity varies so that finally the state is switched from the dark to the light. Here, the threshold voltage is defined as a voltage by which the transmission light intensity is varied from the initial value to 10% and the saturation voltage is defined as a voltage by which it is varied to 90%.

On the contrary, with the application voltage being decreased from more-than v2, a hysteresis appears without showing the variation on the voltage increasing. That is, the molecule starts to turn from the state of FIG. 2B at the threshold v3 and is varied to the state of FIG. 2A at the saturation voltage v4. Following this, the transmittance light intensity varies so that the state is switched from the light to the dark. Similarly, when a voltage of the reversed polarity is applied, a hysteresis appears and the states shown in FIGS. 2A and 2B vary and the thresholds for the variations from the dark to the light and from the light to the dark are v1' and v3', respectively, and the saturation voltages are v2' and v4', respectively. According to the present invention, this characteristic is effectively used.

The polarization axes of the polarization plates 14 and 15 are determined in connection with the molecule long axes of the ferroelectric liquid crystal so that, when an appropriate voltage of minus polarity is applied between the line electrode and the column electrode, the indication picture element enters in the light-transmitting state (i.e., light indication state) with possible molecular orientation state of the ferroelectric liquid crystal, and on the other hand, when an appropriate voltage below the threshold is applied between the line electrode and the column electrode, the indication picture element enters in the no light-transmitting state (i.e., dark indication state) under the condition of possible molecular orientation of the ferroelectric liquid crystal. Here, at the rear side of the polarizing plate 15 is provided a light source for projecting light to the polarizing plate 15.

In addition, the liquid crystal indication apparatus, as shown in FIG. 20, is equipped with a line sequential scanning circuit 20, a reference signal generating circuit 30 connected to the line sequential scanning circuit 20, a line drive circuit 40 and a column drive circuit 50 which are coupled to the line sequential scanning circuit 20 and the reference signal generating circuit 30. The line sequential scanning circuit 20 comprises a ROM 21 and a controller 22 coupled to the ROM 21. The rom 21 prestores indication data representing predetermined indication contents for indication on the liquid crystal 10. The controller 22 successively generates a reference clock pulse a (a of FIG. 25), successively generates a synchronous pulse b (b of FIG. 25) whose period is three times the period of the reference clock pulse a, successively generates a frame pulse c (c of FIG. 25) inverted at every frame, successively generates a shift clock pulse SK, successively generates a data pulse Py corresponding to the column electrode indication data from the ROM 21, and successively generates a data pulse Px corresponding to the line electrode date.

Figure 22:
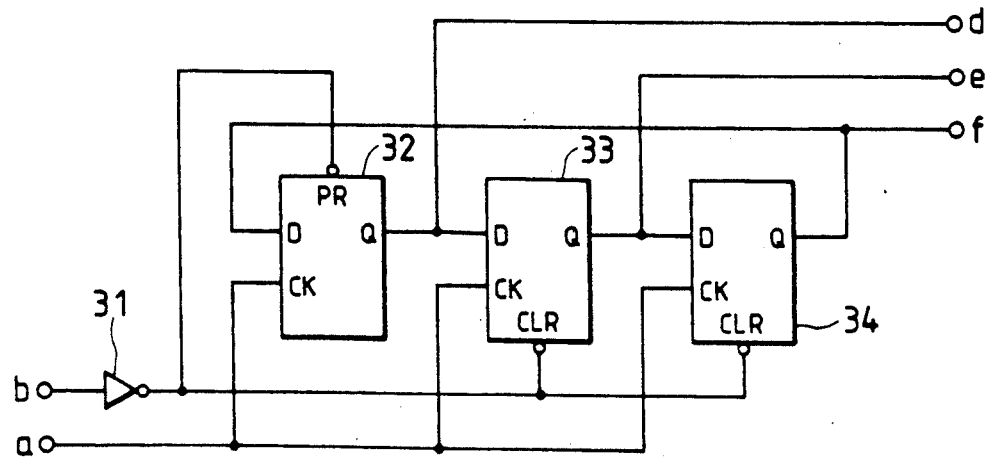
FIG. 22 shows a detailed arrangement of a reference signal generating circuit of the FIG. 20 apparatus.

The reference signal generating circuit 30, as shown in FIG. 22, has an inverter 31 connected to the controller 22, D-type flip-flops 32, 33, 34 coupled to the controller 22 and the inverter 31. The inverter 31 successively inverts the synchronous pulse b from the controller 22 to produce the inversion synchronous pulse and the output terminal of the flip-flop 34 is connected to the data input terminal of the flip-flop 32, the output terminal of the flip-flop 32 is connected to the data input terminal of the flip-flop 33, and the output terminal of the flip-flop 33 is coupled to the input terminal of the flip-flop 34. They are preset or cleared when the inversion gate pulse from the inverter 31 is the low-level state so as to generate high-level, low-level and low-level signals. The outputs are shifted in the order of the flip-flops 32, 33 and 34 in synchronism with the rising of the reference clock pulse a from the controller 22 so that the flip-flop 32 generates a reference signal (d of FIG. 25), the flip-flop 33 generates a reference signal (e of FIG. 25) and the flip-flop 34 generate a reference signal (f of FIG. 25).

The line drive circuit 40 is provided with a shift register 40A connected to the controller 22 and logic circuits 40B1, 40B2, ..., 40Bn coupled to the reference signal generating circuit 30 and the shift register 40A. The shift register 40A successively receives the synchronous pulse b, as a sequential shift pulse, from the controller 22 and supplies, in synchronism with the shift pulse, each of the data pulses Px from the controller 22 as a data pulse g (g of FIG. 25) to any one of the respective logic circuits 40B1 to 40Bn and the shifting is successively performed from the logic circuit 40B1 to the logic circuit 40Bn.

Figure 23:
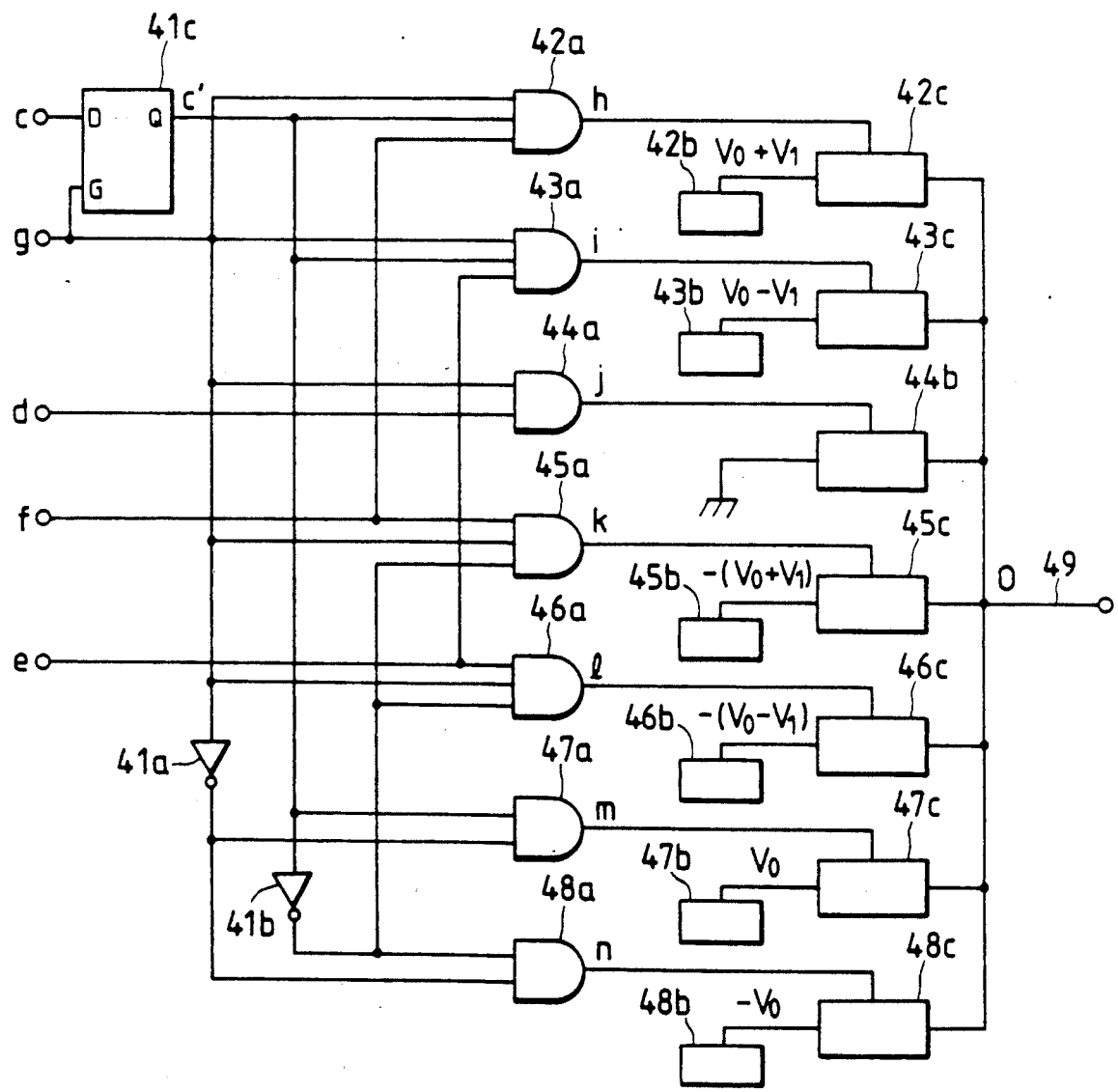
FIG. 23 shows a detailed arrangement of a logic circuit of a line drive circuit of the FIG. 20 apparatus.

The logic circuit 40B1, as shown in FIG. 23, is provided with a D-type latch 41c connected to the shift register 40A and the controller 22, an inverter 41a connected to the shift register 40A, an inverter 41b connected to the latch 41c and AND gates 42a, 43a, 44a, 45a, 46a, 47a, 48a coupled to the shift register 40A, controller 22, inverters 41a, 41b and so on. The D-type latch 41c inputs with the G terminal the data pulse g from the shift register 40A and inputs with the D terminal the frame pulse c from the controller 22 and outputs the frame pulse c, as it is, from the Q terminal when the G terminal input is in the high-level state and maintains the D terminal input signal level at the time of the falling of the G terminal input signal in response to the G terminal input entering in the low-level and then outputs it from the Q terminal to generate a gate pulse c'. The inverter 41a inverts the data pulse g from the shift register 40A to produce an inversion data pulse. The inverter 41b inverts the gate pulse c' from the D-type latch 41c to generate an inversion gate pulse.

The AND gate 42a generates, with a high level, a gate pulse h (h of FIG. 25) under the conditions that all of the data pulse g from the shift register 40A, the gate pulse c' from the D-type latch 41c and the reference signal f are in the high-level states. The AND gate 43a generates, with a high level, a gate pulse f (f of FIG. 25) in response to all of the data pulse g from the shift register 40A, the gate pulse c' from the D-type latch 41c and the reference signal e being in the high-level states. The AND gates 44a generates, with a high level, a gate pulse j (j of FIG. 25) under the conditions that the data pulse g from the shift register 40A and the reference signal d are in the high-level states. The AND gate 45a generates, with a high level, a gate signal k (k of FIG. 25) in response to the data pulse g from the shift register 40A, the inversion gate pulse from the inverter 41b and the reference signal f being respectively in the high-level states. The AND gate 46a generates, with a high level, a gate pulse l (l of FIG. 25) under the condition that the data pulse g from the shift register 40A, the inversion gate pulse from the inverter 41b and the reference signal e are respectively in the high-level states. Furthermore, the AND gate 47a generates, with a high level, a gate pulse m (m of FIG. 25) under the condition that the inversion gate pulse from the inverter 41a and the gate pulse c' from the D-type latch 41c are respectively in the high-level states. In addition, the AND gate 48a generates, with a high level, a gate pulse n (n of FIG. 25) under the condition that the inversion gate pulse from the inverter 41a and the inversion gate pulse from the inverter 41b are respectively in the high-level states.

The transmission gate 44b, in response to the gate pulse j from the AND gate 44a, shifts the gate pulse j up to the zero level (i.e., grounded level) so as to supply it as scanning signals S1 and S1' with zero level (see o of FIG. 25 and FIG. 26) through a common output terminal 49 of the respective transmission gates to the line electrode X1 of the liquid crystal cell 10.

In addition, the transmission gate 43c, in response to the gate pulse l from the AND gate 43a, shifts the gate pulse l up to the level of (Vo−V1) on the basis of a positive constant voltage (Vo−V1) from the voltage stabilizer 43b, and further the transmission gate 42c, in response to the gate pulse h from the AND gate 42a, shifts the gate pulse h up to the level of (Vo+V1) on the basis of a positive constant voltage (Vo+V1) from the voltage stabilizer 42b. Therefore, the shifting results of both the transmission gates 43c and 42c are combined with each other to produce a scanning signal S2 (see o of FIG. 25 and FIG. 26) which is in turn supplied through the common output terminal 49 of the respective transmission gates to the line electrode X1 of the liquid crystal cell 10.

Similarly, in response to the gate pulses m, l, k, n from the AND gates 47a, 46a, 45a and 48a, the respective transmission gates 47c, 46c, 45c, 48c generates scanning signals S3, S2' and S3' with voltage levels (see o of FIG. 25 and FIG. 26) in accordance with the respective voltage stabilizers 47b (Vo), 46b (−(Vo−V1)), 45b(−(Vo+V1)), 48b (−Vo) and supplies them through the common output terminal 49 of the respective transmission gates to the line electrode X1 of the liquid crystal cell 10. In this instance, since in the first frame both the scanning signals S1 and S2 function as a selection signal for selecting the line electrode X1, and the scanning signal S3' acts as a non-selection signal during T/n until the line electrode X1 is selected and the scanning signal S3 acts as a non-selection signal during T/n after the selection (since the line electrode X1 is selected at the starting time of the frame, only the scanning signal S3 acts as the non-selection signal). Here, T represents one frame indication time. Furthermore, in the second frame, since both the scanning signals S1' and S2' act as a selection signal for selecting the line electrode X1, and the scanning signal S3 functions as a non-selection signal T/n until the line electrode X1 is selected and the scanning signal S3' serves as a non-selection signal T/n after the selection (as well as the first frame, in the case of the line electrode X1, only the scanning signal S3' acts as the non-selection signal).

The remaining logic circuits 40B2 to 40Bn have the same structure of the logic circuit 40B1, and as well as the logic circuit 40B1, respectively produce scanning signals S1, S2, S3, S1', S2' and S3' in response to the data pulse g from the shift register 40A, frame pulse c from the controller 22 and the gates pulses d, e, f from the reference signal generating circuit. Thus, with respect to the respective scanning signals from the logic circuit 40B2, in the first frame, both the scanning signals S1 and S2 act as selection signal and the scanning signals S3' and S3 are supplied as non-selections signals before and after the selection of the line electrode X2 to the line electrode X2 of the liquid crystal cell 10. Similarly, in terms of the respective scanning signals from the logic circuit 40Bn, in the first frame, both the scanning signals S1 and S2 function as selection signal and the scanning signals S3' and S3 are supplied as non-selection signals before and after the selection of the line electrode Xn to the line electrode Xn of the liquid crystal cell 10, and in the second frame, the scanning signals S1' and S2' act as the selection signals and the scanning signals S3 and S3' are supplied as the non-selection signals before and after the selection of the line electrode Xn to the line electrode Xn of the liquid crystal cell 10.

The column drive circuit 50 has a shift register 50A coupled to the controller 22, a latch 50B connected to the controller 22, and logic circuits 50c1, 50c2, . . . , 50cm connected to the reference signal generating circuit 30 and the latch 50B. The shift register 50A successively inputs a serial data pulse Py from the controller 22 in response to a shift clock pulse Sk from the controller 22 to successively converts it into m parallel data pulses which are in turn supplied to the latch 50B. The latch 50B repeatedly latches the m data pulses from the shiftregister 50A in response to the synchronous pulse b from the controller 22 and supplies them as a data pulse p (p of FIG. 25) to the respective logic circuits 50*l*1, 50c2, ... ..., 50cm.

Figure 24:
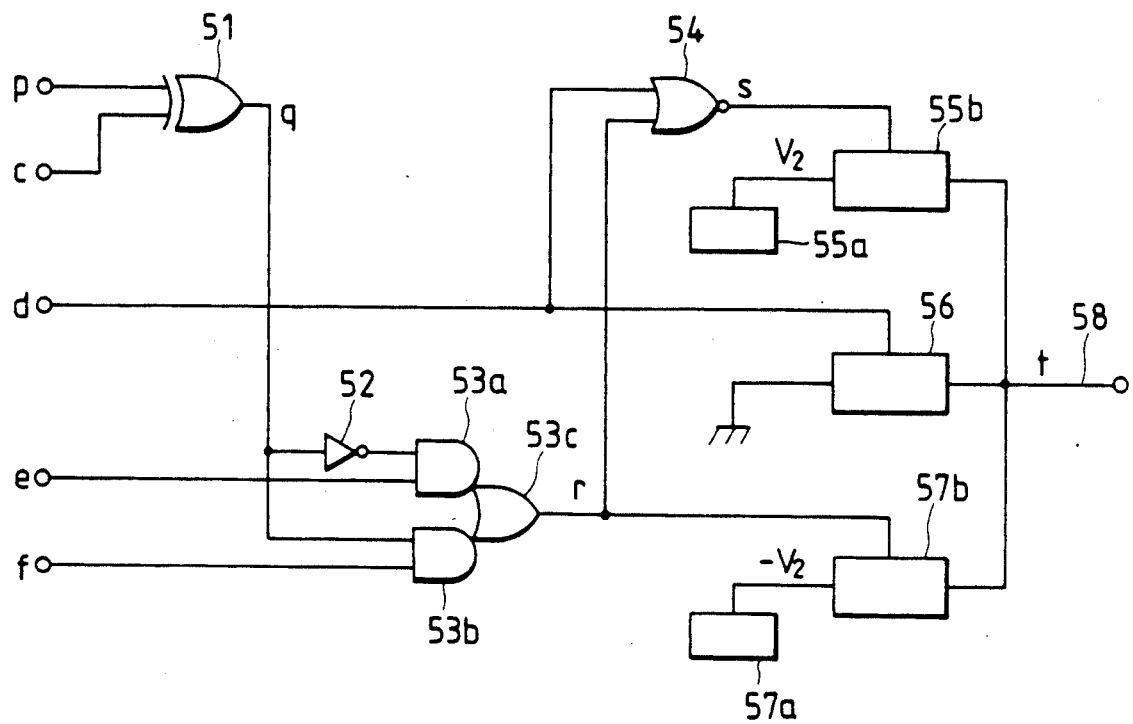
FIG. 24 shows a detailed arrangement of a logic circuit of a column drive circuit of the FIG. 20 apparatus.

The logic circuit 50c1, as shown in FIG. 24, is equipped with an EXCLUSIVE-OR gate 51 connected to the latch 50B and controller 22, an inverter 52 connected to the EXCLUSIVE-OR gate 51, an AND gate 53a connected to the inverter 52 and reference signal generating circuit 30, an AND gate 53b coupled to the EXCLUSIVE-OR gate 51 and reference signal generating circuit 30, and an OR gate 53c coupled to both the AND gates 43a, 53b. The EXCLUSIVE-OR gate 51 takes the exclusive OR of a latch data pulse P from the latch 50B and a frame pulse c from the controller 22 to generate a gate pulse q (q of FIG. 25). The AND gate 53a generates, with a high level, a gate pulse in response to the reference signal e from the reference signal generating circuit 30 while the the inversion gate pulse of the gate pulse q from the inverter 52 is in the high-level state and generates, with a low level, a gate pulse when the inversion gate pulse of the gate pulse q is in the low-level state. The AND gate 53b generates, with a high level, a gate pulse in response to the reference signal f from the reference signal generating circuit 30 while the gate pulse q from the EXCLUSIVE-OR gate 51 is in the high-level state and further generates, with a low level, a gate pulse when the gate pulse q is in the low-level state. The OR gate 53c generates, with a high level, a gate pulse r (r of FIG. 25) when at least either the AND gate 53a or 53b is in the high-level state. A NOR gate 54 generates, with a high level, a gate pulse s (s of FIG. 25) in response to the the gate pulse r from the OR gate 53c and the reference signal d from the reference signal generating circuit 30 being respectively in the low-level states.

The transmission gate 56 shifts both the gate pulses to the zero level (i.e., grounded level) in response to the reference signal d from the reference signal generating circuit 30 to supply data signals D1 and D1' with zero levels (see t of FIG. 25 and FIG. 26) through a common output terminal 58 of the respective transmission gates 55b and 57b to the column electrode Y1 of the liquid crystal cell 10.

Furthermore, when the transmission gate 55b receives the gate pulse s from the NOR gate 54 and the transmission gate 57b accepts the gate pulse r from the OR gate 53c, the transmission gate 55b shifts the gate pulse s up to the level (V2) of a positive constant voltage from the voltage stabilizer 55a and the transmission gate 57b shifts the gate pulse r up to the level (−V2) of a negative constant voltage from the voltage stabilizer 57a. Therefore, the results of the shifting of both the transmission gates 55b and 57b are combined with each other so that the data signals D2, D3 and D2', D3' (see t of FIG. 25 and FIG. 26) are supplied through the common output terminal 58 to the column electrode Y1 of the liquid crystal cell 10. In this case, in the first frame, both the data signals D1, D2 act as ON data signals for the column electrode Y1 during T/n and both the data signals D1, D3 function as OFF data signals during T/n. In addition, in the second frame, both the data signals D1', D2' act as ON data signals for the column electrode Y1 during T/n and both the data signals D1', D3' function as OFF data signals during T/n.

The remaining logic circuits 40C2 to 40Cm have the same structure as the logic circuit 40C1, and, as well as the logic circuit 40C1, generate data signals D1, D2, D3, D1', D2' and D3' in response to the respective data pulse P from the latch 50B, the frame pulse c from the controller 22 and the respective gate pulses d, e, f from the reference signal generating circuit 30. Thus, in the first frame, both the data signals D1, D2 and both the D1, D3 from the logic circuit 40C2 are supplied respectively as the ON data signal and OFF data signal to the column electrode Y2 of the liquid crystal cell 10, and the second frame both the data signals D1', D2' and both the D1', D3' are respectively supplied as the ON data signal and OFF data signal to the column electrode Y2 thereof. In the first frame, both the data signals D1, D2 and both the D1, D3 from the logic circuit 40C3 are supplied respectively as the ON data signal and OFF data signal to the column electrode Y3 of the liquid crystal cell 10, and the second frame both the data signals D1', D2' and both the D1', D3' are respectively supplied as the ON data signal and OFF data signal to the column electrode Y3 thereof. Similarly, in the first frame, both the data signals D1, D2 and both the D1, D3 from the logic circuit 40Cm are supplied respectively as the ON data signal and OFF data signal to the column electrode Ym of the liquid crystal cell 10, and the second frame both the data signals D1', D2' and both the D1', D3' are respectively supplied as the ON data signal and OFF data signal to the column electrode Ym thereof.

Here, a description will be given hereinbelow in terms of methods of determining the constant voltage (Vo+V1) from the voltage stabilizer 42b, constant voltage (Vo−V1) from the voltage stabilizer 43b, constant voltage −(Vo+V1) from the voltage stabilizer 45b, constant voltage −(Vo−V1) from the voltage stabilizer 46b, constant voltage Vo from the voltage stabilizer 47b, constant voltage −Vo from the voltage stabilizer 48b, constant voltage V2 from the voltage stabilizer 55a of FIG. 24 and constant voltage −V2 from the voltage stabilizer 57a. With an appropriate voltage being applied to an indication picture element (n, m) so that the indication picture element (n, m) is changed from the dark indication state to the light indication state, the time that the transmission light quantity of the indication picture element (n, m) is varied up to more than 90% of all variation after the voltage application is taken to be a response time period of the ferroelectric liquid crystal 13, and further the same in the case that an appropriate voltage is applied to the indication picture element (n, m) for variation from the light indication state from the dark indication state is taken as a response time period of the the ferroelectric liquid crystal 13, and a time period above the respective response time periods is taken as to which is in turn determined as a set signal width of the scanning signals S1, S1, and the data signals D1, D1'. The signal width of the scanning signals S2, S2' and the data signals D2, D2'D3, D3' is taken as 2to. In this case, in connection with the curve of the application voltage-to-transmission light intensity characteristic, the above-mentioned voltage levels are determined so as to satisfy the following equations (3) to (5).

$$|Vo| = \left\{ \frac{|v1| + |v3|}{2} + \frac{|v1'| + |v3'|}{2} \right\}/2 \tag{3}$$

$$|V2| \leq \frac{|v1| + |v3|}{2}, \frac{|v1'| + |v3'|}{2} \tag{4}$$

$$|Vo| + |V1| + |V2| > |v2|, |v2'| \tag{5}$$

Here, the response time period of the ferroelectric liquid crystal 13 means the response time period at the time of application of the voltage of ±(Vo+V1+V2).

Figure 25:
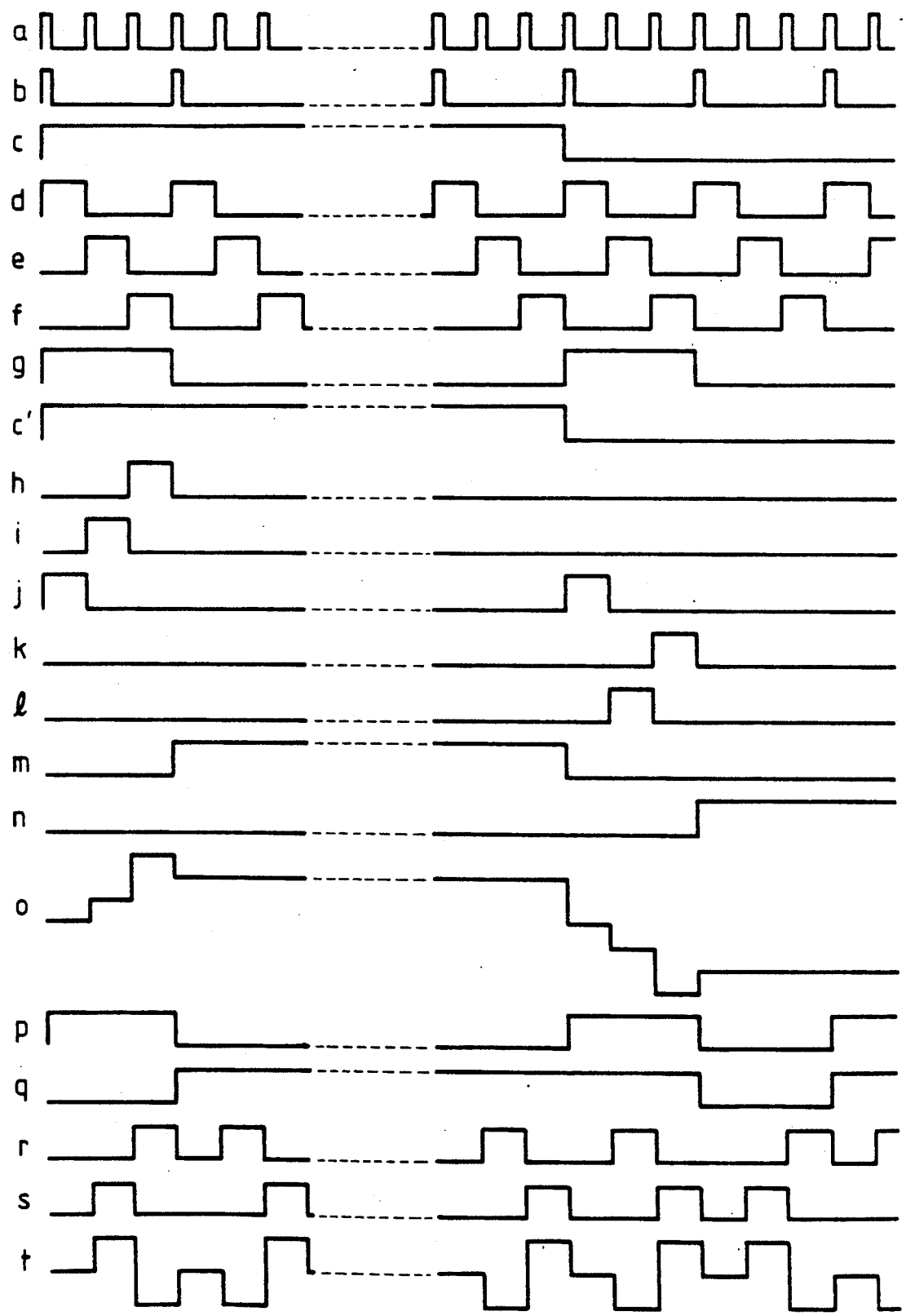

In this embodiment thus arranged, the line sequential scanning circuit 20 successively generates a reference pulse a, a synchronous pulse b, a frame pulse c, a shift clock pulse Sk, a data pulse Px and a data pulse Py, and the reference signal generating circuit 30 is successively responsive to the reference clock pulse a and the synchronous pulse b to successively generate reference signals d, e and f at the timings shown in FIG. 25, whereby the line drive circuit 40 is responsive to the synchronous pulse b, frame pulse c and data pulse Px from the line sequential scanning circuit 20 and the reference signals d, e and f from the reference signal generating circuit 30 to supply, in the first frame, a selection signal (scanning signals S1, S2) or a non-selection signal (scanning signal S3 or S3') and, in the second frame, a selection signal (scanning signals S1', S2') or a non-selection signal (scanning signal S3' or S3) to any one of the respective line electrodes X1 to Xn of the liquid crystal cell 10 with the shifting being performed from the line electrode X1 to the line electrode Xn at every T/n. On the other hand, the column drive circuit 50 is responsive to the synchronous pulse b, frame pulse c, shift clock pulse Sk and data pulse Py from the line sequential scanning circuit 20 and the reference signals d, e and f from the reference signal generating circuit 30 to repeatedly supply, in the first frame, an ON data signal (data signals D1, D2) or an OFF data signal (data signals D1 or D3) and, in the second frame, an ON data signal (data signals D1', D2') or an OFF data signal (data signal D1' or D3') to the respective line electrodes Y1 to Ym of the liquid crystal cell 10.

In such an arrangement, a description will be described hereinbelow in terms of, for example, indication picture elements (1, 1) and (1, 2) with respect to how the liquid crystal cell 10 is matrix-driven by means of the line drive circuit 40 and the column drive circuit 50. Here, the description is made on the assumption that the same indication is performed for the first and second frames. For example, when in the first frame the line drive circuit 40 supplies the selection signal (scanning signals S1 and S2) to the line electrode X1 and when the column drive circuit 50 supplies the ON data signal (data signal D1 and D2) to the line electrode Y1, the indication picture element (1, 1) acts as the light indication picture element (see FIG. 28). In this instance, an erasing signal E1 (a of FIG. 29) due to a combination of the scanning signal S1 and the data signal D1 is supplied between the line electrode X1 and the column electrode Y1 during to, and further a writing signal W1 (a of FIG. 29) due to a combination of the scanning signal S2 and the data signal D2 is supplied for 2to. Here, the erasing signal E1 is 0 V and the writing signal W1 has the level (Vo−V1−V2) with the signal width to and the level (V0+V1+V2) with the signal width to.

Thus, the indication picture element (1, 1) once becomes the dark indication state (arranging state of FIG. 2A) on the basis of the level (0) and the signal width to of the erasing signal E1, and then becomes the light indication state (arranging state of FIG. 2A) on the basis of the signal width to and the level (Vo+V1+V2) of the writing signal W1 above the saturation voltage v2, which causes variation to the state of FIG. 2B. After T/n, a maintaining signal H (a of FIG. 29) having a level above the threshold v3 in variation from the state of FIG. 2B to the state of FIG. 2A due to a combination of the non-selection signal from the line drive circuit 40 and the ON data signal (or OFF data signal) from the column drive circuit 50 is supplied to the indication picture element (1, 1), thereby resulting in entering in the light indication state. These serial things are indicated with the transmission light intensity variation of (b) of FIG. 29.

Figure 28:
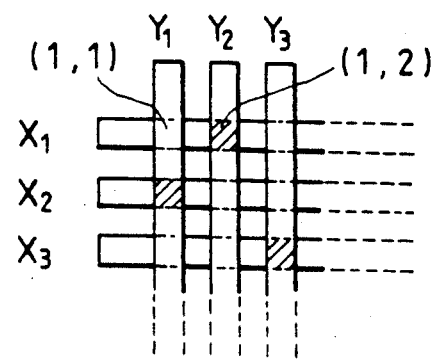
FIG. 28 is an enlarged view showing line electrodes and column electrodes.

Similarly, in the second frame, when the line drive circuit 40 supplies the selection signal (scanning signals S1' and S2') to the line electrode X1 and the column drive circuit 50 supplies the ON data signal (data signals D1' and D2') to the column electrode Y1, the indication picture element (1, 1) acts as the light indication picture element (see FIG. 28). Similarly in this case, with the same reason described with respect to the first frame, the light indication state can be realized by utilizing the variation between the states of FIGS. 2A and 2C. That is, the erasing signal E1' (see (a) of FIG. 29) due to a combination of the scanning signal S1' and the data signal D1' is supplied for to and the writing signal W1' (see (a) of FIG. 29) due to a combination of the scanning signal S2' and the data signal D2' is supplied for 2to. Here, the erasing signal E1' is 0 V, and the writing signal W1' has the level of −(Vo−V1−V2) with signal width t2 and the level of −(Vo+V1+V2) with signal width to.

Thus, the indication picture element (1, 1) once runs to the dark indication state (arrangement state of FIG. 2A) on the basis of the level (0V) and the signal width to of the erasing signal E1' and then enters in the light indication state (arrangement state of FIG. 2C) on the basis of the signal width to and the level −(Vo+V1+V2) of the writing signal W1' over the saturation voltage v2', which causes variation to the state of FIG. 2C. After T/n, the maintaining signal H' (see (a) of FIG. 29), due to a combination of the non-selection signal from the line drive circuit 40 and the ON data signal (or OFF data signal) from the column drive circuit 50, having a level above the threshold v3' for variation from the state of FIG. 2C to the state of FIG. 2A is supplied to the indication picture element (1, 1) which is in turn kept in the light indication state. Here, the non-selection signal to be applied to the respective electrodes X is successively changed from S3 to S3' at every application of the selection signal. These serial states are indicated with the transmission light intensity variation in (b) of FIG. 29.

Furthermore, a description will hereinbelow be described in terms of realizing the dark indication state. In the first frame, when the line drive circuit 40 supplies the selection signal (scanning signals S1 and S2) to the line electrode X1 and the column drive circuit 50 supplies the OFF data signal (data signals D1 and D3) to the column electrode Y2, the indication picture element (1, 2) acts as the dark indication picture element (see the shadowed portion in FIG. 28).

In this case, the erasing signal E2 ((c) of FIG. 29) due to a combination of the scanning signal S1 and the data signal D1 is supplied between the line electrode X1 and the column electrode Y2 for to and the writing signal W2 due to a combination of the scanning signal S2 and the data signal D3 is supplied for 2to therebetween. Here, the erasing signal E2 is 0 V and the writing signal W2 has the level of (Vo−V1+V2) with signal width to and the level of (Vo+V1−V2) with signal width to.

Thus, the indication picture element (1, 2) runs to the dark indication state (arrangement of FIG. 2A) on the basis of the level (0V) and the signal width to of the erasing signal E2 and is then kept to the state of FIG. 2A because the writing signal W2 levels (Vo−V1+V2) and (Vo+V1−V2) with the signal width to are below the saturation voltage v1 for variation from the state of FIG. 2A to the state of FIG. 2B, and as a result, the dark indication state can be realized. After T/n, as well as in the above description, the maintaining signal H is applied and the dark indication state is kept because these voltage levels are lower than v2.

Similarly, in the second frame, in response to the line drive circuit 40 supplying the selection signal (scanning signals S1' and S2') to the line electrode X1 and the column drive circuit 50 supplying the OFF data signal (data signals D1' and D3') to the column electrode Y2, the indication picture element (1, 2) acts as the dark indication picture element (see the shadowed portion in FIG. 28). In this case, as well as the case described with respect to the first frame, the dark indication state can be realized. That is, the erasing signal E2' ((c) of FIG. 29) due to a combination of the scanning signal S1' and the data signal D1' is supplied for to and the writing signal W2' ((C) of FIG. 29) due to a combination of the scanning signal S2' and the data signal D3' is supplied for 2to. Here, the erasing signal E2' is 0V and the writing signal W2' has the levels of −(Vo-31 V1+V2) and −(Vo+V1−V2) with signal width to.

Thus, the indication picture element (1, 2) runs to the dark indication state (arrangement state of FIG. 2A) on the basis of the signal width to and the level (0V) of the erasing signal E2' and is then kept in the dark indication state because the levels of the writing signal W2' are respectively below the saturation voltage v2' for variation from the state of FIG. 2A to the state of FIG. 2C. After T/n, the maintaining signal H' due to a combination of the non-selection signal from the line drive circuit 40 and the ON data signal (or OFF data signal) from the column drive circuit 50 is supplied to the indication element (1, 2), and because they are below the saturation voltage v2' for variation from the state of FIG. 2A to the state of FIG. 2C, the dark indication state is maintained. Here, the non-selection signal to be applied to the respective electrodes X is successively changed from S3 to S3' at every application of the selection signal. These serial states are indicated with the transmittance light intensity variation of (d) of FIG. 29.

In addition, the other indication picture elements are similarly driven and as a result the liquid crystal cell 10 is matrix-driven. FIG. 27 shows timings of signals to be applied to the line electrodes and the column electrodes.

Although in this embodiment the voltage polarity is reversed at every frame, it is also appropriate that the reserving is freely effected at every plural frame under the condition that a subsequential direct-current does not remain in the liquid crystal cell. Furthermore, this invention is not limited to the transmission type apparatus adapted to perform indication by illumination from its back, but can be applicable to the reflection type apparatus adapted to reflect light from its front.

As a liquid crystal material for the present invention is used the material (TFNPOBC) indicated by No. 11 of Table 6A and expressed in accordance with the following structural formula.

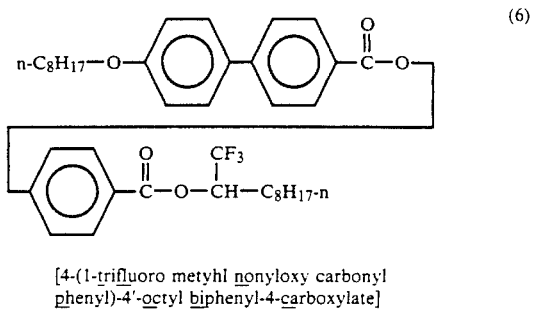

(6)

[4-(1-trifluoro metyhl nonyloxy carbonyl phenyl)-4'-octyl biphenyl-4-carboxylate]

Figure 30:
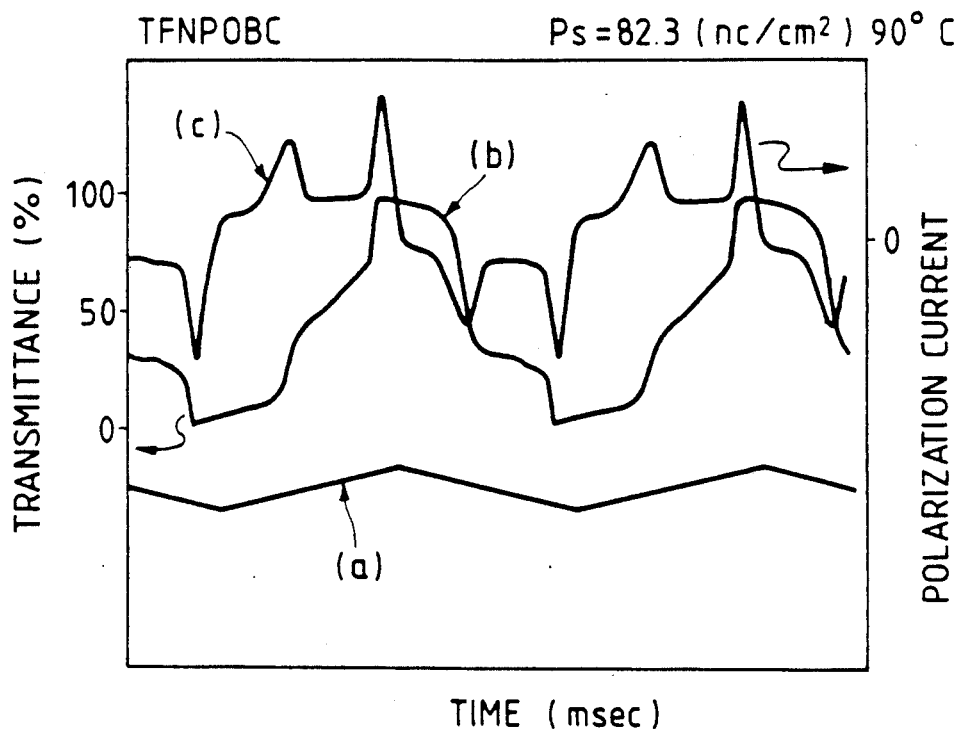
FIGS. 30 and 31 are graphic illustrations of transmittance factor and the polarization inversion current in a liquid crystal.

The transmittance factor characteristic and the polarization current characteristic in the case that a triangular wave voltage (±30 V, 10 Hz) is applied to this material are illustrated in FIG. 30, and as well as the aforementioned liquid crystal material, it shows three states.

In addition, as another liquid crystal material for present invention is used the material (MHPOBC) indicated by No. 25 of Table 6C and expressed in accordance with the following structural formula.

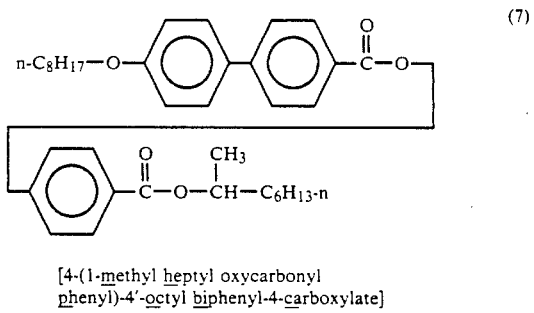

(7)

[4-(1-methyl heptyl oxycarbonyl phenyl)-4'-octyl biphenyl-4-carboxylate]

Figure 31:
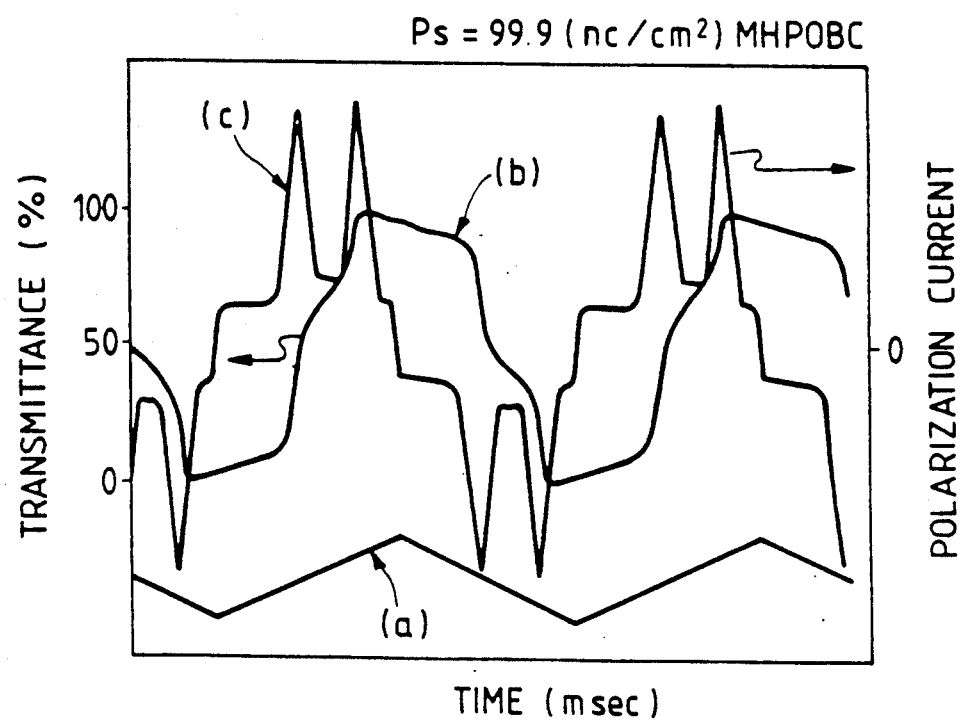

The transmittance factor characteristic and the polarization invertion current characteristic in the case that the triangular wave voltage is similarly applied to this material are illustrated in FIG. 31, and as well as the aforementioned liquid crystal material, it shows the three states.

Figure 32:
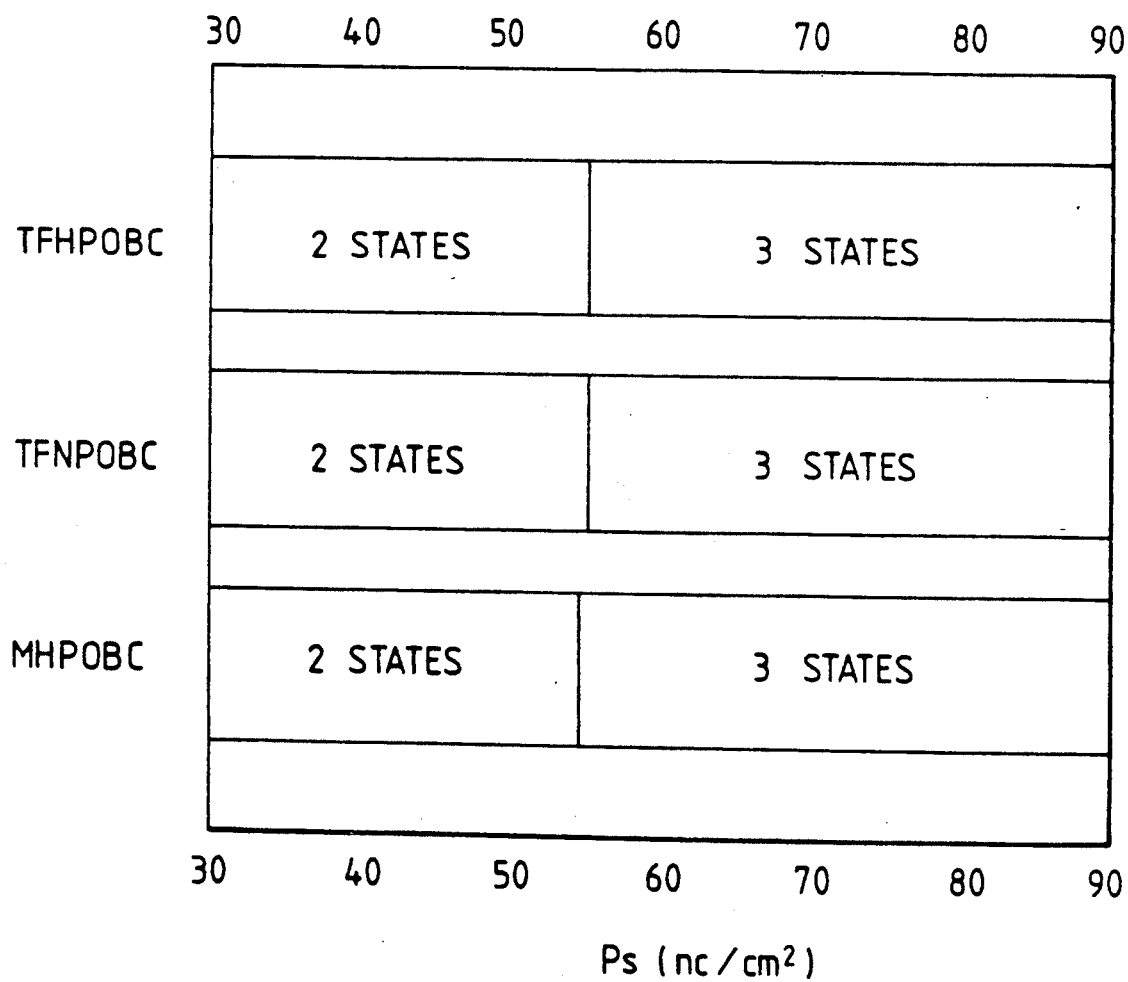
FIG. 32 is an illustration for describing the spontaneous polarization showing three states of the transmittance in different liquid crystal materials.

With respect to the above-mentioned three liquid crystal materials, the values of spontaneous polarization Ps in which the three states of the transmittance appear are shown in FIG. 32. The three liquid crystals respectively show the three states in the case of more-than 50 (nC/cm²). Here, the spontaneous polarization is measured by means of the triangular wave method which is known generally.

A further liquid crystal material other than the above-mentioned three materials is used the material (TFHBFB) indicated by No. 24 of Table 6C and expressed in accordance with the following structural formula.

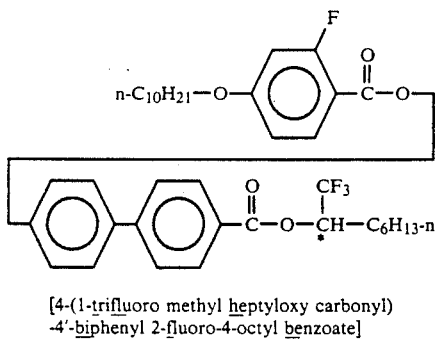

(8)

[4-(1-trifluoro methyl heptyloxy carbonyl)
-4'-biphenyl 2-fluoro-4-octyl benzoate]

Figure 33:
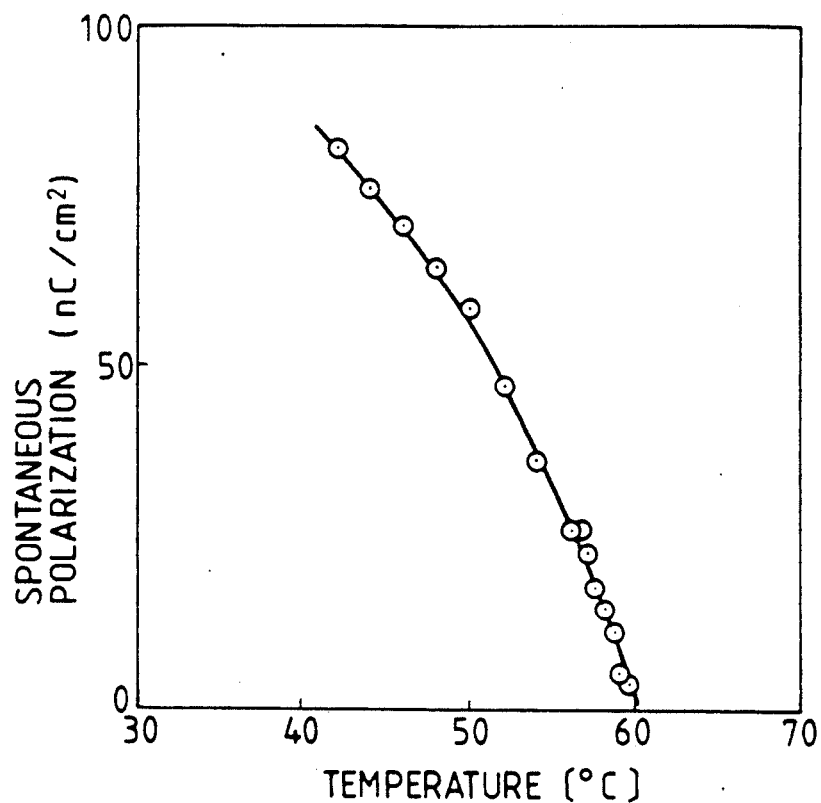
FIG. 33 shows the spontaneous polarization on the basis of temperature.
Figure 34:
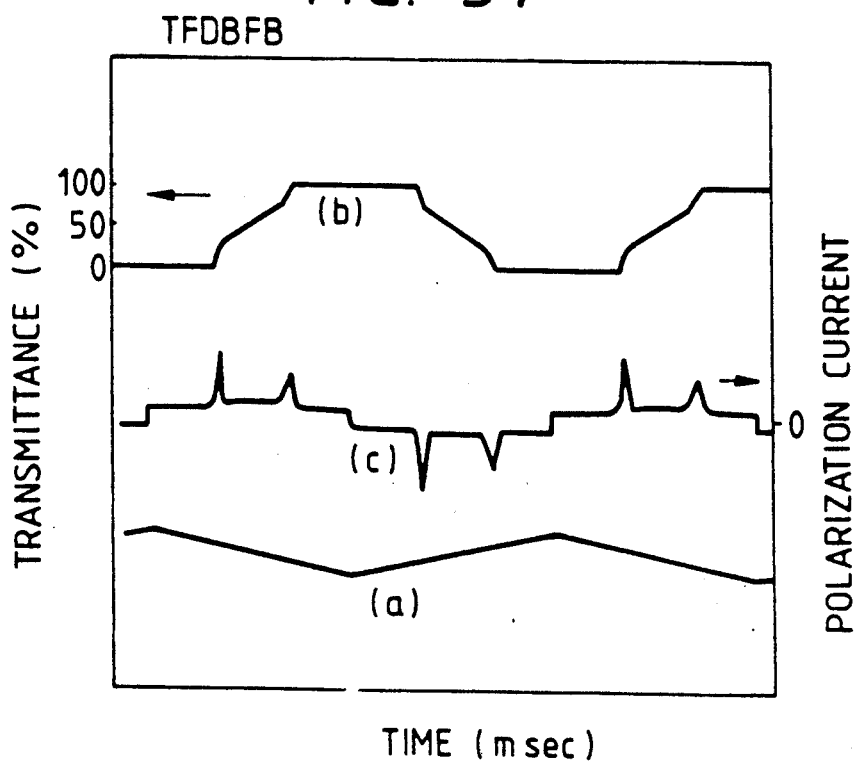
FIG. 34 is a graphic illustration of the transmittance factor and polarization current with respect to a triangular wave voltage in a liquid crystal.

When the spontaneous polarization in the ferroelectric smectic phase of this compound is measured by means of the general triangular wave method, a characteristic as shown in FIG. 33 can be obtained. Furthermore, the aforementioned three states have appeared over the entire region of the ferroelectric smectic phase. That is, the magnitude of the spontaneous polarization is in the range from about 4 ($nC/cm^2$) to about 8 ($nC/cm^2$). FIG. 34 illustrates the transmission factor characteristic (b) and the polarization current characteristic (c) when a triangular voltage (a) is applied at 55° C., and it is seen that there are indicated the aforementioned three states.

In addition, for introducing the ferroelectric smectic temperature range into the room temperature and enlarging it, when, of the above-mentioned compounds of the four types, the three types, i.e., TFHPOBC, MHPOBC, TFHBFB, are mixed at the following ratio:

| | |
|---|---|
| TFHPOBC | 20% |
| MHPOBC | 46% |
| TFDBFB | 34% | and the phase transition is measured by means of the differential scanning colorimeter (DSC) analysis and by using a polarizing microscope, the following result can be obtained:

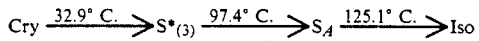

When this mixture is sealed in a liquid crystal cell and a triangular voltage is applied thereto so as to measure the transmittance factor characteristic and the polarization current characteristic, the above-mentioned three states can be observed in the entire region of the ferroelectric smectic temperature range.

As further liquid crystal materials to be used in the apparatus of this invention, there are materials indicated in Tables 6A to 6C. However, the materials to be used are not limited thereto. The manufacturing methods of the liquid crystals are disclosed in Japanese Patent Provisional Publications Nos. 60-149547 and 60-149548, for example.

Figure 35A:
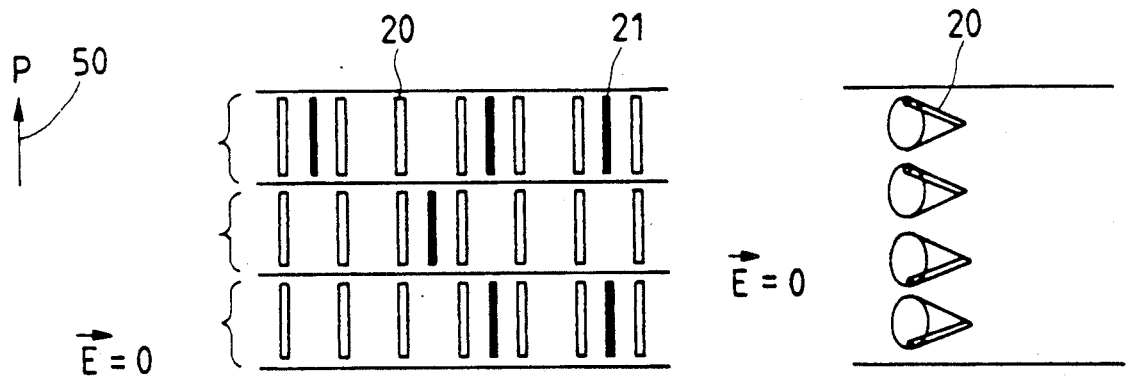
FIG. 35 shows orientation states of liquid crystal molecules.

Furthermore, as a further embodiment of the present invention, it is preferable that a ferroelectric liquid crystal material and the melted material of a dichromatic coloring matter (dye) are sealed in between two electrode substrates 1 and 2 which are disposed to be parallel to each other. Furthermore, as the dichromatic coloring matter is used S-334 (azo black dichromatic coloring matter made by Mitsuitoatsu Co., Ltd., and the aforementioned ferroelectric liquid crystal is heated to an isotropic liquid phase and the dichroism coloring matter of 2 wt. % is added and melted. Thereafter, it is injected in between the electrode substrates by using the capillary suction phenomenon and then the entire liquid crystal cell is gradually cooled by 0.1 to 1.0° C. per minute up to the chiral smectic C phase. As a result of such cooling, the ferroelectric liquid crystal molecule 20, being the chiral smectic C phase, is oriented as shown in FIG. 35A because of the order of the liquid crystal and a large polarization of the liquid crystal molecule itself. Here, a polarizing plate 5 is disposed at only the outside of the electrode substrate 2. In addition, a polarizer (P) of this polarizing plate is arranged so as to make an angle of 0 (180°) with respect to the direction of the long axis of the liquid crystal molecule on field-free. To transparent electrodes 1a and 2a is coupled an external power source 3 including a drive circuit and to the liquid crystal is applied the above-mentioned voltage waveform.

Figure 35B:
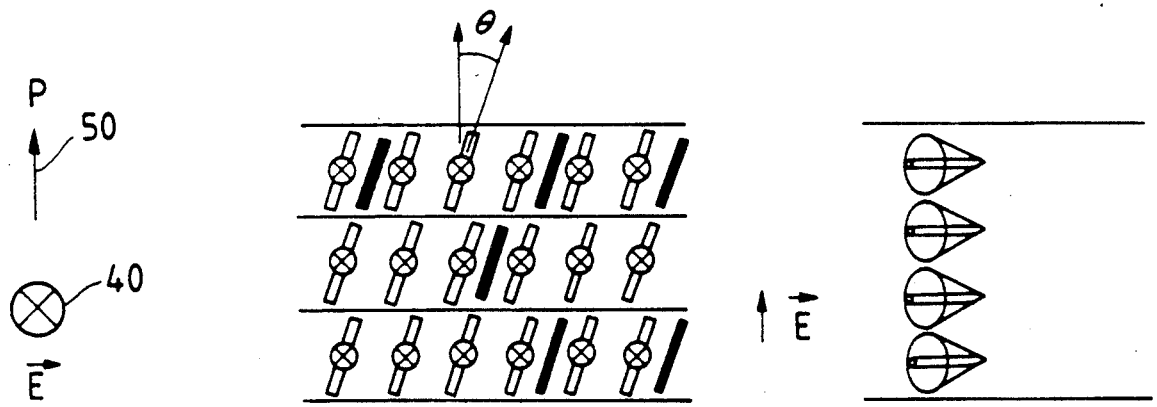
Figure 35C:
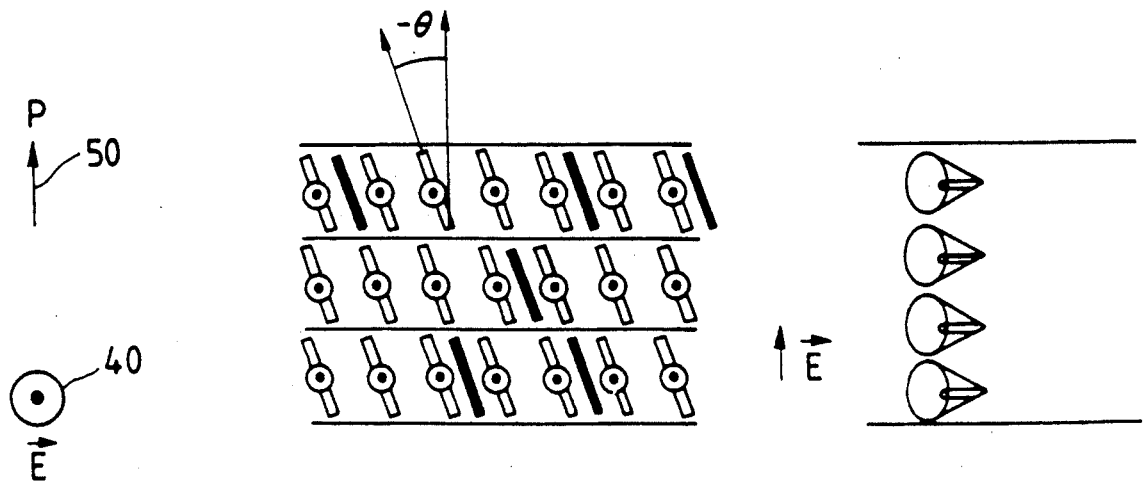

Operation of an apparatus with the above-mentioned arrangement will be described hereinbelow with reference to FIGS. 35A, 35B and 35C. Here, the left sides are illustrations of planes of the apparatus and the right sides are illustrations of sides of the apparatus. The liquid crystal molecules 20 between the substrates, on field-free, are arranged along the normal line of the smectic layer 10 and show the orientation state illustrated in FIG. 35A. At this time, the spontaneous polarization of the liquid crystal molecule is directed in the left direction (or the right direction) at the upper half of this apparatus (cell) and directed in the right direction or the left direction) at the lower half of this apparatus. That is, according to a description on the cone on which the ferroelectric liquid crystal molecules move (the right illustration of of FIG. 35A), the molecule is positioned above (or below) the cone at the upper half of the cell and positioned below (or above) the cone at the lower half of the cell so that the product of the spontaneous polarizations in the directions of the thickness of the cell becomes zero. At this time, the dichromatic coloring matter 21 becomes dispersed in the liquid crystal molecules 20 and directed in the directions of the long axes of the liquid crystal molecules 20. In response to application of an electric field sufficient to rotation of the liquid crystal molecule from the front side of the paper sheet to the rear side thereof, the direction 30 of the spontaneous polarization of the liquid crystal molecule is coincident with the direction 40 of the electric field. Following this, the liquid crystal molecule is reoriented as shown in FIG. 35B. At this time, the liquid crystal molecule makes a tilt angle $\theta$ with respect to the normal line of the layer. For example, the tilt angle of the material made by adding the melted dichromatic coloring matter to the ferroelectric liquid crystal material expressed by the above-mentioned formula (1) is 10° to 31° under the condition that the temperature is from 70° to 110°. Similarly, in this instance, the dichromatic coloring matter 21 moves in accordance with the movement of the liquid crystal molecule 20. Subsequently, in response to application of an electric field enough to rotation of the liquid crystal molecule from the rear side of the paper sheet of the front side thereof, the spontaneous polarization is directed to the electric field direction. Following this, the liquid crystal molecule is reoriented as shown in FIG. 35C. At this time, the liquid crystal molecule makes a tilt angle of $-\theta$ with respect to the layer normal line direction. Similarly, in this case, the dichromatic coloring matter 21 moves in accordance with the movement of the liquid crystal molecule 20. Thus, the optical axis of the liquid crystal can be varied in accordance with the magnitude and polarity of the applied electric field so as to take the three states.

An electro-optical apparatus is made by providing the polarizing plate 5 in conjunction with such three states of the liquid crystal. For example, as shown in FIG. 35A, the polarizer (P) of the polarizing plate is arranged so as to make an angle of 0° with respect to the long axis directions of the liquid crystal. In this state, the linear polarized light passing through the polarizer (P) is absorbed with its polarizing direction being coincident with the absorbing axis of the dichromatic coloring matter, resulting in entering in the dark state. Furthermore, in the case of FIG. 35B in which an electric field is applied from the front side of the paper sheet to the rear side thereof and in the case of FIG. 35C in which an electric field is applied from the rear side of the paper sheet to the front side thereof, the linear polarized light passed through the polarizer (P) is transmitted because its polarizing direction is not coincident with the absorbing axis of the dichromatic coloring matter, thereby causing the light state. Here, it is also appropriate that the polarizing plate 5 is disposed at the outside of the electrode substrate 1.

In addition, this embodiment is substantially similar to the first-mentioned embodiment in terms of optical response, light transmittance, temperature dependence of the response speed, orientation characteristic of the liquid crystal molecule and so on.

Here, although in this embodiment the polarizer (P) of the polarizing plate is arranged so as to make an angle of 0° (180°) with respect to the molecule long axis direction (long axis direction of dichroism coloring matter) on field-free, it is also appropriate to make 45° or 90°, for example. In the case of 90°, on application of the electric field, the dark state is taken in one direction of the electric field and the light state is taken in the other direction thereof, and on the field-free, the intermediate state appears, thereby allowing two-step melody indication.

Furthermore, dichromatic coloring matter is not limited to the dichromatic azo coloring matter, but it is possible to use the dichromatic anthraquinone coloring matter with excellent light resistance.

An orientation method of the above-mentioned ferroelectric liquid crystal will be described hereinbelow. In order for the above mentioned ferroelectric smectic liquid crystal element showing a predetermined electro-optical drive characteristic, the ferroelectric smectic liquid crystal interposed between a pair of electrode substrates is required to have the molecular orientation state in which the liquid crystal molecule is arranged to be substantially parallel to the substrates and the smectic layer is formed to be substantially perpendicular to the substrates. Such an orientation state, by using the polymer film rubbing method, oblique deposition method of inorganic material such as SiO or the like, can be obtained with it being heated up to the isotropic liquid phase and slowly cooled. However, for obtaining the molecular orientation by using such methods, it is required to be cooled from the isotropic liquid phase at the speed of 0.1° C. to 1.0° C. per minute, and the slowly cooling process taking a long time is not preferable in industry because of the high cost.

Accordingly, an industrially useful molecular orientation processing method which does not require the slowly cooling process will be described hereinbelow. The electrode substrate 1, as shown in FIG. 1, has an electrode 1a which is formed along the inner surface of a transparent base 1c made of a transparent glass or resin and which is composed of a conductive film made of indium oxide (ITO) or tin oxide. A similar arrangement is made for another electrode substrate 2. Polarizing plates 4 and 5 are disposed at the outsides of the electrode substrates 1 and 2 so as to sandwich them. On the inner surfaces of the transparent electrodes 1a, 2a, being conductive films, disposed polymer orientation films 1b, 2b for which the orientation process is performed so that the liquid crystal molecule is arranged to be parallel to the substrates. In addition, it is possible to use other general methods such as oblique deposition of inorganic material, i.e., silicon oxide or others, and process by a surface active agent for orienting the smectic liquid crystal.

Figure 36:
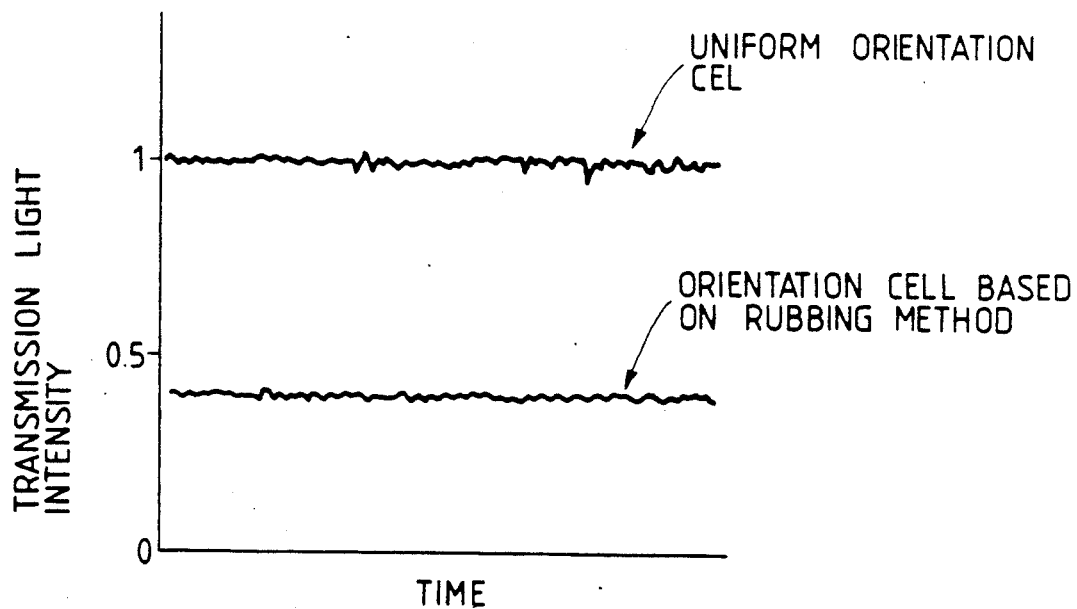
FIG. 36 shows measurement data of light transmittance.

The electrode substrates 1 and 2 are combined with each other so that the liquid crystal molecules are arranged in one direction. Thereafter, the above-mentioned ferroelectric liquid crystal is heated to change to the isotropic liquid and is injected in between the electrode substrates 1 and 2 by means of the capillary phenomenon or the vacuum replacement and then naturally cooled (rapidly cooled) at a speed of 5° C./minute up to the above-mentioned $S^*_{(3)}$ phase. At this time, although in the macroviewing the orientation of the liquid crystal molecules is according to the direction that the orientation process has been made, with measurement of the quenching state under the cross Nicol and the transmittance light intensity on voltage application by using a photocell, the result shown in FIG. 36 can be obtained.

As compared with a cell with an excellent orientation state effected by the spacer edge method or others, the orientation state is bad, the degree of the quenching is low because light passes, and the contrast in switching from the first stable state to the second or third stable state on application of an external voltage is low. In order to remove these problems, we have noted the electroclinic effect at the smectic A phase higher in temperature than the ferroelectric smectic phase. This electroclinic effect is disclosed in Liquid Crystal Vol. 2, 825 (1987) by Ch. Bahr and G. Heppke, and the direction of the smectic layer which is disturbed in the ferroelectric smectic phase can become even by using the effect. That is, the liquid crystal molecules are arranged in order with an alternating-current electric field being applied at the smectic A phase, so that the direction of the smectic phase is arranged.

Figure 37:
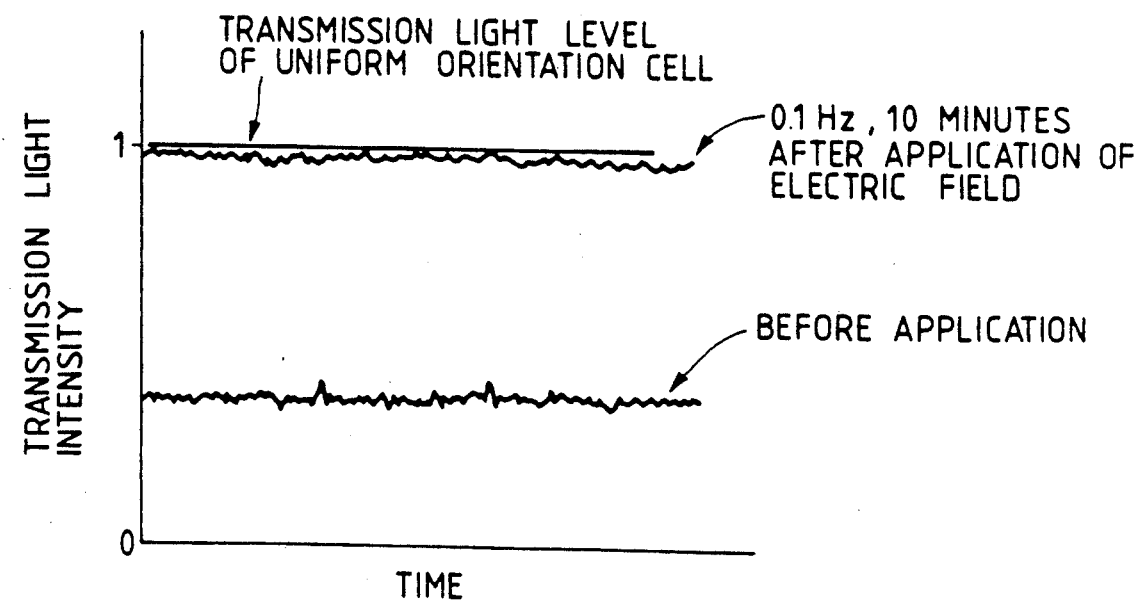
FIG. 37 shows measurement data of light transmittance of a liquid crystal.

We heat the above-mentioned liquid crystal cell up to the smectic A phase and apply a triangular wave voltage of ±30 V and 0.1 Hz for 10 minutes. As a result, the variation in which the disturbed smectic layer direction is arranged gradually in one direction is observed under a microscope. FIG. 37 shows the state that this is measured quantitatively, and the optical transmittance factors before and after the voltage application are different by several times from each other, thereby improving extremely the orientation state of the liquid crystal.

Furthermore, although in the above-mentioned example the alternating-current electric field is applied after the heating to the smectic A phase, it is also appropriate to apply the alternating-current electric field during the heating, resulting in obtaining the same effect.

It should be understood that the foregoing relates to only preferred embodiments of the invention, and that it is intended to cover all changes and modifications of the embodiments of the invention herein used for the purposes of the disclosure, which do not constitute departures from the spirit and scope of the invention.

Tables 1 to 6C show liquid crystal material to be used in the apparatus according to the present invention.

TABLE I

Chemical structure of polyimide resins used as alignment materials.

| No. | Diamine part | Acid part | Normal orientation |
|---|---|---|---|
| 1 | $H_2N-\phi-O-\phi-C(CF_3)_2-\phi-O-\phi-NH_2$ | (dianhydride with two phthalic anhydride groups linked by C=O) | Random |
| 2 | | (dianhydride linked by $SO_2$) | Random |
| 3 | | (biphenyl dianhydride) | Random |
| 4 | | (pyromellitic dianhydride) | Random |
| 5 | | (dianhydride linked by $C(CF_3)_2$) | Random |

TABLE 2

Chemical structure of polyimide resins used as alignment materials.

| No. | Diamine part | Acid part | Orientation (Three States) |
|---|---|---|---|
| 6 | $H_2N-\phi-C(CF_3)_2-\phi-NH_2$ | (dianhydride with two phthalic anhydride groups linked by C=O) | Random |
| 7 | | (biphenyl dianhydride) | Random |
| 8 | | (dianhydride linked by $C(CF_3)_2$) | Random |

TABLE 3

| No. | Diamine part | Acid part | Orientation (Three States) |
|---|---|---|---|
| 9 | H₂N–C₆H₄–O–C₆H₄–NH₂ (4,4'-oxydianiline) | isophthaloyl dichloride | Random |
| 10 | | trimellitic anhydride chloride | Good |
| 11 | | pyromellitic dianhydride | |
| 12 | | 3,3',4,4'-benzophenonetetracarboxylic dianhydride | Good |
| 13 | | 3,3',4,4'-diphenylsulfonetetracarboxylic dianhydride | Random |
| 14 | | 3,3',4,4'-biphenyltetracarboxylic dianhydride | Good |
| 15 | | 2,2-bis(3,4-dicarboxyphenyl)hexafluoropropane dianhydride | Random |

TABLE 4

| No. | Diamine part | Acid part | Orientation (Three States) |
|---|---|---|---|
| 16 | H₂N–C₆H₄–NH₂ (p-phenylenediamine) | 3,3',4,4'-benzophenonetetracarboxylic dianhydride | Good |

TABLE 4-continued
| No. | Diamine part | Acid part | Orientation (Three States) |
|---|---|---|---|
| 17 | | 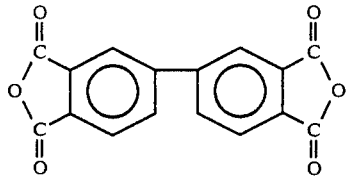 | Good |
TABLE 5
Chemical structure of polyimide resins used as alignment materials
| No. | Diamine part | Acid part | Orientation (Three States) |
|---|---|---|---|
| 18 | 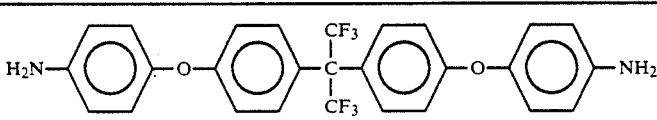 | 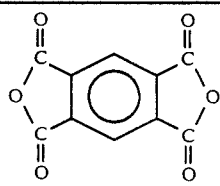 | Good |
| 19 | | 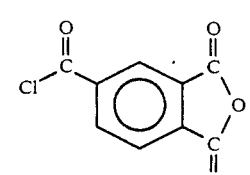 | Random |
| 20 | | 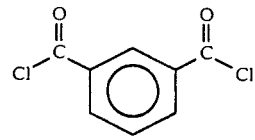 | Random |
| 21 | | 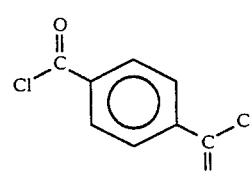 | Good |

TABLE 6

| No. | Structural Formula | Transition Temperature (°C.) |
|---|---|---|
| 1 | n-C$_6$H$_{13}$O—[biphenyl]—OOC—[phenyl]—COO—*CH(CF$_3$)—C$_6$H$_{13}$-n | Cry $\underset{104.7}{\overset{100}{\rightleftarrows}}$ S$_{(3)}$* $\underset{126.0}{\overset{—}{\rightleftarrows}}$ Sc* $\underset{126.5}{\overset{128}{\rightleftarrows}}$ S$_A$ $\underset{144.0}{\overset{142.2}{\rightleftarrows}}$ Iso |
| 2 | n-C$_8$H$_{17}$O—[biphenyl]—OOC—[phenyl]—COO—*CH(CF$_3$)—C$_6$H$_{13}$-n | Cry $\underset{74}{\overset{80}{\rightleftarrows}}$ S$_{(3)}$* $\underset{114}{\overset{—}{\rightleftarrows}}$ Sc* $\underset{115}{\overset{—}{\rightleftarrows}}$ S$_A$ $\underset{123.4}{\overset{125.3}{\rightleftarrows}}$ Iso |
| 3 | n-C$_9$H$_{19}$O—[biphenyl]—OOC—[phenyl]—COO—*CH(CF$_3$)—C$_6$H$_{13}$-n | Cry $\underset{40.4}{\overset{67.2}{\rightleftarrows}}$ S$_{(3)}$* $\underset{106.2}{\overset{107}{\rightleftarrows}}$ Sc* $\underset{110.3}{\overset{111}{\rightleftarrows}}$ S$_A$ $\underset{114.9}{\overset{115.6}{\rightleftarrows}}$ Iso |
| 4 | n-C$_{10}$H$_{21}$O—[biphenyl]—OOC—[phenyl]—COO—*CH(CF$_3$)—C$_6$H$_{13}$-n | Cry $\underset{25.5}{\overset{50}{\rightleftarrows}}$ S$_{(3)}$* $\underset{102.7}{\overset{—}{\rightleftarrows}}$ Sc* $\underset{103}{\overset{104.2}{\rightleftarrows}}$ S$_A$ $\underset{107.5}{\overset{109.2}{\rightleftarrows}}$ Iso |
| 5 | n-C$_{11}$H$_{23}$O—[biphenyl]—OOC—[phenyl]—COO—*CH(CF$_3$)—C$_6$H$_{13}$-n | Cry $\underset{14}{\overset{39}{\rightleftarrows}}$ S$_{(3)}$* $\underset{100}{\overset{101}{\rightleftarrows}}$ Sc* $\underset{104.3}{\overset{104.2}{\rightleftarrows}}$ S$_A$ Iso |
| 6 | n-C$_{12}$H$_{25}$O—[biphenyl]—OOC—[phenyl]—COO—*CH(CF$_3$)—C$_6$H$_{13}$-n | Cry $\underset{26.5}{\overset{61.2}{\rightleftarrows}}$ S$_{(3)}$* $\underset{97.0}{\overset{98.4}{\rightleftarrows}}$ Sc* $\underset{100.4}{\overset{101.2}{\rightleftarrows}}$ S$_A$ Iso |
| 7 | n-C$_8$H$_{17}$—[biphenyl]—OOC—[phenyl]—COO—*CH(CF$_3$)—C$_6$H$_{13}$-n | Cry $\underset{24.5}{\overset{40.6}{\rightleftarrows}}$ S$_{(3)}$* $\underset{74}{\overset{—}{\rightleftarrows}}$ Sc* $\underset{75.4}{\overset{76.8}{\rightleftarrows}}$ S$_A$ $\underset{79.2}{\overset{79.1}{\rightleftarrows}}$ Iso |
| 8 | n-C$_9$H$_{19}$—[biphenyl]—OOC—[phenyl]—COO—*CH(CF$_3$)—C$_6$H$_{13}$-n | Cry $\underset{5.7}{\overset{28.5}{\rightleftarrows}}$ S$_{(3)}$* $\underset{71}{\overset{—}{\rightleftarrows}}$ Sc* $\underset{71.6}{\overset{72.6}{\rightleftarrows}}$ S$_A$ $\underset{74.1}{\overset{73.6}{\rightleftarrows}}$ Iso |

TABLE 6-continued

| No. | STRUCTURAL FORMULA | TRANSITION TEMPERATURE (°C.) |
|---|---|---|
| 9 | n-C$_{10}$H$_{21}$—(Ph)—(Ph)—C(=O)—O—CH(CF$_3$)—C$_6$H$_{13}$-n* | Cry $\underset{5.0}{\overset{41.2}{\rightleftarrows}}$ S$_{(3)}$* $\underset{65.9}{\overset{66.0}{\rightleftarrows}}$ S$_C$* $\underset{67.2}{\overset{67.6}{\rightleftarrows}}$ S$_A$ Iso |
| 10 | n-C$_{11}$H$_{23}$—(Ph)—(Ph)—C(=O)—O—CH(CF$_3$)—C$_6$H$_{13}$-n* | Cry $\underset{20}{\overset{-13}{\rightleftarrows}}$ S$_{(3)}$* $\underset{65.0}{\overset{65.9}{\rightleftarrows}}$ S$_A$ $\underset{66.4}{\overset{66.5}{\rightleftarrows}}$ S$_A$ Iso |
| 11 | n-C$_8$H$_{17}$O—(Ph)—(Ph)—C(=O)—O—CH(CF$_3$)—C$_8$H$_{17}$-n* | Cry $\underset{57.0}{\rightleftarrows}$ S$_{(3)}$* $\underset{103.0}{\overset{}{\rightleftarrows}}$ S$_C$* $\underset{103.5}{\rightleftarrows}$ S$_A$ $\underset{114.0}{\rightleftarrows}$ Iso |
| 12 | n-C$_8$H$_{17}$O—(Ph)—C(=O)—O—(Ph)—C(=O)—O—CH(CF$_3$)—CHC$_6$H$_{13}$* | Cry $\underset{-20}{\rightleftarrows}$ S$_{(3)}$* $\underset{38}{\rightleftarrows}$ S$_C$* $\underset{40}{\rightleftarrows}$ S$_A$ $\underset{61.9}{\rightleftarrows}$ Iso |
| 13 | n-C$_8$H$_{17}$O—(Ph)—(Ph)—C(=O)—O—CH(C$_2$F$_5$)—C$_8$H$_{17}$-n* | Cry $\underset{53.4}{\overset{65}{\rightleftarrows}}$ S$_X$ $\underset{38.8}{\overset{57.0}{\rightleftarrows}}$ S$_{(3)}$* $\underset{76.8}{\overset{77.0}{\rightleftarrows}}$ S$_A$ $\underset{85.5}{\overset{85.7}{\rightleftarrows}}$ Iso |
| 14 | n-C$_8$H$_{17}$O—(Ph)—(Ph)—C(=O)—O—(Ph)—C(=O)—O—CH(C$_2$F$_5$)—CH$_2$—CH$_2$—(Ph)* | Cry $\underset{74}{\rightleftarrows}$ S$_{(3)}$* $\underset{75.5}{\overset{74}{\rightleftarrows}}$ S$_A$ $\underset{82.3}{\overset{94.9}{\rightleftarrows}}$ Iso |
| 15 | n-C$_8$H$_{17}$O—(Ph)—CH$_2$O—(Ph)—C(=O)—O—CH(CF$_3$)—C$_8$H$_{17}$-n* | Cry $\underset{22.4}{\overset{26.9}{\rightleftarrows}}$ S$_{(3)}$* $\underset{46.7}{\overset{47.7}{\rightleftarrows}}$ S$_C$* $\underset{66.5}{\overset{68.0}{\rightleftarrows}}$ S$_A$ Iso |
| 16 | n-C$_9$H$_{19}$—(dioxane)—(Ph)—C(=O)—O—CH(CF$_3$)—C$_6$H$_{13}$-n* | Cry $\underset{18.0}{\overset{52.5}{\rightleftarrows}}$ S$_{(3)}$* $\underset{70.4}{\overset{71.0}{\rightleftarrows}}$ S$_C$* $\underset{71.5}{\overset{72.0}{\rightleftarrows}}$ S$_A$ $\underset{79.9}{\overset{80.0}{\rightleftarrows}}$ Iso |

TABLE 6-continued

| No. | STRUCTURAL FORMULA | TRANSITION TEMPERATURE (°C.) |
|---|---|---|
| 17 | n-C₈H₁₇—[pyridine]—[phenyl]—C(=O)O—[phenyl]—O—C(=O)—CH(CF₃)—C₆H₁₃-n | Cry ⇌56 S(3)* ⇌40.7 Sc* ⇌72.5 S_A ⇌88.4 Iso |
| 18 | n-C₉H₁₉—[pyridine]—[phenyl]—C(=O)O—[phenyl]—O—C(=O)—CH(CF₃)—C₆H₁₃-n | Cry ⇌40.7 S(3)* ⇌78.2 Sc* ⇌87.5 S_A Iso |
| 19 | n-C₁₀H₂₁—[pyridine]—[phenyl]—C(=O)O—[phenyl]—O—C(=O)—CH(CF₃)—C₆H₁₃-n | Cry ⇌45.3 S(3)* ⇌75.9 Sc* ⇌82.3 S_A Iso |
| 20 | n-C₁₀H₂₁—O—C(=O)—[naphthyl]—C(=O)O—[phenyl]—[phenyl]—O—C(=O)—CH(CF₃)—C₆H₁₃-n | Cry 64.8/<35 S(3)* 103.8/100.4 Sc* 118.9/124.5 S_A 153/152.5 Iso |
| 21 | n-C₁₀H₂₁—O—C(=O)—[naphthyl]—C(=O)O—[phenyl]—[phenyl]—O—C(=O)—CH(CF₃)—C₆H₁₃-n | Cry 82.6/75 S(3)* 130/120 Sc* 157.3/156.9 S_A 185.9/184.2 Iso |
| 22 | n-C₈H₁₇O—[fluorophenyl]—C(=O)O—[phenyl]—[phenyl]—O—C(=O)—CH(CF₃)—C₆H₁₃-n | Cry ⇌26 S(3)* ⇌46 Sc* ⇌48 S_A ⇌94.7 Iso |
| 23 | n-C₉H₁₉O—[fluorophenyl]—C(=O)O—[phenyl]—[phenyl]—O—C(=O)—CH(CF₃)—C₆H₁₃-n | Cry ⇌32 S(3)* ⇌56 Sc* ⇌60 S_A ⇌91.9 Iso |

TABLE 6-continued

| No. | STRUCTURAL FORMULA | TRANSITION TEMPERATURE (°C.) |
|---|---|---|
| 24 | n-C$_{10}$H$_{21}$—O—⬡(F)—C(=O)—O—⬡—⬡—C(=O)—O—CH(CF$_3$)—C$_6$H$_{13}$-n* | Cry ⇌$_{40}^{47.6}$ S$_{(3)}$* ⇌$_{60.0}^{61.0}$ S$_A$ ⇌$_{89.7}^{88.9}$ Iso |
| 25 | n-C$_8$H$_{17}$—O—⬡—⬡—C(=O)—O—⬡—C(=O)—O—CH(CH$_3$)—C$_6$H$_{13}$-n* (MHPOBC) | Cry ⇌$_{68.0}$ S$_{(3)}$* ⇌$_{118.5}$ Sc* ⇌$_{122.0}$ S$_A$ ⇌$_{149.8}$ Iso |

What is claimed is:

1. A matrix type liquid crystal display apparatus comprising:

a liquid crystal cell having first and second electrode substrates disposed to be parallel to each other, said first and second electrode substrates including n striped row electrodes and m striped column electrodes, respectively, which are perpendicular to each other, a ferroelectric liquid crystal being disposed between said first and second electrode substrates so as to form n by m indication picture elements; and scanning drive means adapted to supply, on the basis of stored indication data, a scanning signal to the n striped row electrodes and a data signal to the m striped column electrodes for sequentially scanning, at every (1/n) of a time period for indication of one image plane on the liquid crystal, the respective row electrodes to supply a first combination signal, which is a combination of said scanning signal and said data signal, so as to cause the remaining indication picture elements to enter in an OFF state;

wherein said ferroelectric liquid crystal has three stable states in accordance with an applied voltage and has a light transmittance with a hysteresis sufficient to a dynamic drive in accordance with increase or decrease in the applied voltage in a predetermined voltage range, and said scanning drive means produces said first combination signal as a signal running to an alternating-current-like variation from a voltage below a reference voltage in a predetermined one polarity voltage range to a voltage above said reference voltage and produces said second combination signal as a signal which does not exceed said reference voltage in said predetermined one polarity voltage range, and supplies a predetermined signal, for keeping the states of the indication elements due to said first and second combination signals, between the n striped row electrodes and the m striped column electrodes after the supply of said first and second combination signal thereto.

2. A matrix type liquid crystal display apparatus as claimed in claim 1, wherein said ferroelectric liquid crystal includes a dichromatic coloring matter.

3. A matrix type liquid crystal display apparatus as claimed in claim 1, said first and second electrode substrates further comprise polarizing plates which are arranged to be perpendicular to each other so that the direction of a polarizer thereof makes an angle of 0°, 22.5°, 45° or 90° with respect to a molecule long axis direction in a first stable state of a liquid crystal molecular orientation under the condition of no application of an electric field.

4. A matrix type liquid crystal display apparatus as claimed in claim 2, wherein said first or second electrode substrate comprises a polarizing plates so that the direction of a polarizer thereof makes an angle of 0°, 45° or 90° with respect to a molecule long axis direction in a first stable state of a liquid crystal molecular orientation under the condition of no application of an electric field.

5. A matrix type liquid crystal display apparatus as claimed in claim 1, further comprising means for producing an erasing signal to erase the indication.

6. A matrix type liquid crystal display apparatus as claimed in claim 1, wherein the voltage polarities of each of the respective scanning signals alternately vary with a period of $\frac{1}{2}$ of the time period for indication of one image plane.

7. A matrix type liquid crystal indication apparatus comprising:

a liquid crystal cell having first and second electrode substrates disposed to be parallel to each other, said first and second electrode substrates including n striped row electrodes and m striped column electrodes, respectively, which are perpendicular to each other, a ferroelectric liquid crystal being disposed between said first and second electrode substrates so as to form n by m indication picture elements; and drive control means arranged to perform a line sequential scanning system which successively supplies a scanning signal to the n striped row electrodes and simultaneously supplies a light or dark data signal in parallel to the m striped column electrodes;

wherein said ferroelectric liquid crystal varies a first stable state to a second stable state or said second stable state to said first stable state in accordance with increase or decrease in an applied voltage in a predetermined one polarity voltage range and shows a transmittance light quantity-to-voltage characteristic with a hysteresis which increases or decreases the transmittance light quantity of said ferroelectric liquid crystal in accordance with the increase or decrease in the applied voltage, and further varies from said first stable state to a third stable state or said third stable state to said first stable state in accordance with increase or decrease of the applied voltage in a reversed polarity voltage range and shows a transmittance light quantity-to-voltage characteristic with a hysteresis which increases or decreases the transmittance light quantity in accordance therewith, and said drive control means, for a first period in the line sequential scanning, produces a combination signal of said scanning signal and said light data signal so as to have a waveform including 0 level and a level higher than that of a saturation voltage for the variation from said first stable state to said second stable state and produces a combination signal of said scanning signal and said dark data signal so as to have a waveform including 0 level and a level lower than that of a saturation voltage for the variation from said first stable state to said second stable state and supplies, after the supply of said combination signals, a signal with a waveform including a level lower than that of a threshold voltage for the variation from said first stable state to said second stable state and higher than that of a threshold voltage from said second stable state to said first stable state, and further for a second period, produces a combination signal of said scanning signal and said light data signal so as to have a waveform including 0 level and a level higher than that of a saturation voltage for the variation from said first stable state to said third stable state and produces a combination signal of said scanning signal and said dark data signal so as to have a waveform including 0 level and a level lower than that of a saturation voltage for the variation from said first stable state to said third stable state and supplies, after the supply of said combination signals, a signal with a waveform including a level lower than that of a threshold voltage for the variation from said first stable state to said third stable state and higher than that of a threshold voltage from said third stable state to said first stable state.

* * * * *